US010819406B2

(12) United States Patent
Huang et al.

(10) Patent No.: US 10,819,406 B2
(45) Date of Patent: Oct. 27, 2020

(54) CODEBOOK-BASED CHANNEL STATE INFORMATION FEEDBACK METHOD AND DEVICE

(71) Applicant: HUAWEI TECHNOLOGIES CO., LTD., Shenzhen, Guangdong (CN)

(72) Inventors: Yi Huang, Shenzhen (CN); Yuanjie Li, Shanghai (CN); Haibao Ren, Shanghai (CN); Liuliu Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,043

(22) Filed: Mar. 29, 2019

(65) Prior Publication Data

US 2019/0229786 A1    Jul. 25, 2019

Related U.S. Application Data

(63) Continuation of application No. PCT/CN2017/104656, filed on Sep. 29, 2017.

(30) Foreign Application Priority Data

Sep. 29, 2016  (CN) .............................. 201610872026
Feb. 6, 2017   (CN) .............................. 201710067261
May 12, 2017   (CN) .............................. 201710336128

(51) Int. Cl.
*H04B 7/06*     (2006.01)
*H04B 7/0456*   (2017.01)

(52) U.S. Cl.
CPC ............. *H04B 7/0478* (2013.01); *H04B 7/06* (2013.01); *H04B 7/0639* (2013.01)

(58) Field of Classification Search
CPC ... H04B 7/0478; H04L 27/10; H04L 27/1563; H03K 5/003; H03L 7/07; H03L 7/0814
See application file for complete search history.

(56) References Cited

U.S. PATENT DOCUMENTS 9,813,128 B2      11/2017   Tong et al.
2013/0039326 A1*  2/2013    Kim ..................... H04B 7/0456
                                                          370/329

(Continued)

FOREIGN PATENT DOCUMENTS

CN     102195755 A     9/2011
CN     102195760 A     9/2011

(Continued)

OTHER PUBLICATIONS

InterDigital Communications,"On CSI feedback for NR",3GPP TSG RAN WG1 Meeting #86 R1-167572,Gothenburg, Sweden Aug. 22-26, 2016,total 5 pages.

(Continued)

*Primary Examiner* — Ted M Wang
(74) *Attorney, Agent, or Firm* — Fish & Richardson P.C.

(57) ABSTRACT

Embodiments of the present invention provide a method which includes: a terminal device is configured to send precoding matrix indicator information to a radio access network device, wherein the precoding matrix indicator information is used to indicate a precoding matrix in a codebook, and the codebook comprises information about a quantity of corresponding antenna panels and information about a phase difference between different corresponding antenna panels; and the terminal device receives downlink data from the radio access network device.

30 Claims, 5 Drawing Sheets

(56) References Cited

U.S. PATENT DOCUMENTS

| | | |
|---|---|---|
| 2013/0064317 A1 | 3/2013 | Tong |
| 2015/0155923 A1 | 6/2015 | Tong et al. |
| 2015/0381249 A1 | 12/2015 | Zhang et al. |
| 2016/0080052 A1 | 3/2016 | Li et al. |
| 2016/0218780 A1 | 7/2016 | Zhang et al. |
| 2017/0195013 A1 | 7/2017 | Pham et al. |
| 2017/0195100 A1 | 7/2017 | Kim et al. |

FOREIGN PATENT DOCUMENTS

| | | |
|---|---|---|
| CN | 102422541 A | 4/2012 |
| CN | 103746779 A | 4/2014 |
| CN | 104243106 A | 12/2014 |
| CN | 104488210 A | 4/2015 |
| CN | 105247809 A | 1/2016 |
| EP | 3185436 A1 | 6/2017 |
| JP | 2012044316 A | 3/2012 |
| JP | 2013521734 A | 6/2013 |
| JP | 2013522988 A | 6/2013 |
| JP | 2013534110 A | 8/2013 |
| WO | 2014134876 A1 | 9/2014 |
| WO | WO-2014176813 A1 * | 11/2014 |
| WO | 2015170919 A1 | 11/2015 |
| WO | 2016018100 A1 | 2/2016 |
| WO | 2018127426 A1 | 7/2018 |

OTHER PUBLICATIONS

Huawei, HiSilicon,"Antenna structure: impact on MIMO transmission and remaining modeling issues",3GPP TSG RAN WG1 Meeting #86 R1-166109,Gothenburg, Sweden, Aug. 22-26, 2016,total 7 pages.

PCT International Search Report in International Appln. No. PCT/CN2017/104656, dated Jan. 4, 2018, 19 pages (with English translation).

Partial Supplementary European Search Report issued in European Application No. 17855017.4 dated Sep. 30, 2019, 10 pages.

Extended European Search Report issued in European Application No. 17855017.4 dated Jan. 30, 2020, 10 pages.

Office Action issued in Chinese Application No. 201780060650.7 dated May 6, 2020, 36 pages (with English translation).

Office Action issued in Japanese Application No. 2019-516626 dated Jul. 14, 2020, 8 pages (with English translation).

* cited by examiner

Phase difference or
modulus value difference

Phase difference or
modulus value difference

Weighted beam

CODEBOOK-BASED CHANNEL STATE INFORMATION FEEDBACK METHOD AND DEVICE

CROSS-REFERENCE TO RELATED APPLICATIONS

This application is a continuation of International Application No. PCT/CN2017/104656, filed on Sep. 29, 2017, which claims priority to Chinese Patent Application No. 201610872026.4, filed on Sep. 29, 2016 and Chinese Patent Application No. 201710067261.9, filed on Feb. 6, 2017 and Chinese Patent Application No. 201710336128.9, filed on May 12, 2017. All of the aforementioned patent applications are hereby incorporated by reference in their entireties.

TECHNICAL FIELD

The present invention relates to the field of communications technologies, and in particular, to a method and a device for codebook-based channel state information feedback.

BACKGROUND

A massive multiple input multiple output (massive multiple input multiple output, Massive MIMO) technology, as one of key technologies of a new radio access technology (New Radio Access Technology, NR for short), can improve a system capacity by using a higher spatial degree of freedom, and has been studied extensively.

In a massive MIMO system, to improve system transmission performance by performing precoding at a transmit end, the transmit end needs to learn of channel state information (channel state information, CSI for short), but the CSI is generally obtained by performing channel measurement by a receive end. Therefore, the receive end needs to feed back the CSI to the transmit end. In the prior art, to feed back the CSI to the transmit end, the receive end mainly feeds back a precoding matrix indicator (Precoding Matrix indicator, PMI for short) to the transmit end. Specifically, the transmit end and the receive end share a codebook. After obtaining the CSI through channel estimation, the transmit end selects a precoding matrix from the codebook based on the CSI, and feeds back a PMI corresponding to the precoding matrix to a base station. The base station obtains an optimal precoding matrix based on the PMI, and then performs precoding processing.

However, existing codebooks are all designed for a uniform antenna array, and are mainly designed for linear phase compensation. When uneven spacings exist in a multi-panel antenna array, linear phase compensation is no longer appropriate, and if an existing codebook is used, a beam shape is changed, and a required beam cannot be obtained, leading to problems of a decrease in beam precision and a system performance loss.

SUMMARY

Embodiments of the present invention provide a codebook-based channel state information feedback method and a device, to improve beam precision and system performance.

According to a first aspect, an embodiment of the present invention provides a codebook-based channel state information feedback method, including:

sending, by user equipment UE, a precoding matrix indicator PMI to a transmission/reception point TRP, where the PMI is used to indicate a target precoding matrix and a parameter value that corresponds to a block codebook difference parameter, where the target precoding matrix is a precoding matrix in a codebook; the codebook is a codebook pre-generated by the UE based on a codebook configuration parameter; at least some precoding matrices in the codebook are obtained through transformation from precoding matrices in block codebooks and the parameter value; there are at least two block codebooks; there is a correspondence between a quantity of parameter values and a quantity of block codebooks; the codebook configuration parameter includes the quantity of block codebooks in the codebook and a length of a vector corresponding to a precoding matrix in the block codebook; and the block codebook is formed based on a preset precoding matrix.

In a feasible design, the block codebooks include a block codebook in a horizontal dimension and a block codebook in a vertical dimension; and the codebook configuration parameter includes: a quantity of block codebooks in the horizontal dimension and a length of a vector corresponding to a precoding matrix in the block codebook in the horizontal dimension, where there are at least two block codebooks in the horizontal dimension; and a quantity of block codebooks in the vertical dimension and a length of a vector corresponding to a precoding matrix in the block codebook in the vertical dimension, where there are at least two block codebooks in the vertical dimension.

In a feasible design, the PMIs include a first PMI corresponding to wideband CSI and a second PMI corresponding to subband CSI, and the first PMI or the second PMI is used to indicate the parameter value that corresponds to the block codebook difference parameter.

In a feasible design, the PMIs include a first PMI corresponding to wideband CSI and a second PMI corresponding to subband CSI, and a parameter value that corresponds to the block codebook difference parameter is determined based on the first PMI or the second PMI.

In a feasible design, the first PMI is used to indicate the parameter value, and the first PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

In a feasible design, the first PMI is used to indicate the parameter value, and the first PMI corresponds to two codebook indexes, where a parameter value that corresponds to a block codebook difference parameter in a horizontal dimension is determined based on one codebook index, and a parameter value that corresponds to a block codebook difference parameter in a vertical dimension is determined based on the other codebook index; or the second PMI is used to indicate the parameter value, and the second PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

In a feasible design, the parameter value is indicated by the second PMI, and the second PMI corresponds to two codebook indexes, where a parameter value that corresponds to a block codebook difference parameter in a horizontal dimension is indicated by one codebook index, and a parameter value that corresponds to a block codebook difference parameter in a vertical dimension is indicated by the other codebook index.

In a feasible design, the PMIs include a first PMI corresponding to wideband CSI, a second PMI corresponding to narrowband CSI, and a third PMI, and the third PMI is used to indicate the parameter value that corresponds to the block codebook difference parameter.

In a feasible design, the third PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

In a feasible design, before the sending, by user equipment UE, a precoding matrix indicator PMI to a transmission/reception point TRP, the method further includes:

receiving, by the UE, the codebook configuration parameter sent by the TRP.

In a feasible design, the receiving, by the user equipment UE, the codebook configuration parameter sent by the TRP includes:

receiving, by the UE, higher layer signaling or physical layer signaling sent by the TRP, where the higher layer signaling or the physical layer signaling carries the codebook configuration parameter.

In a feasible design, a vector corresponding to each block codebook is a vector corresponding to a beam at a same radiation angle. For example, the vector may be a discrete Fourier transform (Discrete Fourier Transform, DFT) vector.

In a feasible design, if the block codebook difference parameter is a phase difference, a structure of the precoding matrix in the codebook is specifically shown in the following formula 1.1:

$$W^{(1)}_{l,m,n,\phi,\theta} = \begin{bmatrix} v_{l,\theta} \otimes u_{m,\phi} \\ \varphi_n \cdot v_{l,\theta} \otimes u_{m,\phi} \end{bmatrix} \quad \text{Formula 1.1}$$

Optionally, the formula 1.1 may be $$W^{(1)}_{l,m,n,\phi,\theta} = \frac{1}{2N_1N_2K_1K_2} \cdot \begin{bmatrix} v_{l,\theta} \otimes u_{m,\phi} \\ \varphi_n v_{l,\theta} \otimes u_{m,\phi} \end{bmatrix},$$

where $\varphi_n = e^{j\pi n/2}$ represents a phase difference between two polarization directions of an antenna;

$$v_{l,\theta} = \begin{bmatrix} v_l & e^{j\theta_1}v_l & \cdots & e^{j\theta_{N_1}}v_l \end{bmatrix};$$

optionally, $$v_{l,\theta} = \begin{bmatrix} v_l & e^{j\theta_1}v_l & \cdots & e^{j\theta_{N_1-1}}v_l \end{bmatrix}^T,$$

where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_m & e^{j\phi_1}u_m & \cdots & e^{j\phi_{N_2}}u_m \end{bmatrix};$$

optionally, $$u_{m,\phi} = \begin{bmatrix} u_m & e^{j\phi_1}u_m & \cdots & e^{j\phi_{N_2-1}}u_m \end{bmatrix}^T,$$

where $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; $\phi$ represents a phase difference parameter in the vertical dimension; $(\phi_1 \ldots \phi_{N_2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

In a feasible design, if the block codebook difference parameter is a modulus value difference, a structure of the precoding matrix in the codebook is specifically shown in the following formula 1.2:

$$W^{(1)}_{l,m,n,\beta,\alpha} = \begin{bmatrix} v_{l,\beta} \otimes u_{m,\alpha} \\ \varphi_n \cdot v_{l,\beta} \otimes u_{m,\alpha} \end{bmatrix} \quad \text{Formula 1.2}$$

Optionally, the formula 1.2 may be:

$$W^{(1)}_{l,m,n,\phi,\theta} = \frac{1}{2N_1N_2K_1K_2} \cdot \begin{bmatrix} v_{l,\beta} \otimes u_{m,\alpha} \\ \varphi_n v_{l,\beta} \otimes u_{m,\alpha} \end{bmatrix},$$

where $\varphi_n = e^{j\pi n/2}$ represents a phase difference between two polarization directions of an antenna; $v_{l,\beta} = [v_l \ \beta_1 v_l \ \ldots \ \beta_{N_1} v_l]$ optionally, $v_{l,\beta} = [v_l \ \beta_1 v_l \ \ldots \ \beta_{N_1-1} v_l]^T$, where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; β represents a modulus value difference parameter in the horizontal dimension; ($\beta_1 \ldots \beta_{N_1}$) represent modulus value differences between precoding matrices in different block codebooks in the horizontal dimension; $u_{m,\alpha} = [u_m \ \alpha_1 u_m \ \ldots \ \alpha_{N_2} u_m]$; optionally, $u_{m,\alpha} = [u_m \ \alpha_1 u_m \ \ldots \ \alpha_{N_2-1} u_m]^T$, where $u_m$, represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; α represents a modulus value difference parameter in the vertical dimension; ($\alpha_1 \ldots \alpha_{N_1}$) represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

In a feasible design, vectors corresponding to the block codebooks are vectors corresponding to beams at different radiation angles.

In a feasible design, if the block codebook difference parameter is a phase difference, a structure of the precoding matrix in the codebook is shown in a formula 1.3:

$$W^{(1)}_{l,m,n,\phi,\theta} = \begin{bmatrix} v_{l,\theta} \otimes u_{m,\phi} \\ \varphi_n \cdot v_{l,\theta} \otimes u_{m,\phi} \end{bmatrix} \quad \text{Formula 1.3}$$

Optionally, the formula 1.3 may be:

$$W^{(1)}_{l,m,n,\phi,\theta} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix},$$

where $\varphi_n = e^{j\pi n/2}$ represents a phase difference between two polarization directions of an antenna;

$$v_{l,\theta} = \begin{bmatrix} v_{l_1} & e^{j\theta_1} v_{l_2} & \cdots & e^{j\theta_{N_1}} v_{l_{N_1}} \end{bmatrix},$$

where $l = l_1 \ldots l_{N_1}$; optionally, $$v_{l,\theta} = \begin{bmatrix} v_{l_0} & e^{j\theta_1} v_{l_1} & \cdots & e^{j\theta_{N_1-1}} v_{l_{N_1-1}} \end{bmatrix}^T,$$

where $l = l_0, l_1 \ldots l_{N_1-1}$, and $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; θ represents a phase difference parameter in the horizontal dimension; ($\theta_1 \ldots \theta_{N_1}$) represent phase differences between precoding matrices in different block codebooks in the horizontal dimension;

$$u_{m,\phi} = \begin{bmatrix} u_{m_1} & e^{j\phi_1} u_{m_2} & \cdots & e^{j\phi_{N_2}} u_{m_{N_2}} \end{bmatrix},$$

where $m = m_1 \ldots m_{N_2}$; optionally, $$u_{m,\phi} = \begin{bmatrix} u_{m_0} & e^{j\phi_1} u_{m_1} & \cdots & e^{j\phi_{N_2-1}} u_{m_{N_2-1}} \end{bmatrix}^T,$$

where $m = m_0, m_1, \ldots, m_{N_2-1}$, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; φ represents a phase difference parameter in the vertical dimension; ($\phi_1 \ldots \phi_{N_2}$) represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

In a feasible design, if the block codebook difference parameter is a modulus value difference, a structure of the precoding matrix in the codebook is shown in a formula 1.4:

$$W^{(1)}_{l,m,n,\beta,\alpha} = \begin{bmatrix} v_{l,\beta} \otimes u_{m,\alpha} \\ \varphi_n \cdot v_{l,\beta} \otimes u_{m,\alpha} \end{bmatrix} \quad \text{Formula 1.4}$$

Optionally, the formula 1.4 may be:

$$W^{(1)}_{l,m,n,\phi,\theta} = \frac{1}{2N_1 N_2 K_1 K_2} \cdot \begin{bmatrix} v_{l,\beta} \otimes u_{m,\alpha} \\ \varphi_n v_{l,\beta} \otimes u_{m,\alpha} \end{bmatrix},$$

where $\varphi_n = e^{j\pi n/2}$ represents a phase difference between two polarization directions of an antenna; $v_{l,\beta} = [v_l \, \beta_1 v_{l_2} \ldots \beta_{N1} v_{l_{N1}}]$ optionally, $$v_{l,\beta} = \begin{bmatrix} v_{l_0} & \beta_1 v_{l_1} & \ldots & \beta_{N_1-1} v_{l_{N_1-1}} \end{bmatrix}^T,$$

where $v_{l,\beta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $l = l_1 \ldots l_{N1}$; optionally, $l = l_0, l_1 \ldots, l_{N_1-1}$; and $v_l$ represents that each block codebook is formed based on a vector whose length is $K_1$, and $K_1$ is a quantity of CSI-RS ports corresponding to each block codebook in the horizontal dimension; $\beta$ represents a modulus value difference parameter in the horizontal dimension; $(\beta_1 \ldots \beta_{N_1})$ represent modulus value differences between precoding matrices in different block codebooks in the horizontal dimension; $u_{m,\alpha} = [u_{m_1} \, \alpha_1 u_{m_2} \ldots \alpha_{N_2} u_{m_3}]$, where $m = m_1 \ldots m_{N_2}$; optionally, $$u_{m,\alpha} = \begin{bmatrix} u_{m_0} & \alpha_1 u_{m_1} & \ldots & \alpha_{N_2-1} u_{m_{N_2-1}} \end{bmatrix}^T,$$

where $m = m_0, m_1, \ldots, m_{N_2-1}$, and $u_{m,\alpha}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \ldots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; $\alpha$ represents a modulus value difference parameter in the vertical dimension; $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

In a feasible solution, an amplitude factor and a phase factor may be combined for use.

According to a second aspect, an embodiment of the present invention provides a codebook-based channel state information feedback method, including:

receiving, by a transmission/reception point TFP, a precoding matrix indicator PMI sent by user equipment UE, where the PMI is used to indicate a target precoding matrix and a parameter value that corresponds to a block codebook difference parameter, where the target precoding matrix is a precoding matrix in a codebook; the codebook is a codebook pre-generated by the TRP based on a codebook configuration parameter; at least some precoding matrices in the codebook are obtained through transformation from precoding matrices in block codebooks and the parameter value; there are at least two block codebooks; there is a correspondence between a quantity of parameter values and a quantity of block codebooks; the codebook configuration parameter includes the quantity of block codebooks in the codebook and a length of a vector corresponding to a precoding matrix in the block codebook; and the block codebook is formed based on a preset precoding matrix.

In a feasible design, the block codebooks include a block codebook in a horizontal dimension and a block codebook in a vertical dimension; and the codebook configuration parameter includes: a quantity of block codebooks in the horizontal dimension and a length of a vector corresponding to a precoding matrix in the block codebook in the horizontal dimension, where there are at least two block codebooks in the horizontal dimension; and a quantity of block codebooks in the vertical dimension and a length of a vector corresponding to a precoding matrix in the block codebook in the vertical dimension, where there are at least two block codebooks in the vertical dimension.

In a feasible design, the PMIs include a first PMI corresponding to wideband CSI and a second PMI corresponding to subband CSI, and the first PMI or the second PMI is used to indicate the parameter value that corresponds to the block codebook difference parameter.

In a feasible design, the first PMI is used to indicate the parameter value, and the first PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension; or the second PMI is used to indicate the parameter value, and the second PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

In a feasible design, the PMIs include a first PMI corresponding to wideband CSI, a second PMI corresponding to narrowband CSI, and a third PMI, and the third PMI is used to indicate the parameter value that corresponds to the block codebook difference parameter.

In a feasible design, the third PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

In a feasible design, before the receiving, by a transmission/reception point TFP, a precoding matrix indicator PMI sent by user equipment UE, the method further includes:

sending, by the TRP, the codebook configuration parameter to the UE.

In a feasible design, the sending, by the TRP, the codebook configuration parameter to the UE includes:

sending, by the TRP, higher layer signaling or physical layer signaling to the UE, where the higher layer signaling or the physical layer signaling carries the codebook configuration parameter.

For a specific structure of the precoding matrix in the codebook, refer to the foregoing descriptions, and details are not described herein again.

According to a third aspect, an embodiment of the present invention provides user equipment. The user equipment can implement a function performed by the user equipment in the foregoing method embodiments, and the function may be implemented by hardware or may be implemented by executing corresponding software by hardware. The hardware or software includes one or more modules corresponding to the foregoing function.

According to a fourth aspect, an embodiment of the present invention provides a transmission/reception point. The transmission/reception point can implement a function performed by the transmission/reception point in the foregoing method embodiments, and the function may be implemented by hardware or may be implemented by executing corresponding software by hardware. The hardware or software includes one or more modules corresponding to the foregoing function.

According to a fifth aspect, an embodiment of the present invention provides user equipment, including a processor, a memory, and a communications interface. The memory is configured to store an instruction; the communications interface is configured to communicate with another device; and the processor is configured to execute the instruction stored in the memory, to cause the user equipment to perform the method according to the first aspect.

According to a sixth aspect, an embodiment of the present invention provides a transmission/reception point, including a processor, a memory, and a communications interface. The memory is configured to store an instruction; the communications interface is configured to communicate with another device; and the processor is configured to execute the instruction stored in the memory, to cause the transmission/reception point to perform the method according to the second aspect.

According to a seventh aspect, an embodiment of the present invention provides a computer readable medium. The computer readable medium includes a computer executable instruction, and the computer executable instruction is used to cause user equipment to perform the method according to the first aspect of the present invention.

According to an eighth aspect, an embodiment of the present invention provides a computer readable medium. The computer readable medium includes a computer executable instruction, and the computer executable instruction is used to cause a transmission/reception point to perform the method according to the second aspect of the present invention.

According to a ninth aspect, an embodiment of the present invention provides an on-chip system. The on-chip system is applicable to user equipment, and the on-chip system includes at least one communications interface, at least one processor, and at least one memory. The communications interface, the memory, and the processor are interconnected by using a bus; and the processor executes an instruction stored in the memory, to cause the user equipment to perform the method according to the first aspect of the present invention.

According to a tenth aspect, an embodiment of the present invention provides an on-chip system. The on-chip system is applicable to a transmission/reception point, and the on-chip system includes at least one communications interface, at least one processor, and at least one memory. The communications interface, the memory, and the processor are interconnected by using a bus; and the processor executes an instruction stored in the memory, to cause the transmission/reception point to perform the method according to the second aspect of the present invention.

According to an eleventh aspect, an embodiment of the present invention provides a communications system. The communications system includes user equipment and a transmission/reception point. The user equipment is configured to perform the method according to the first aspect of the present invention; and the transmission/reception point is configured to perform the method according to the second aspect of the present invention.

According to the codebook-based channel state information feedback method, and the device that are provided in the embodiments, the UE sends the precoding matrix indicator PMI to the TRP. The PMI is used to indicate the target precoding matrix and the parameter value that corresponds to the block codebook difference parameter. The target precoding matrix is a precoding matrix in the codebook; and the at least some precoding matrices in the codebook are obtained through transformation from the precoding matrices in the block codebook and the parameter value, to introduce the parameter value that corresponds to the block codebook difference parameter to the codebook, so that the codebook includes difference parameters such as a phase difference and a modulus value difference between adjacent panels, thereby ensuring beam directivity and improving system performance.

According to a twelfth aspect, an embodiment of the present invention provides a communication method, applicable to an application process of a precoding matrix, and including:

sending, by a terminal device, precoding matrix indicator information to a radio access network device, where the precoding matrix indicator information is used to indicate a precoding matrix in a codebook; the codebook includes information about a quantity of block codebooks and information about a phase difference between different block codebooks; and the quantity of the block codebooks is at least two; and receiving, by the terminal device, downlink data from the radio access network device;

or, an embodiment of the present invention provides a communication method, applicable to an application process of a precoding matrix, and including:

sending, by a terminal device, precoding matrix indicator information to a radio access network device, where the precoding matrix indicator information is used to indicate a precoding matrix in a codebook, and the codebook includes information about a quantity of corresponding antenna panels and information about a phase difference between different corresponding antenna panels; and receiving, by the terminal device, downlink data from the radio access network device.

or, an embodiment of the present invention provides a communication method, applicable to an application process of a precoding matrix, and including:

sending, by a terminal device, precoding matrix indicator information to a radio access network device, where the precoding matrix indicator information is used to indicate a precoding matrix in a codebook, and the codebook includes a quantity of antenna port groups and information about a phase factor between different antenna port groups; and receiving, by the terminal device, downlink data from the radio access network device.

With reference to the twelfth aspect, in a feasible design, the precoding matrix in the codebook satisfies:

$$W^{(1)}_{l,m,n,\theta_1,\cdots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ \vdots \\ e^{j\theta_{N-1}}\begin{pmatrix} v_l \otimes u_m \\ \varphi_n v_l \otimes u_m \end{pmatrix} \end{bmatrix},$$

where a superscript of W represents a rank number; $\varphi_n = e^{j\pi n/2}$ represents a phase difference or a phase factor between two polarization directions of an antenna, where a value range of n satisfies $\{0, 1, 2, 3\}$; l and m each represent a function of a first PMI; e represents a natural constant; j represents a unit imaginary number; $\pi$ represents the circular ratio;

$$v_l = \begin{bmatrix} 1 & e^{j\frac{2\pi l}{O_1 K_1}} & \cdots & e^{j\frac{2\pi l(K_1-1)}{O_1 K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $(\theta_1 \ldots \theta_{N-1})$ represent phase differences or phase factors between different antenna port groups, or represent phase differences between block codebooks, or represent phase differences or phase factors between antenna panels; $\theta_r = 2\pi i_{1,r+2}/X$, where $r=1, \ldots, N-1$, and X is a value in a set $\{2, 4, 8, \ldots\}$; $O_1$ and $O_2$ represent over-sampling factors; $\otimes$ represents a Kronecker product; and N represents the quantity of antenna port groups, or a quantity of antenna panels, or N is 2 or 4.

With reference to the twelfth aspect, in a feasible design, the precoding matrix in the codebook satisfies:

$$W^{(1)}_{l,m,n,\theta_1,\cdots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ e^{j\theta_{N-1}}\begin{pmatrix} v_{l,m} \\ \varphi_n v_{l,m} \end{pmatrix} \end{bmatrix},$$

where a superscript of W represents a rank number;

$$v_{l,m} = \begin{bmatrix} u_m & e^{j\frac{2\pi l}{O_1 K_1}} u_m & \cdots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T$$

or $$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $O_1$ and $O_2$ represent over-sampling factors; l and m each represent a function of a first PMI; $\varphi_n = e^{j\pi n/2}$ represents a phase difference or a phase factor between two polarization directions of an antenna, where a value of n is $\{0, 1, 2, 3\}$; e represents a natural constant; j represents a unit imaginary number; $\pi$ represents the circular ratio; $(\theta_1 \ldots \theta_{N-1})$ represent phase differences or phase factors between different antenna port groups, or represent phase differences between block codebooks, or represent phase differences or phase factors between antenna panels; $\theta_r = 2\pi i_{1,r+2}/X$, where $r=1, \ldots, N-1$, and X is a value in a set $\{2, 4, 8, \ldots\}$; and N represents the quantity of antenna port groups, or N represents a quantity of antenna panels, or N is 2, 4, or 8.

With reference to the twelfth aspect, in a feasible design, the precoding matrix in the codebook satisfies:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix},$$

where a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; π represents the circular ratio; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

With reference to the twelfth aspect, in a feasible design, the precoding matrix in the codebook satisfies:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix},$$

where a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or }$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

In a feasible design, any one of the foregoing designs further includes: the phase factor is $\theta_r = 2\pi i_{2,r}/X$, where X can be a value in a set $\{2, 4, 8, \ldots\}$, and $r=1, \ldots, N-1$.

In a feasible design, any one of the foregoing designs further includes: receiving, by the terminal device, higher layer signaling from the radio access network device, where the higher layer signaling includes the information about the quantity of block codebooks.

In a feasible design, any one of the foregoing designs further includes: receiving, by the terminal device, higher layer signaling from the radio access network device, where the higher layer signaling includes the information about the quantity of corresponding antenna panels.

In a feasible design, any one of the foregoing designs further includes:

receiving, by the terminal device, higher layer signaling from the radio access network device, where the higher layer signaling includes the quantity of antenna port groups.

In a feasible design, any one of the foregoing designs further includes: the antenna port is a channel state information-reference signal port.

In a feasible design, any one of the foregoing designs further includes: the precoding matrix indicator information includes a first precoding matrix indicator corresponding to wideband channel state information CSI, and/or, a second precoding matrix indicator corresponding to subband channel state information CSI.

In a feasible design, any one of the foregoing designs further includes: the first precoding matrix indicator and/or the second precoding matrix indicator include/includes information used to indicate the phase difference between the block codebooks.

In a feasible design, any one of the foregoing designs further includes: the information used to indicate the phase difference between the block codebooks includes at least one index value, and there is a correspondence between the index value and the phase difference between the block codebooks.

In a feasible design, any one of the foregoing designs further includes:

the precoding matrix indicator information includes the first precoding matrix indicator corresponding to the wideband channel state information CSI, the second precoding matrix indicator corresponding to the subband channel state information CSI, and a third precoding matrix indicator, and the third precoding matrix indicator includes information used to indicate the phase difference between the block codebooks.

According to a thirteenth aspect, an embodiment of the present invention provides a communication method, applicable to an application process of a precoding matrix, and including:

receiving, by a terminal device, signaling from a radio access network device, where the signaling includes any one of the following: information about a quantity of block codebooks, information about a quantity of corresponding antenna panels, and a quantity of antenna port groups; and learning, by the terminal device based on any one of the information about the quantity of block codebooks, the information about the quantity of corresponding antenna panels, and the quantity of antenna port groups, of a codebook that needs to be used.

In a feasible design, the antenna port is a channel state information-reference signal port.

According to a fourteenth aspect, an embodiment of the present invention provides a communication method, applicable to an application process of a precoding matrix, and including:

receiving, by a radio access network device, precoding matrix indicator information from a terminal, where the precoding matrix indicator information is used to indicate a precoding matrix in a codebook; the codebook includes information about a quantity of block codebooks and information about a phase difference between different block codebooks; and the quantity of the block codebooks is at least two; and sending, by the radio access network device, downlink data to the terminal device; or an embodiment of the present invention provides a communication method, applicable to an application process of a precoding matrix, and including:

receiving, by a radio access network device, precoding matrix indicator information from a terminal, where the precoding matrix indicator information is used to indicate a precoding matrix in a codebook, and the codebook includes information about a quantity of corresponding antenna panels and information about a phase difference between different corresponding antenna panels; and sending, by the radio access network device, downlink data to the terminal device; or an embodiment of the present invention provides a communication method, applicable to an application process of a precoding matrix, and including:

receiving, by a radio access network device, precoding matrix indicator information from a terminal, where the precoding matrix indicator information is used to indicate a precoding matrix in a codebook, and the codebook includes a quantity of antenna port groups and information about a phase factor between different antenna port groups; and sending, by the radio access network device, downlink data to the terminal device.

In a feasible design, any one of the foregoing designs further includes: the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ \vdots \\ e^{j\theta_{N-1}}\begin{pmatrix} v_l \otimes u_m \\ \varphi_n v_l \otimes u_m \end{pmatrix} \end{bmatrix},$$

where a superscript of W represents a rank number; $\varphi_n = e^{j\pi n/2}$ represents a phase difference or a phase factor between two polarization directions of an antenna, where a value range of n satisfies $\{0, 1, 2, 3\}$; l and m each represent a function of a first PMI; e represents a natural constant; j represents a unit imaginary number; π represents the circular ratio;

$$v_l = \begin{bmatrix} 1 & e^{j\frac{2\pi l}{O_1 K_1}} & \ldots & e^{j\frac{2\pi l(k_1-1)}{O_1 K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(k_2-1)}{O_2 K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $(\theta_1 \ldots \theta_{N-1})$ represent phase differences or phase factors between different antenna port groups, or represent phase differences between block codebooks, or represent phase differences or phase factors between antenna panels; $\theta_r = 2\pi i_{1,r+2}/X$, where $r=1, \ldots, N-1$, and X is a value in a set $\{2, 4, 8, \ldots\}$; $O_1$ and $O_2$ represent over-sampling factors; $\otimes$ represents a Kronecker product; and N represents the quantity of antenna port groups, or represents a quantity of antenna panels, or N is 2 or 4.

In a feasible design, any one of the foregoing designs further includes: the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1} \begin{pmatrix} v_{l,m} \\ \varphi_n v_{l,m} \end{pmatrix} \\ \vdots \\ e^{j\theta_{N-1}} \begin{pmatrix} v_{l,m} \\ \varphi_n v_{l,m} \end{pmatrix} \end{bmatrix},$$

where a superscript of W represents a rank number;

$$v_{l,m} = \left[ u_m \quad e^{j\frac{2\pi l}{O_1 K_1}} u_m \quad \ldots \quad e^{j\frac{2\pi l(k_1-1)}{O_1 \cdot K_1}} u_m \right]^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each group;

$$u_m = \left[ 1 \quad e^{j\frac{2\pi m}{O_2 K_2}} \quad \ldots \quad e^{j\frac{2\pi m(k_2-1)}{O_2 \cdot K_2}} \right]^T \text{ or}$$

$$u_m = \left[ 1 \quad e^{j\frac{2\pi m}{O_2 K_2}} \quad \ldots \quad e^{j\frac{2\pi m(k_2-1)}{O_2 \cdot K_2}} \right],$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $O_1$ and $O_2$ represent over-sampling factors; l and m each represent a function of a first PMI; $\varphi_n = e^{j\pi n/2}$ represents a phase difference or a phase factor between two polarization directions of an antenna, where a value of n is $\{0, 1, 2, 3\}$; e represents a natural constant; j represents a unit imaginary number; $\pi$ represents the circular ratio; $(\theta_1 \ldots \theta_{N-1})$ represent phase differences or phase factors between different antenna port groups, or represent phase differences between block codebooks, or represent phase differences or phase factors between antenna panels; $\theta_r = 2\pi i_{1,r+2}/X$, where $r=1, \ldots, N-1$, and X is a value in a set $\{2, 4, 8, \ldots\}$; and N represents the quantity of antenna port groups, or N represents a quantity of antenna panels, or N is 2, 4, or 8.

In a feasible design, any one of the foregoing designs further includes: the precoding matrix in the codebook satisfies:

$$W^{(1)}_{l,m,\theta_1,\ldots,\theta_{N-1}} = \frac{1}{\sqrt{N'K_1K_2}} \begin{bmatrix} v_l \otimes u_m \\ e^{j\theta_1} v_l \otimes u_m \\ \vdots \\ e^{j\theta_{N'-1}} v_l \otimes u_m \end{bmatrix},$$

where a superscript of W represents a rank number;

$$v_l = \left[ 1 \quad e^{j\frac{2\pi l}{O_1 K_1}} \quad \ldots \quad e^{j\frac{2\pi l(k_1-1)}{O_1 \cdot K_1}} \right]^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \left[ 1 \quad e^{j\frac{2\pi m}{O_2 K_2}} \quad \ldots \quad e^{j\frac{2\pi m(k_2-1)}{O_2 \cdot K_2}} \right]^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents the circular ratio; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

In a feasible design, any one of the foregoing designs further includes: the precoding matrix in the codebook satisfies:

$$W^{(1)}_{l,m,\theta_1,\ldots,\theta_{N-1}} = \frac{1}{\sqrt{N'K_1K_2}} \begin{bmatrix} v_{l,m} \\ e^{j\theta_1}v_{l,m} \\ \vdots \\ e^{j\theta_{N'-1}}v_{l,m} \end{bmatrix},$$

where a superscript of W represents a rank number;

$$v_{l,m} = \begin{bmatrix} u_m & e^{j\frac{2\pi l}{O_1 K_1}}u_m & \ldots & e^{j\frac{2\pi l(K_1-1)}{O_1 \cdot K_1}}u_m \end{bmatrix}^T$$

where $v_{l,m}$ represents a vector whose length is $K_1 \times K_2$, a $k_1^{th}$ element of $v_{l,m}$ is $$e^{j\frac{2\pi l k_1}{O_1 K_1}}u_m,$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k}{O_1 K_1}},$$

a value of $k_2$ may be $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

In a feasible design, any one of the foregoing designs further includes: the phase factor is $\theta_r = 2\pi i_{2,r}/X$, where X can be a value in a set $\{2, 4, 8, \ldots\}$, and $r=1, \ldots, N-1$.

In a feasible design, any one of the foregoing designs further includes: sending, by the radio access network device, higher layer signaling to the terminal device, where the higher layer signaling includes the information about the quantity of block codebooks. In a feasible design, any one of the foregoing designs further includes:

sending, by the radio access network device, higher layer signaling to the terminal device, where the higher layer signaling includes the information about the quantity of corresponding antenna panels.

In a feasible design, any one of the foregoing designs further includes: sending, by the radio access network device, higher layer signaling to the terminal device, where the higher layer signaling includes the quantity of antenna port groups.

In a feasible design, any one of the foregoing designs further includes: the antenna port is a channel state information-reference signal port.

In a feasible design, any one of the foregoing designs further includes: the precoding matrix indicator information includes a first precoding matrix indicator corresponding to wideband channel state information CSI, and/or, a second precoding matrix indicator corresponding to subband channel state information CSI.

In a feasible design, any one of the foregoing designs further includes:

the first precoding matrix indicator and/or the second precoding matrix indicator include/includes information used to indicate the phase difference between the block codebooks.

In a feasible design, any one of the foregoing designs further includes: the information used to indicate the phase difference between the block codebooks includes at least one index value, and there is a correspondence between the index value and the phase difference between the block codebooks.

In a feasible design, any one of the foregoing designs further includes: the precoding matrix indicator information includes the first precoding matrix indicator corresponding to the wideband channel state information CSI, the second precoding matrix indicator corresponding to the subband channel state information CSI, and a third precoding matrix indicator, and the third precoding matrix indicator includes information used to indicate the parameter value that corresponds to the block codebook difference parameter; or the precoding matrix indicator information includes the first precoding matrix indicator corresponding to the wideband channel state information CSI, the second precoding matrix indicator corresponding to the subband channel state information CSI, and a third precoding matrix indicator, and the third precoding matrix indicator includes information used to indicate the phase difference between the block codebooks.

According to a fifteenth aspect, an embodiment of the present invention provides a communication method, applicable to an application process of a precoding matrix, and including:

sending, by a radio access network device, signaling to the terminal device, where the signaling includes any one of the following: information about a quantity of block codebooks, information about a quantity of corresponding antenna panels, and a quantity of antenna port groups; and learning, by the terminal device based on any one of the information about the quantity of block codebooks, the information about the quantity of corresponding antenna panels, and the quantity of antenna port groups, of a codebook that needs to be used.

In a feasible design, the antenna port is a channel state information-reference signal port.

According to a sixteenth aspect, an embodiment of the present invention provides a terminal device, including a processor, a memory, and a transceiver, where the memory is configured to store an instruction; the transceiver is used by the terminal device to communicate with another device; and the processor is configured to execute the instruction stored in the memory, to cause the terminal device to perform an operation in any one of the designs according to the twelfth aspect and the thirteenth aspect.

According to a seventeenth aspect, an embodiment of the present invention provides a radio access network device, including a processor, a memory, and a transceiver, where the memory is configured to store an instruction; the transceiver is used by the radio access network device to communicate with another device; and the processor is configured to execute the instruction stored in the memory, to cause the radio access network device to perform an operation in any one of the designs according to the fourteenth aspect and the fifteenth aspect.

According to an eighteenth aspect, an embodiment of the present invention provides a chip system, applicable to a terminal device, and including at least one processor, where the at least one processor is configured to execute a stored instruction, to cause the terminal device to perform an operation in any one of the designs according to the twelfth aspect and the thirteenth aspect.

According to a nineteenth aspect, an embodiment of the present invention provides a chip system, applicable to an radio access network device, and including at least one processor, where the at least one processor is configured to execute a stored instruction, to cause the radio access network device to perform an operation in any one of the designs according to the fourteenth aspect and the fifteenth aspect.

According to a twentieth aspect, an embodiment of the present invention provides a computer program product, applicable to a terminal device. The computer program product includes an instruction, and when being executed, the instruction causes the terminal device to perform an operation in any one of the designs according to the twelfth aspect and the thirteenth aspect. The instruction may be executed by a computing apparatus. For example, the computing apparatus may be a computing and processing circuit in the terminal device or may be a computing and processing circuit outside the terminal device; or the computing apparatus may have one part disposed in the terminal device and the other part disposed outside the terminal device.

According to a twenty-first aspect, an embodiment of the present invention provides a computer program product, applicable to an radio access network device. The computer program product includes an instruction, and when being executed, the instruction causes the radio access network device to perform an operation in any one of the designs according to the fourteenth aspect and the fifteenth aspect. The instruction may be executed by a computing apparatus. For example, the computing apparatus may be a computing and processing circuit in the radio access network device or may be a computing and processing circuit outside the radio access network device; or the computing apparatus may have one part disposed in the radio access network device and the other part disposed outside the radio access network device.

According to a twenty-second aspect, an embodiment of the present invention provides a computer readable storage medium, applicable to a terminal device. The computer readable storage medium stores an instruction, and when being executed, the instruction causes the terminal device to perform an operation in any one of the designs according to the twelfth aspect and the thirteenth aspect.

According to a twenty-third aspect, an embodiment of the present invention provides a computer readable storage medium, applicable to an radio access network device. The computer readable storage medium stores an instruction, and when being executed, the instruction causes the radio access network device to perform an operation in any one of the designs according to the fourteenth aspect and the fifteenth aspect.

According to a twenty-fourth aspect, an embodiment of the present invention provides a terminal device, configured to perform an operation in any one of the designs according to the twelfth aspect and the thirteenth aspect.

According to a twenty-fifth aspect, an embodiment of the present invention provides a radio access network device, configured to perform an operation in any one of the designs according to the fourteenth aspect and the fifteenth aspect.

According to a twenty-sixth aspect, an embodiment of the present invention provides a communications system, including the terminal device according to the sixteenth aspect and the twenty-fourth aspect and/or the radio access network device according to the seventeenth aspect and the twenty-fifth aspect.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Network architectures and business scenarios described in the embodiments of the present invention aim to more clearly describe the technical solutions in the embodiments of the present invention, but are not intended to limit the technical solutions provided in the embodiments of the present invention. Persons of ordinary skill in the art may know that as the network architectures evolve and a new business scenario emerges, the technical solutions provided in the embodiments of the present invention are further applicable to a similar technical problem.

A possible network architecture and a possible application scenario of embodiments of the present invention are first described below with reference to FIG. 1 and FIG. 2.

Figure 1:
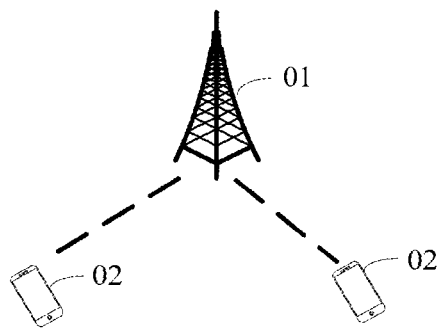
FIG. 1 shows a network architecture to which an embodiment of the present invention is applicable.

FIG. 1 shows a network architecture to which an embodiment of the present invention is applicable. FIG. 2 is a schematic structural diagram of a multi-panel array antenna according to an embodiment of the present invention. As shown in FIG. 1, the network architecture mainly includes a base station 01 and user equipment (User Equipment, UE for short) 02. The base station 01 performs wireless communication with the UE 02.

The UE in the embodiments of the present invention may include various handheld devices having a wireless communication function, an in-vehicle device, a wearable device, a computing device, another processing device connected to a wireless modem, various forms of terminal devices, a mobile station (Mobile Station, MS), or the like. For ease of description, the devices mentioned above are collectively referred to as UE. The base station (Base Station, BS) in the embodiments of the present invention is an apparatus deployed in a radio access network and configured to provide a wireless communication function to a terminal. The base station may include macro base stations, micro base stations, relay stations, and access points in various forms. In systems using different radio access technologies, devices having a function of a base station may have different names, for example, in a Long Term Evolution (Long Term Evolution, LTE) system, the device is referred to as an evolved NodeB (evolved NodeB, eNB or eNodeB), and in a 3G communications system, the device is referred to as a NodeB (Node B). In addition, the device is further applicable to a subsequent evolved system of an LTE system, for example, a 5th Generation (5th Generation, 5G) system. It should be noted that, when the solutions in the embodiments of the present invention are applied to the 5G system or another system that may appear in future, names of the base station and the terminal may be changed. For example, the name of the base station is changed to a transmission/reception point (Transmission Reception Point, TRP for short), but this does not affect implementation of the solutions in the embodiments of the present invention. In the following embodiments, the technical solutions in the embodiments are described in detail by using the TRP as an executing body.

Figure 2:
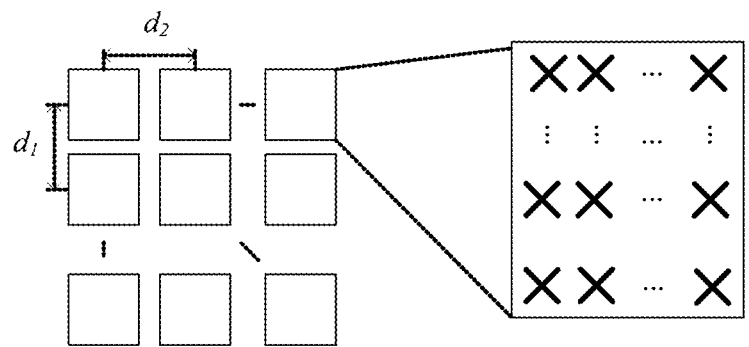
FIG. 2 is a schematic structural diagram of a multi-panel array antenna according to an embodiment of the present invention.

When a massive MIMO system is applied to the network architecture, a configured massive transmit antenna may be shown in FIG. 2. As shown in FIG. 2, the massive transmit antenna may be a multi-antenna panel array antenna. The multi-antenna panel array antenna includes M1 antenna panels in a vertical dimension and M2 antenna panels in a horizontal dimension. In the vertical dimension, in any column of antenna panels, a distance between adjacent antenna panels in a vertical direction is $d_1$, to be specific, a row spacing between adjacent antenna panels in each row is $d_1$. Distances between adjacent antenna panels in the vertical direction may be the same or may be different. In the horizontal dimension, in any row of antenna panels, a distance between adjacent antenna panels in a horizontal direction is $d_2$, to be specific, a column spacing between adjacent antenna panels in each column is $d_2$. Distances between adjacent antenna panels in the horizontal direction may be the same or may be different. In this embodiment, an array antenna is disposed on each antenna panel.

In a process in which the TRP communicates with the UE, the TRP generally performs, by using a precoding matrix, pre-processing on data that needs to be sent, to reduce interference from different data streams of a same user or data streams of different users, thereby improving system performance. Information required by the TRP to perform pre-processing is based on measurement information of a downlink channel that is fed back by the UE. The UE performs channel estimation according to a reference signal sent by the TRP, for example, a channel state information-reference signal (Channel State Information Reference Signal, CSI-RS for short), and determines channel state information (Channel State Information, CSI for short) based on an estimation result. The CSI includes information such as a transmission rank (a quantity of data layers for transmission), a precoding matrix indicator (precoding matrix indicator, PMI for short), and a channel quality indicator (channel quality indicator, CQI for short). Subsequently, the UE feeds back the determined CSI to the TRP, as a reference for performing downlink scheduling and data transmission by the TRP.

Generally, for each rank, a particular quantity of precoding matrices are used to indicate quantized channels. These designed precoding matrices form a codebook. Each precoding matrix in the codebook corresponds to one or more codebook indexes. Generally, there is a correspondence between a codebook index and a corresponding PMI. The codebook is predefined. The TRP and the UE both store the corresponding codebook, and have a common understanding of a correspondence between each precoding matrix in the codebook, a codebook index, and a PMI. When the UE selects, based on an estimated downlink channel, a precoding matrix from the defined codebook, and determines a codebook index of the precoding matrix, the UE only needs to feed back a PMI corresponding to the selected precoding matrix to the TRP. The TRP may determine the specific precoding matrix based on the PMI fed back by the UE.

To resolve a problem that an existing codebook is applicable only to a linear array and is not applicable to a multi-panel antenna array with uneven row spacings or column spacings, namely, a problem that the existing codebook is not applicable to a structure similar to that of the antenna array shown in FIG. 2, an embodiment provides a codebook-based channel state information feedback method. In the method, a new codebook structure is provided to be applicable to a multi-panel antenna array. The method provided in this embodiment of the present invention is described in detail below by using a specific embodiment. In the following embodiment, the name of the base station is changed to the TRP.

Figure 3:
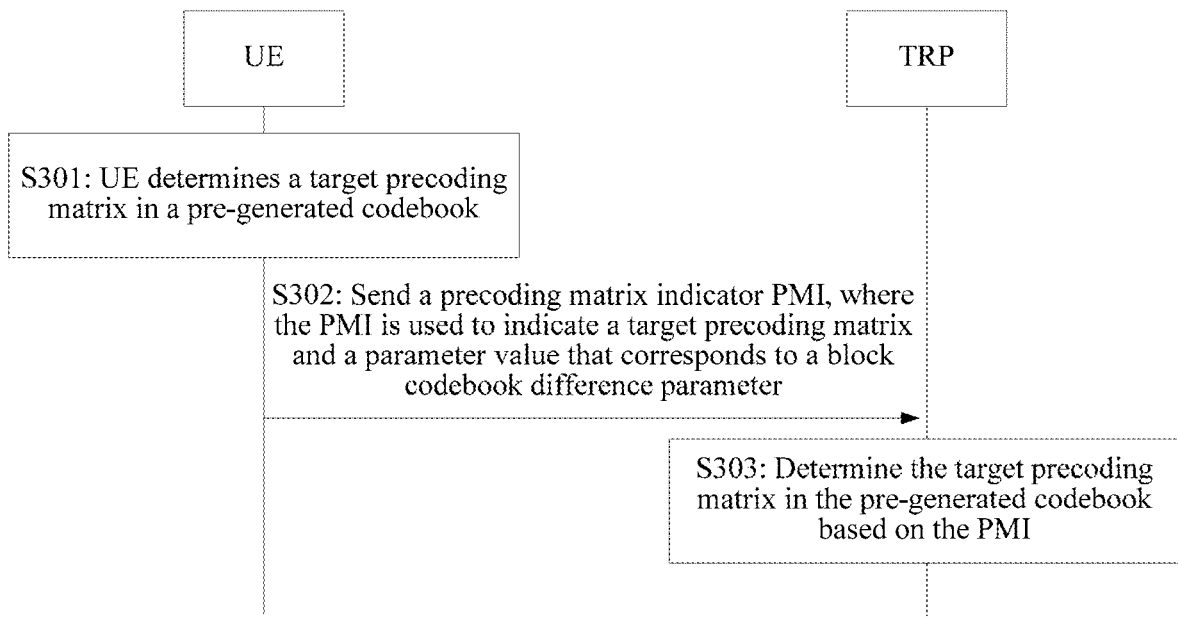
FIG. 3 is a schematic flowchart of a codebook-based channel state information feedback method according to an embodiment of the present invention.

FIG. 3 is a schematic flowchart of a codebook-based channel state information feedback method according to an embodiment of the present invention. As shown in FIG. 3, the method includes the following steps:

S301: UE determines a target precoding matrix in a pre-generated codebook.

S302: The UE sends a precoding matrix indicator PMI to a TRP, where the PMI is used to indicate a target precoding matrix and a parameter value that corresponds to a block codebook difference parameter.

S303: The TRP determines the target precoding matrix in the pre-generated codebook based on the PMI.

In this embodiment, S301 and S302 are optional steps. In this embodiment, a process in which the UE sends the PMI to the TRP, and a process in which the TRP receives the PMI sent by the UE are mainly related.

During specific implementation, the TRP preconfigures a reference signal for the UE. The reference signal may be specifically a CSI-RS. The UE performs channel estimation based on the reference signal, and selects the target precoding matrix from the pre-generated codebook according to a preset criterion. The preset criterion may be a maximum channel capacity criterion, a maximum transport block size criterion, a maximum signal to interference plus noise ratio criterion, or the like. In this embodiment of the present invention, a specific implementation process in which the UE selects the target precoding matrix from the codebook is not particularly limited. It may be learned from the above that, each precoding matrix in the codebook corresponds to one or more codebook indexes. Generally, there is a correspondence between a codebook index and a corresponding PMI. Therefore, the PMI may be used to indicate the precoding matrix.

In S302, after obtaining the target precoding matrix, the UE may determine, based on the foregoing correspondence, the PMI used to indicate the target precoding matrix, and send the PMI to a base station. In this embodiment, the PMI may indicate the target precoding matrix, and may further indicate the parameter value that corresponds to the block codebook difference parameter.

The target precoding matrix is a precoding matrix in the codebook, namely, a precoding matrix selected from the codebook. A structure of the codebook provided in this embodiment of the present invention is described below.

In this embodiment, at least some precoding matrices in the codebook are obtained through transformation from precoding matrices in block codebooks and the parameter value that corresponds to the block codebook difference parameter. There are at least two block codebooks, and the block codebook is formed based on a preset precoding matrix.

For example, in a horizontal dimension, there are M1 block codebooks, and in a vertical dimension, there are M2 block codebooks. M1 is a quantity of antenna panels in the horizontal dimension, and M2 is a quantity of antenna panels in the vertical dimension. To be specific, there is a correspondence between a quantity of block codebooks and a quantity of antenna panels. To be specific, a block codebook in the horizontal dimension corresponds to an antenna panel in the horizontal dimension, and a block codebook in the vertical dimension corresponds to an antenna panel in the vertical dimension.

A precoding matrix in each block codebook is formed based on a vector. The vector may be, for example, a discrete Fourier transform (Discrete Fourier Transform, DFT for short) vector. There is a correspondence between a length of the vector and a quantity of CSI-RS ports on an antenna panel. For example, if in the horizontal dimension, there are $K_1$ CSI-RS ports on each panel, a length of a vector corresponding to a precoding matrix in a block codebook in the horizontal dimension is $K_1$; and if in the vertical dimension, there are $K_2$ CSI-RS ports on each panel, a length of a vector corresponding to a precoding matrix in a block codebook in the vertical dimension is $K_2$.

The block codebook difference parameter may be a difference parameter such as a phase difference or a modulus value difference. The precoding matrix in the codebook may be obtained through transformation from the precoding matrix in the block codebook and the parameter value that corresponds to the block codebook difference parameter. The transformation may be a multiplication operation or a division operation of the two, or another operation relationship. This is not particularly limited in this embodiment.

Optionally, there is a correspondence between a quantity of parameter values and a quantity of block codebooks. For example, the quantity of parameter values and the quantity of block codebooks may be equal, or the quantity of parameter values may be less than the quantity of block codebooks. For example, when a phase difference between adjacent panels in the horizontal dimension is discussed, because each panel corresponds to one block codebook, a quantity of phase differences is 1 less than the quantity of block codebooks.

Further, the UE may obtain, from a codebook configuration parameter, the quantity of block codebooks in the codebook and the length of the vector corresponding to the precoding matrix in the block codebook. In this embodiment, the codebook configuration parameter includes the quantity of block codebooks in the codebook and the length of the vector corresponding to the precoding matrix in the block codebook.

Optionally, the codebook configuration parameter is sent by the TRP to the UE in advance. For example, the TRP may send higher layer signaling or physical layer signaling to the UE. The higher layer signaling or the physical layer signaling carries the codebook configuration parameter. For example, the higher layer signaling may be Radio Resource Control (Radio Resource Control, RRC) signaling, and the physical layer signaling may be downlink control information (Downlink Control Information, DCI).

Correspondingly, as described above, when the block codebooks include a block codebook in the horizontal dimension and a block codebook in the vertical dimension, the codebook configuration parameter includes a quantity of block codebooks in the horizontal dimension and a length of a vector corresponding to a precoding matrix in the block codebook in the horizontal dimension, where there are at least two block codebooks in the horizontal dimension; and a quantity of block codebooks in the vertical dimension and a length of a vector corresponding to a precoding matrix in the block codebook in the vertical dimension, where there are at least two block codebooks in the vertical dimension.

Optionally, in S302, the PMI sent by the UE to the TRP may be specifically implemented in the following implementation.

In a feasible implementation, the PMIs include a first PMI corresponding to wideband CSI and a second PMI corresponding to subband CSI, and the first PMI or the second PMI is used to indicate the parameter value that corresponds to the block codebook difference parameter.

During specific implementation, existing PMIs include a first PMI and a second PMI, and an indicator field may be added to the first PMI or the second PMI. The indicator field is used to indicate a parameter value that corresponds to a block codebook difference parameter. Specifically, an index number may be set in the indicator field for a parameter value, and different index numbers correspond to different parameter values.

In another feasible implementation, the PMIs include a first PMI corresponding to wideband CSI, a second PMI corresponding to narrowband CSI, and a third PMI, and the third PMI is used to indicate the parameter value that corresponds to the block codebook difference parameter.

During specific implementation, the third PMI may be added, and the third PMI is used to indicate the parameter value that corresponds to the block codebook difference parameter.

In S303, after the base station obtains the PMI, because the base station also generates a corresponding codebook based on the codebook configuration parameter, the base station may determine the specific target precoding matrix based on the PMI fed back by the UE. For example, the first PMI corresponds to two codebook indexes, and the second PMI corresponds to one codebook index; and the base station may determine a specific target precoding matrix based on a codebook index.

According to the codebook-based channel state information feedback method provided in this embodiment, the UE sends the precoding matrix indicator PMI to the TRP. The PMI is used to indicate the target precoding matrix and the parameter value that corresponds to the block codebook difference parameter. The target precoding matrix is a precoding matrix in the codebook; and the at least some precoding matrices in the codebook are obtained through transformation from the precoding matrices in the block codebook and the parameter value, to introduce the parameter value that corresponds to the block codebook difference parameter to the codebook, so that the codebook includes difference parameters such as a phase difference and a modulus value difference between adjacent panels, thereby ensuring beam directivity and improving system performance.

A structure of the precoding matrix in the codebook in this embodiment of the present invention is described in detail below by using a specific embodiment.

Figure 4:
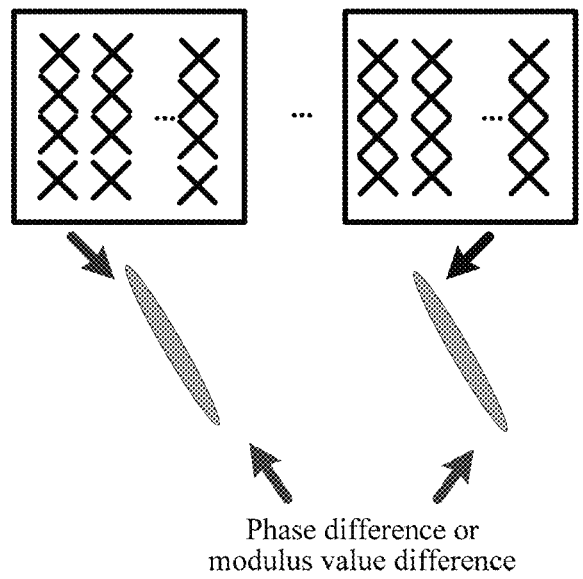
FIG. 4 is a first schematic diagram of an antenna panel and a beam according to an embodiment of the present invention.

First, a structure of the precoding matrix in the codebook when a DFT vector corresponding to each block codebook is a DFT vector corresponding to a beam at a same radiation angle is described below. FIG. 4 is a first schematic diagram of an antenna panel and a beam according to an embodiment of the present invention. As shown in FIG. 4, a DFT vector corresponding to each block codebook is a DFT vector corresponding to a beam at a same radiation angle. The DFT vectors corresponding to the block codebooks are combined into a DFT vector corresponding to a transmit beam in a splicing manner or the like.

Optionally, in a feasible design, all antenna ports may be grouped into N groups (a value of N may be 2, 4, 8, or the like). There are $K_1$ CSI-RS ports in a horizontal dimension in each group, and there are $K_2$ CSI-RS ports in a vertical dimension in each group. For a cross polarization antenna, a total quantity of antenna ports is $2*N*K_1*K_2$. If the block codebook difference parameter is a phase difference, the structure of the precoding matrix in the codebook is specifically shown in the following formula 1.1:

$$W = \frac{1}{\sqrt{2NK_1K_2}} W_3 W_1 W_2, \text{ where}$$

$$W_3 = \begin{bmatrix} I_{2K_1K_2} & 0 & \cdots & 0 \\ 0 & e^{j\theta_1} \cdot I_{2K_1K_2} & \cdots & 0 \\ \vdots & \vdots & \ddots & \vdots \\ 0 & 0 & \cdots & e^{j\theta_{N-1}} \cdot I_{2K_1K_2} \end{bmatrix},$$

$$W_1 = \begin{bmatrix} B_1^{(1)} & 0 & \cdots & 0 & 0 \\ 0 & B_2^{(1)} & \cdots & 0 & 0 \\ \vdots & \vdots & \ddots & \vdots & \vdots \\ 0 & 0 & \cdots & B_1^{(N)} & 0 \\ 0 & 0 & \cdots & 0 & B_2^{(N)} \end{bmatrix}, \text{ and } W_2 = \begin{bmatrix} e_{i_1}^{(B)} \\ \varphi_n e_{i_1}^{(B)} \\ \vdots \\ e_{i_N}^{(B)} \\ \varphi_n e_{i_N}^{(B)} \end{bmatrix},$$

where $W_3$ is indicated by a third PMI $i_{3,r}$, where $r=1, \ldots N-1$, and the third PMI may be a wideband PMI; for example, $\theta_r = 2\pi i_{3,r}/X$, where X can be a value in a set $\{2, 4, 8, \ldots\}$; $I_{2K_1K_2}$ represents a unit matrix whose dimension is $2K_1K_2 \times 2K_1K_2$; $W_1$ is indicated by a first PMI, and the first PMI is a wideband PMI; $B_1^{(1)}$, $B_2^{(1)}$, $B_1^{(N)}$, and $B_2^{(N)}$ represent matrices whose dimensions are $K_1K_2 \times B$, where each column corresponds to one DFT vector; $W_2$ is indicated by a second PMI, and the second PMI is a subband PMI; $e_i^{(B)}$ is a vector whose dimension is $B \times 1$, where an $i^{th}$ element is 1, and remaining elements are 0; $\varphi_n = e^{j\pi n/2}$ represents a phase difference between two polarization directions of an antenna; n represents a function of the second PMI; e represents a natural constant; j represents a unit imaginary number; and π represents the circular ratio.

In a feasible design, all antenna ports may be grouped into N groups (a value of N may be 2, 4, 8, or the like). There are $K_1$ CSI-RS ports in a horizontal dimension in each group, and there are $K_2$ CSI-RS ports in a vertical dimension in each group. Therefore, a total quantity of antenna ports is $2*N*K_1*K_2$ (corresponding to a dual-polarized antenna). If the block codebook difference parameter is a phase difference, the structure of the precoding matrix in the codebook is specifically shown in the following formula 1.1:

$$W = \frac{1}{\sqrt{2NK_1K_2}} W_1 W_3 W_2, \text{ where}$$

$$W_1 = \begin{bmatrix} B_1^{(1)} & 0 & \cdots & 0 & 0 \\ 0 & B_2^{(1)} & \cdots & 0 & 0 \\ \vdots & \vdots & \ddots & \vdots & \vdots \\ 0 & 0 & \cdots & B_1^{(N)} & 0 \\ 0 & 0 & \cdots & 0 & B_2^{(N)} \end{bmatrix},$$

$$W_3 = \begin{bmatrix} I_{2B} & 0 & \cdots & 0 \\ 0 & e^{j\theta_1} I_{2B} & \cdots & 0 \\ \vdots & \vdots & \ddots & \vdots \\ 0 & 0 & \cdots & e^{j\theta_{N-1}} I_{2B} \end{bmatrix}, \text{ and } W_2 = \begin{bmatrix} e_{i_1}^{(B)} \\ \varphi_n e_{i_1}^{(B)} \\ \vdots \\ e_{i_N}^{(B)} \\ \varphi_n e_{i_N}^{(B)} \end{bmatrix},$$

where $W_3$ is indicated by a third PMI $i_{3,r}$ where $r=1, \ldots N-1$, and the third PMI may be a wideband PMI or may be a subband PMI; for example, $\theta_r = 2\pi i_{3,r}/X$, where X can be a value in a set $\{2, 4, 8, \ldots\}$; $I_{2B}$ represents a unit matrix whose dimension is $2B \times 2B$; $W_1$ is indicated by a first PMI, and the first PMI is a wideband PMI; $B_1^{(1)}$, $B_2^{(1)}$, $B_1^{(N)}$, and $B_2^{(N)}$ represent matrices whose dimensions are $K_1K_2 \times B$, where each column corresponds to one DFT vector; $W_2$ is indicated by a second PMI, and the second PMI is a subband PMI; $e_i^{(B)}$ is a vector whose dimension is B×1, where an $i^{th}$ element is 1, and remaining elements are 0; $\varphi_n = e^{j\pi n/2}$ represents a phase difference between two polarization directions of an antenna; n represents a function of the second PMI; e represents a natural constant; j represents a unit imaginary number; and π represents the circular ratio.

In a feasible design, all antenna ports may be grouped into N groups (a value of N may be 2, 4, 8, or the like). There are $K_1$ CSI-RS ports in a horizontal dimension in each group, and there are $K_2$ CSI-RS ports in a vertical dimension in each group. Therefore, a total quantity of antenna ports is $2*N*K_1*K_2$ (corresponding to a dual-polarized antenna). If the block codebook difference parameter is a phase difference, the structure of the precoding matrix in the codebook may be specifically shown as follows:

$$W = \frac{1}{\sqrt{2NK_1K_2}} W_1 W_2, \text{ where}$$

$$W_1 = \begin{bmatrix} B_1^{(1)} & 0 & \cdots & 0 & 0 \\ 0 & B_2^{(1)} & \cdots & 0 & 0 \\ \vdots & \vdots & \ddots & \vdots & \vdots \\ 0 & 0 & \cdots & B_1^{(N)} & 0 \\ 0 & 0 & \cdots & 0 & B_2^{(N)} \end{bmatrix}, \text{ and } W_2 = \begin{bmatrix} \begin{pmatrix} e_{i_1}^{(B)} \\ \varphi_n e_{i_1}^{(B)} \end{pmatrix} \\ e^{j\theta_1}\begin{pmatrix} e_{i_2}^{(B)} \\ \varphi_n e_{i_2}^{(B)} \end{pmatrix} \\ \vdots \\ e^{j\theta_{N-1}}\begin{pmatrix} e_{i_N}^{(B)} \\ \varphi_n e_{i_N}^{(B)} \end{pmatrix} \end{bmatrix},$$

where $W_1$ is indicated by a first PMI, and the first PMI may be a wideband PMI; $B_1^{(1)}$, $B_2^{(1)}$, $B_1^{(N)}$, and $B_2^{(N)}$ represent matrices whose dimensions are $K_1K_2 \times B$, where each column corresponds to one DFT vector; $W_2$ is indicated by a second PMI, and the second PMI may be a subband PMI; $e_i^{(B)}$ is a vector whose dimension is B×1, where an $i^{th}$ element is 1, and remaining elements are 0; $\varphi_n = e^{j\pi n/2}$ represents a phase difference between two polarization directions of an antenna; n represents a function of the second PMI; $\theta_r = 2\pi i_{2,r}/X$, where r=1, ... N−1, and X can be a value in a set {2, 4, 8, ...}; e represents a natural constant; j represents a unit imaginary number; and π represents the circular ratio;

or, $$W = \frac{1}{\sqrt{2NK_1K_2}} W_1 W_2 W_3, \text{ where}$$

$$W_1 = \begin{bmatrix} B_1^{(1)} & 0 & \cdots & 0 & 0 \\ 0 & B_2^{(1)} & \cdots & 0 & 0 \\ \vdots & \vdots & \ddots & \vdots & \vdots \\ 0 & 0 & \cdots & B_1^{(N)} & 0 \\ 0 & 0 & \cdots & 0 & B_2^{(N)} \end{bmatrix},$$

$$W_2 = \begin{bmatrix} e_{i_1}^{(K_1K_2)} & 0 & 0 & \cdots & 0 \\ 0 & \varphi_n e_{i_1}^{(K_1K_2)} & 0 & \cdots & 0 \\ \cdots & \cdots & \ddots & \cdots & \cdots \\ 0 & 0 & \cdots & e_{i_N}^{(K_1K_2)} & 0 \\ 0 & 0 & \cdots & 0 & \varphi_n e_{i_1}^{(K_1K_2)} \end{bmatrix}, \text{ and } W_3 = \begin{bmatrix} 1 \\ 1 \\ e^{j\theta_1} \\ e^{j\theta_1} \\ \vdots \\ e^{j\theta_{N-1}} \\ e^{j\theta_{N-1}} \end{bmatrix},$$

where $W_1$ is indicated by a first PMI, and the first PMI may be a wideband PMI; $B_1^{(1)}$, $B_2^{(1)}$, $B_1^{(N)}$, and $B_2^{(N)}$ represent matrices whose dimensions are $K_1K_2 \times B$, where each column corresponds to one DFT vector; $W_2$ is indicated by a second PMI, and the second PMI is a subband PMI; $e_i^{(K_1K_2)}$ is a vector whose dimension is $K_1K_2 \times 1$, where an $i^{th}$ element is 1, and remaining elements are 0; $\varphi_n = e^{j\pi n/2}$ represents a phase difference between two polarization directions of an antenna; n represents a function of the second PMI; $W_3$ is indicated by a third PMI $i_{3,r}$ where r=1, ... N−1, and the third PMI may be a subband PMI; for example, $\theta_r = 2\pi i_{3,r}/X$, where X can be a value in a set {2, 4, 8, ...}; e represents a natural constant; j represents a unit imaginary number; and π represents the circular ratio.

In a feasible design, all antenna ports are grouped into N groups (a value of N may be 2, 4, 8, or the like). There are $K_1$ CSI-RS ports in a horizontal dimension in each group, and there are $K_2$ CSI-RS ports in a vertical dimension in each group. Therefore, a total quantity of antenna ports is $2*N*K_1*K_2$ (corresponding to a dual-polarized antenna). Using a rank 1 as an example, if the block codebook difference parameter is a phase difference, the structure of the precoding matrix in the codebook may be as follows:

$$W_{l,m,c_{0,0,1},c_{0,1,1},\cdots,c_{N-1,0,1},c_{N-1,1,1}}^{(1)} = \frac{1}{\sqrt{2NK_1K_2}} \begin{pmatrix} c_{0,0,1} b_{l,m} \\ c_{0,1,1} b_{l,m} \\ \vdots \\ c_{N-1,0,1} b_{l,m} \\ c_{N-1,1,1} b_{l,m} \end{pmatrix},$$

where N may represent a quantity of antenna port groups or may represent a quantity of antenna panels; $c_{0,0,1}$, $c_{0,1,1}, \ldots, c_{N-1,0,1}, c_{N-1,1,1}$ represent phase factors or phase differences between antenna port groups, or represent phase factors or phase differences between antenna ports on different antenna panels, or represent phase factors or phase differences between antenna ports in different polarization directions; $c_{0,0,1}$, $c_{0,1,1}$, ..., $c_{N-1,0,1}$, $c_{N-1,1,1}$ may be a function of a first PMI, a second PMI, or a third PMI; the first PMI is a wideband PMI, the second PMI is a subband PMI, and the third PMI may be a wideband PMI or a subband PMI; $b_{l,m}$ represents a two-dimensional DFT vector whose length is $K_1*K_2$, for example, may be a Kronecker product of two one-dimensional DFT vectors; and l and m each represent a function of the first PMI, and the first PMI may be a wideband PMI.

For example, the structure of the precoding matrix in the codebook is specifically shown in the following formula 1.1:

$$W_{l,m,n,\theta_1,\ldots,\theta_{N-1}}^{(1)} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ e^{j\theta_{N-1}}\begin{pmatrix} v_l \otimes u_m \\ \varphi_n v_l \otimes u_m \end{pmatrix} \end{bmatrix} \quad \text{Formula 1.1}$$

where $\varphi_n = e^{j\pi n/2}$ represents a phase difference or a phase factor between two polarization directions of an antenna, where n represents a function of a second PMI, and a value is $\{0, 1, 2, 3\}$, and the second PMI may be a wideband PMI or may be a subband PMI; e represents a natural constant; j represents a unit imaginary number; π represents the circular ratio;

$$v_l = \left[ 1 \quad e^{j\frac{2\pi l}{O_1 K_1}} \quad \ldots \quad e^{j\frac{2\pi l(K_1-1)}{O_1 \cdot K_1}} \right]^T,$$

where $v_l$ represents a DFT vector whose length is $K_1$, and $K_1$ is the quantity of CSI-RS ports in the horizontal dimension in each group;

$$u_m = \left[ 1 \quad e^{j\frac{2\pi m}{O_2 K_2}} \quad \ldots \quad e^{j\frac{2\pi m(K_2-1)}{O_2 \cdot K_2}} \right]^T,$$

where $u_m$ represents a DFT vector whose length is $K_2$, and $K_2$ is the quantity of CSI-RS ports in the vertical dimension in each group; $(\theta_1 \ldots \theta_{N-1})$ represent phase difference parameters or phase factors between different antenna port groups, or represent phase difference parameters or phase factors between antenna panels; values of $(e^{j\theta_1} \ldots e^{j\theta_{N-1}})$ may be $\{+1, -1, +j, -j\}$; $O_1$ and $O_2$ represent over-sampling factors; ⊗ represents a Kronecker product; and N may represent a quantity of antenna port groups or may represent a quantity of antenna panels.

Similarly, in a multi-panel codebook with a rank being r, (r may be equal to 2, 3, or 4), antenna port groups on different layers may use same $(\theta_1 \ldots \theta_{N-1})$. This is similar in the following embodiment, and details are not described again. For example, a structure of a codebook with a rank 2 may be as follows:

$$W^{(2)}_{l,m,n,\theta_1,\ldots,\theta_{N-1}} =$$

$$\frac{1}{\sqrt{2NK_1K_2}} \begin{bmatrix} v_{l_1} \otimes u_{m_1} & v_{l_2} \otimes u_{m_2} \\ \varphi_n v_{l_1} \otimes u_{m_1} & \varphi_n v_{l_2} \otimes u_{m_2} \\ e^{j\theta_1}\begin{pmatrix} v_{l_1} \otimes u_{m_1} \\ \varphi_n v_{l_1} \otimes u_{m_1} \end{pmatrix} & e^{j\theta_1}\begin{pmatrix} v_{l_2} \otimes u_{m_2} \\ \varphi_n v_{l_2} \otimes u_{m_2} \end{pmatrix} \\ \vdots & \vdots \\ e^{j\theta_{N-1}}\begin{pmatrix} v_{l_1} \otimes u_{m_1} \\ \varphi_n v_{l_1} \otimes u_{m_1} \end{pmatrix} & e^{j\theta_{N-1}}\begin{pmatrix} v_{l_2} \otimes u_{m_2} \\ \varphi_n v_{l_2} \otimes u_{m_2} \end{pmatrix} \end{bmatrix},$$

where $v_{l_1} \otimes u_{m_1}$ represents a precoding matrix corresponding to each antenna port group on a first data layer; $v_{l_2} \otimes u_{m_2}$ represents a precoding matrix corresponding to each antenna port group on a second data layer; a corresponding PMI feedback method is similar to that with the rank 1; and $\varphi_n = e^{j\pi n/2}$ represents a phase difference between two polarization directions of an antenna; n represents a function of the second PMI, and a value is $\{0, 1, 2, 3\}$; e represents a natural constant; j represents a unit imaginary number; π represents the circular ratio;

$$v_l = \left[ 1 \quad e^{j\frac{2\pi l}{O_1 K_1}} \quad \ldots \quad e^{j\frac{2\pi l(K_1-1)}{O_1 \cdot K_1}} \right]^T,$$

where $v_l$ represents a DFT vector whose length is $K_1$, $K_1$ is the quantity of CSI-RS ports in the horizontal dimension in each group, and l=1 or 2;

$$u_m = \left[ 1 \quad e^{j\frac{2\pi m}{O_2 K_2}} \quad \ldots \quad e^{j\frac{2\pi m(K_2-1)}{O_2 \cdot K_2}} \right]^T,$$

where $u_m$ represents a DFT vector whose length is $K_2$, $K_2$ is the quantity of CSI-RS ports in the vertical dimension in each group, and m=1 or 2; $(\theta_1 \ldots \theta_{N-1})$ represent phase difference parameters or phase factors between different antenna port groups, or represent phase difference parameters or phase factors between antenna panels; values of $(e^{j\theta_1} \ldots e^{j\theta_{N-1}})$ may be $\{+1, -1, +j, -j\}$; $O_1$ and $O_2$ represent over-sampling factors; ⊗ represents a Kronecker product; and N may represent a quantity of antenna port groups or may represent a quantity of antenna panels.

Alternatively, a structure of a matrix in a codebook with the rank 1 may be as follows:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ e^{j\theta_{N-1}}\begin{pmatrix} v_{l,m} \\ \varphi_n v_{l,m} \end{pmatrix} \end{bmatrix}, \text{ where}$$

$$v_{l,m} = \left[ u_m \quad e^{j\frac{2\pi l}{O_1 K_1}} u_m \quad \ldots \quad e^{j\frac{2\pi l(K_1-1)}{O_1 \cdot K_1}} u_m \right]^T,$$

where i where $v_{l,m}$ represents a vector whose length is $K_1 \times K_2$, and $K_1$ is the quantity of CSI-RS ports in the horizontal dimension in each group;

$$u_m = \left[ 1 \quad e^{j\frac{2m}{O_2 K_2}} \quad \ldots \quad e^{j\frac{2\pi m(K_2-1)}{O_2 \cdot K_2}} \right]^T \text{ or}$$

$$u_m = \left[ 1 \quad e^{j\frac{2\pi m}{O_2 K_2}} \quad \ldots \quad e^{j\frac{2\pi m(K_2-1)}{O_2 \cdot K_2}} \right],$$

where $u_m$ represents a DFT vector whose length is $K_2$, and $K_2$ is the quantity of CSI-RS ports in the vertical dimension in each group; l and m each represent a function of a first PMI, and the first PMI may be a wideband PMI; $\varphi_n = e^{j\pi n/2}$ represents a phase difference between two polarization directions of an antenna, where n represents a function of a second PMI, and a value is $\{0, 1, 2, 3\}$, and the second PMI may be a wideband PMI or may be a subband PMI; e represents a natural constant; j represents a unit imaginary number; π represents the circular ratio; $(\theta_1 \ldots \theta_{N-1})$ represent phase difference parameters or phase factors between different antenna port groups, or represent phase difference parameters or phase factors between antenna panels; values of $(e^{j\theta_1} \ldots e^{j\theta_{N-1}})$ may be $\{+1, -1, +j, -j\}$; $O_1$ and $O_2$ represent over-sampling factors; ⊗ represents a Kronecker product; and N may represent a quantity of antenna port groups or may represent a quantity of antenna panels.

Correspondingly, a structure of a matrix in a codebook with the rank 2 may be as follows:

$$W^{(2)}_{l,m,n,\theta_1,\ldots,\theta_{N-1}} = \frac{1}{\sqrt{2NK_1K_2}} \begin{bmatrix} v_{l_1,m_1} & v_{l_2,m_2} \\ \varphi_n v_{l_1,m_1} & \varphi_n v_{l_2,m_2} \\ e^{j\theta_1}\begin{pmatrix} v_{l_1,m_1} \\ \varphi_n v_{l_1,m_1} \end{pmatrix} & e^{j\theta_1}\begin{pmatrix} v_{l_2,m_2} \\ \varphi_n v_{l_2,m_2} \end{pmatrix} \\ \vdots & \vdots \\ \vdots & \vdots \\ e^{j\theta_{N-1}}\begin{pmatrix} v_{l_1,m_1} \\ \varphi_n v_{l_1,m_1} \end{pmatrix} & e^{j\theta_{N-1}}\begin{pmatrix} v_{l_2,m_2} \\ \varphi_n v_{l_2,m_2} \end{pmatrix} \end{bmatrix},$$

where $v_{l_1,m_1}$ represents a precoding matrix corresponding to each antenna port group on a first data layer; $v_{l_2,m_2}$ represents a precoding matrix corresponding to each antenna port group on a second data layer; a corresponding PMI feedback method is similar to that with the rank 1; and $$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where $v_{l,m}$ represents a vector whose length is $K_1 \times K_2$, and $K_1$ is the quantity of CSI-RS ports in the horizontal dimension in each group; l=1 or 2; m=1 or 2;

$$u_m = \begin{bmatrix} 1 & e^{j\frac{2\pi n}{O_2 K_2}} & \ldots & e^{j\frac{2\pi n(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, $K_2$ is the quantity of CSI-RS ports in the vertical dimension in each group, and m=1 or 2; l and m each represent a function of a first PMI, and the first PMI may be a wideband PMI; $\varphi_n = e^{j\pi n/2}$ represents a phase difference between two polarization directions of an antenna; n represents a function of the second PMI, and a value is {0, 1, 2, 3}; e represents a natural constant; j represents a unit imaginary number; π represents the circular ratio; $(\theta_1 \ldots \theta_{N-1})$ represent phase difference parameters or phase factors between different antenna port groups, or represent phase difference parameters or phase factors between antenna panels; values of $(e^{j\theta_1} \ldots e^{j\theta_{N-1}})$ may be {+1, −1, +j, −j}; $O_1$ and $O_2$ represent over-sampling factors; ⊗ represents a Kronecker product; and N may represent a quantity of antenna port groups or may represent a quantity of antenna panels;

or, $$W^{(1)}_{l,m,n,a_1,\ldots,a_{N-1}} = \frac{1}{\sqrt{2NK_1K_2}} \begin{bmatrix} a_1\begin{pmatrix} v_{l,m} \\ \varphi_n v_{l,m} \end{pmatrix} \\ a_2\begin{pmatrix} v_{l,m} \\ \varphi_n v_{l,m} \end{pmatrix} \\ \vdots \\ \vdots \\ a_N\begin{pmatrix} v_{l,m} \\ \varphi_n v_{l,m} \end{pmatrix} \end{bmatrix},$$

where $(a_1, \ldots, a_N)$ represent amplitude factors, and $0 \leq a_1, \ldots, a_N \leq 1$.

(1) Optionally, PMIs fed back by a user equipment to the base station include a first PMI, a second PMI, and a third PMI. The first PMI corresponds to two codebook indexes. For ease of description, the two codebook indexes are referred to as a first horizontal codebook index and a first vertical codebook index. The second PMI corresponds to a second codebook index. The third PMI corresponds to a third codebook index. A value of n is indicated by the second codebook index. A value of m is indicated by the first vertical codebook index or indicated by the first vertical codebook index and the second codebook index. A value of l is indicated by the first horizontal codebook index or indicated by the first horizontal codebook index and the second codebook index. $(\theta_1 \ldots \theta_{N-1})$ may be indicated by the third codebook index. For example, the third codebook index includes a plurality of values $i_{3,r}$, where r=1, ..., N−1, and $\theta_r = 2\pi i_{3,r}/X$, where X can be a value in a set {2, 4, 8, ...}. A specific example of the codebook when N=2 is provided below:

| | | | | $i_2$ | | | |
|---|---|---|---|---|---|---|---|
| $i_{3,1}$ | $i_{3,2}$ | $i_{1,1}$ | $i_{1,2}$ | 0 | 1 | 2 | 3 |
| 0, 1, 2, 3 | 0, 1, 2, 3 | 0, 1, ..., $O_1N_1-1$ | 0, 1, ..., $O_2N_2-1$ | $W^{(1)}_{i_{1,1},i_{1,2},0,i_{3,1},i_{3,2}}$ | $W^{(1)}_{i_{1,1},i_{1,2},1,i_{3,1},i_{3,2}}$ | $W^{(1)}_{i_{1,1},i_{1,2},2,i_{3,1},i_{3,2}}$ | $W^{(1)}_{i_{1,1},i_{1,2},3,i_{3,1},i_{3,2}}$ |

$$W^{(1)}_{l,m,n,p,q} = \begin{bmatrix} e^{j2\pi p/X}\begin{pmatrix} v_l \otimes u_m \\ \varphi_n v_l \otimes u_m \end{pmatrix} \\ e^{j2\pi q/X}\begin{pmatrix} v_l \otimes u_m \\ \varphi_n v_l \otimes u_m \end{pmatrix} \end{bmatrix} \cdot \frac{1}{\sqrt{4K_1K_2}} \text{ or } W^{(1)}_{l,m,n,p,q} = \begin{bmatrix} e^{j2\pi p/X}\begin{pmatrix} v_{l,m} \\ \varphi_n v_{l,m} \end{pmatrix} \\ e^{j2\pi q/X}\begin{pmatrix} v_{l,m} \\ \varphi_n v_{l,m} \end{pmatrix} \end{bmatrix} \cdot \frac{1}{\sqrt{4K_1K_2}} \text{ or}$$

-continued

| | | | $i_2$ | | | |
|---|---|---|---|---|---|---|
| $i_{3,1}$ | $i_{1,1}$ | $i_{1,2}$ | 0 | 1 | 2 | 3 |
| 0, 1, 2, 3 | 0, 1, ..., $O_1N_1-1$ | 0, 1, ..., $O_2N_2-1$ | $W_{i_{1,1},i_{1,2},0,i_{3,1}}^{(1)}$ | $W_{i_{1,1},i_{1,2},1,i_{3,1}}^{(1)}$ | $W_{i_{1,1},i_{1,2},2,i_{3,1}}^{(1)}$ | $W_{i_{1,1},i_{1,2},3,i_{3,1}}^{(1)}$ |

$$W_{l,m,n,q}^{(1)} = \begin{bmatrix} \begin{pmatrix} v_l \otimes u_m \\ \varphi_n v_l \otimes u_m \end{pmatrix} \\ e^{j2\pi q/X} \begin{pmatrix} v_l \otimes u_m \\ \varphi_n v_l \otimes u_m \end{pmatrix} \end{bmatrix} \cdot \frac{1}{\sqrt{4K_1K_2}} \text{ or } W_{l,m,n,q}^{(1)} = \begin{bmatrix} \begin{pmatrix} v_{l,m} \\ \varphi_n v_{l,m} \end{pmatrix} \\ e^{j2\pi q/X} \begin{pmatrix} v_{l,m} \\ \varphi_n v_{l,m} \end{pmatrix} \end{bmatrix} \cdot \frac{1}{\sqrt{4K_1K_2}}$$

The first PMI is a wideband PMI, the second PMI is a subband PMI, and the third PMI may be a wideband PMI or may be a subband PMI.

(2) Optionally, PMIs fed back by a user equipment to the base station include a first PMI and a second PMI. The first PMI corresponds to two codebook indexes. For ease of description, the two codebook indexes are referred to as a first horizontal codebook index and a first vertical codebook index. The second PMI corresponds to a second codebook index. A value of n is indicated by the second codebook index. A value of n is indicated by the second codebook index. A value of m is indicated by the first vertical codebook index or indicated by the first vertical codebook index and the second codebook index. A value of l is indicated by the first horizontal codebook index or indicated by the first horizontal codebook index and the second codebook index. $(\theta_1 \ldots \theta_{N-1})$ may be indicated by a first codebook index. In a possible implementation, the first codebook index includes N+2 values, where one value $i_{1,1}$ is used to determine the value of l, another value $i_{1,2}$ is used to determine the value of m, and remaining N values are used to determine $(\theta_1 \ldots \theta_{N-1})$, for example, $\theta_r=2\pi i_{1,r+2}/X$, where $r=1, \ldots N-1$, and X can be a value in a set $\{2, 4, 8, \ldots\}$. A specific example of the codebook when N=2 is provided below:

| | | | | $i_2$ | | | |
|---|---|---|---|---|---|---|---|
| $i_{1,1}$ | $i_{1,2}$ | $i_{1,3}$ | $i_{1,4}$ | 0 | 1 | 2 | 3 |
| 0, 1, ..., $O_1N_1-1$ | 0, 1, ..., $O_2N_2-1$ | 0, 1, ..., 3 | 0, 1, ..., 3 | $W_{i_{1,1},i_{1,2},0,i_{1,3},i_{1,4}}^{(1)}$ | $W_{i_{1,1},i_{1,2},1,i_{1,3},i_{1,4}}^{(1)}$ | $W_{i_{1,1},i_{1,2},2,i_{1,3},i_{1,4}}^{(1)}$ | $W_{i_{1,1},i_{1,2},3,i_{1,3},i_{1,4}}^{(1)}$ |

$$W_{l,m,n,p,q}^{(1)} = \begin{bmatrix} e^{j2\pi p/X} \begin{pmatrix} v_l \otimes u_m \\ \varphi_n v_l \otimes u_m \end{pmatrix} \\ e^{j2\pi q/X} \begin{pmatrix} v_l \otimes u_m \\ \varphi_n v_l \otimes u_m \end{pmatrix} \end{bmatrix} \cdot \frac{1}{\sqrt{4K_1K_2}} \text{ or } W_{l,m,n,p,q}^{(1)} = \begin{bmatrix} e^{j2\pi p/X} \begin{pmatrix} v_{l,m} \\ \varphi_n v_{l,m} \end{pmatrix} \\ e^{j2\pi q/X} \begin{pmatrix} v_{l,m} \\ \varphi_n v_{l,m} \end{pmatrix} \end{bmatrix} \cdot \frac{1}{\sqrt{4K_1K_2}} \text{ or }$$

| | | | $i_2$ | | | |
|---|---|---|---|---|---|---|
| $i_{1,1}$ | $i_{1,2}$ | $i_{1,3}$ | 0 | 1 | 2 | 3 |
| 0, 1, ..., $O_1N_1-1$ | 0, 1, ..., $O_2N_2-1$ | 0, 1, ..., 3 | $W_{i_{1,1},i_{1,2},0,i_{1,3}}^{(1)}$ | $W_{i_{1,1},i_{1,2},1,i_{1,3}}^{(1)}$ | $W_{i_{1,1},i_{1,2},2,i_{1,3}}^{(1)}$ | $W_{i_{1,1},i_{1,2},3,i_{1,3}}^{(1)}$ |

$$W_{l,m,n,q}^{(1)} = \begin{bmatrix} \begin{pmatrix} v_l \otimes u_m \\ \varphi_n v_l \otimes u_m \end{pmatrix} \\ e^{j2\pi q/X} \begin{pmatrix} v_l \otimes u_m \\ \varphi_n v_l \otimes u_m \end{pmatrix} \end{bmatrix} \cdot \frac{1}{\sqrt{4K_1K_2}} \text{ or } W_{l,m,n,q}^{(1)} = \begin{bmatrix} \begin{pmatrix} v_{l,m} \\ \varphi_n v_{l,m} \end{pmatrix} \\ e^{j2\pi q/X} \begin{pmatrix} v_{l,m} \\ \varphi_n v_{l,m} \end{pmatrix} \end{bmatrix} \cdot \frac{1}{\sqrt{4K_1K_2}}$$

The first PMI is a wideband PMI, and the second PMI is a subband PMI.

(3) In addition, alternatively, $(\theta_1 \ldots \theta_{N-1})$ may be indicated by the second codebook index. For example, the second codebook index includes N+1 values, where one value $i_{2,N+1}$ is used to determine a phase difference $\varphi_n = e^{j\pi n/2}$ between polarization directions of an antenna, and remaining N values $i_{2,r}$, where $r=1, \ldots N$, are used to determine $(\theta_1 \ldots \theta_{N-1})$, where $\theta_r = 2\pi i_{2,r}/X$, $r=1, \ldots N-1$, where X can be a value in a set $\{2, 4, 8, \ldots\}$; and $\varphi_n = e^{j\pi n/2}$, $n=i_{2,N}$.

parameter is a phase difference, a structure of a precoding matrix in a codebook with the rank 1 may be specifically shown as follows:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix}, \text{ where}$$

| | | $i_{2,1}, i_{2,2}$ | | | |
| | | 0, 1, ... , 3 | | | |
| | | $i_{2,3}$ | | | |
| $i_{1,1}$ | $i_{1,2}$ | 0 | 1 | 2 | 3 |
| 0, 1, ... , $O_1N_1-1$ | 0, 1, ... , $O_2N_2-1$ | $W^{(1)}_{i_{1,1},i_{1,2},i_{2,1},i_{2,2},0}$ | $W^{(1)}_{i_{1,1},i_{1,2},i_{2,1},i_{2,2},1}$ | $W^{(1)}_{i_{1,1},i_{1,2},i_{2,1},i_{2,2},2}$ | $W^{(1)}_{i_{1,1},i_{1,2},i_{2,1},i_{2,2},3}$ |

$$W^{(1)}_{l,m,n,p,q} = \begin{bmatrix} e^{j2\pi p/X} \begin{pmatrix} v_l \otimes u_m \\ \varphi_n v_l \otimes u_m \end{pmatrix} \\ e^{j2\pi q/X} \begin{pmatrix} v_l \otimes u_m \\ \varphi_n v_l \otimes u_m \end{pmatrix} \end{bmatrix} \cdot \frac{1}{\sqrt{4K_1K_2}} \text{ or } W^{(1)}_{l,m,n,p,q} = \begin{bmatrix} e^{j2\pi p/X} \begin{pmatrix} v_{l,m} \\ \varphi_n v_{l,m} \end{pmatrix} \\ e^{j2\pi q/X} \begin{pmatrix} v_{l,m} \\ \varphi_n v_{l,m} \end{pmatrix} \end{bmatrix} \cdot \frac{1}{\sqrt{4K_1K_2}} \text{ or}$$

| | | $i_{2,1}$ | | | |
| | | 0, 1, ... , 3 | | | |
| | | $i_2$ | | | |
| $i_{1,1}$ | $i_{1,2}$ | 0 | 1 | 2 | 3 |
| 0, 1, ... , $O_1N_1-1$ | 0, 1, ... , $O_2N_2-1$ | $W^{(1)}_{i_{1,1},i_{1,2},0}$ | $W^{(1)}_{i_{1,1},i_{1,2},i_{2,1},1}$ | $W^{(1)}_{i_{1,1},i_{1,2},i_{2,1},2}$ | $W^{(1)}_{i_{1,1},i_{1,2},i_{2,1},3}$ |

$$W^{(1)}_{l,m,n,q} = \begin{bmatrix} \begin{pmatrix} v_l \otimes u_m \\ \varphi_n v_l \otimes u_m \end{pmatrix} \\ e^{j2\pi q/X} \begin{pmatrix} v_l \otimes u_m \\ \varphi_n v_l \otimes u_m \end{pmatrix} \end{bmatrix} \cdot \frac{1}{\sqrt{4K_1K_2}} \text{ or } W^{(1)}_{l,m,n,q} = \begin{bmatrix} \begin{pmatrix} v_{l,m} \\ \varphi_n v_{l,m} \end{pmatrix} \\ e^{j2\pi q/X} \begin{pmatrix} v_{l,m} \\ \varphi_n v_{l,m} \end{pmatrix} \end{bmatrix} \cdot \frac{1}{\sqrt{4K_1K_2}}$$

The first PMI is a wideband PMI, and the second PMI is a subband PMI. An example of an amplitude factor is similar to this.

In a feasible design, an antenna may be a dual-polarized antenna or a single polarization antenna, and antennas in two polarization directions may be provided on each panel, or an antenna in only one polarization direction may be provided on each panel (to be specific, antennas in two polarization directions are distributed on two panels). In a feasible design, all antenna ports are grouped into N groups (a value of N may be 2, 4, 8, or the like). For example, each group corresponds to an antenna port in one polarization direction on one antenna panel. A quantity of CSI-RS ports in a horizontal dimension is $K_1$, and a quantity of CSI-RS ports in a vertical dimension is $K_2$. Therefore, a total quantity of antenna ports is $N*K_1*K_2$. If the block codebook difference -continued $$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

where $v_l$ represents a DFT vector whose length is $K_1$, and $K_1$ is the quantity of CSI-RS ports in the horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, and $K_2$ is the quantity of CSI-RS ports in the vertical dimension in each group; l is a function of a first horizontal codebook index, and has a correspondence to a first PMI; m is a function of a first vertical codebook index, and has a correspondence to the first PMI; $O_1$ and $O_2$ represent oversampling factors; $\otimes$ represents a Kronecker product; e represents a natural constant; j represents a unit imaginary number; π represents the circular ratio; $(\theta_1 \ldots \theta_{N-1})$ represent phase difference parameters or phase factors between different antenna port groups, or represent phase factors between antenna ports in different polarization directions, or represent phase difference parameters or phase factors between antenna panels; values of $(e^{j\theta_1} \ldots e^{j\theta_{N-1}})$ may be $\{+1, -1, +j, -j\}$; and N may represent a quantity of antenna port groups or may represent a quantity of antenna panels.

A structure of a precoding matrix in the codebook with the rank 2 may be as follows:

$$W^{(2)}_{l,m,\theta_1,\ldots,\theta_{N-1}} = \frac{1}{\sqrt{NK_1K_2}} \begin{bmatrix} v_{l_1} \otimes u_{m_1} & v_{l_2} \otimes u_{m_2} \\ e^{j\theta_1} v_{l_1} \otimes u_{m_1} & e^{j\theta_1} v_{l_2} \otimes u_{m_2} \\ \vdots & \vdots \\ e^{j\theta_{N-1}} v_{l_1} \otimes u_{m_1} & e^{j\theta_{N-1}} v_{l_2} \otimes u_{m_2} \end{bmatrix},$$

where $v_{l_1} \otimes u_{m_1}$ represents a precoding matrix corresponding to each antenna port group on a first data layer; $v_{l_2} \otimes u_{m_2}$ represents a precoding matrix corresponding to each antenna port group on a second data layer; a corresponding PMI feedback method is similar to that with the rank 1; and where $$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

where $v_l$ represents a DFT vector whose length is $K_1$, $K_1$ is the quantity of CSI-RS ports in the horizontal dimension in each group, l=1 or 2;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, $K_2$ is the quantity of CSI-RS ports in the vertical dimension in each group, and m=1 or 2; l is a function of a first horizontal codebook index, and has a correspondence to a first PMI; m is a function of a first vertical codebook index, and has a correspondence to the first PMI; the first PMI may be a wideband PMI; $O_1$ and $O_2$ represent over-sampling factors; $\otimes$ represents a Kronecker product; e represents a natural constant; j represents a unit imaginary number; π represents the circular ratio; $(\theta_1 \ldots \theta_{N-1})$ represent phase difference parameters or phase factors between different antenna port groups, or represent phase factors between antenna ports in different polarization directions, or represent phase difference parameters or phase factors between antenna panels; values of $(e^{j\theta_1} \ldots e^{j\theta_{N-1}})$ may be $\{+1, -1, +j, -j\}$; and N may represent a quantity of antenna port groups or may represent a quantity of antenna panels.

Alternatively, a structure of a precoding matrix in a codebook with the rank 1 may be as follows:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix}, \text{where}$$

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where, where $v_{l,m}$ represents a vector whose length is $K_1 \times K_2$, and $K_1$ is the quantity of CSI-RS ports in the horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T, \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, and $K_2$ is a quantity of CSI-RS ports in the vertical dimension in each group; $O_1$ and $O_2$ represent over-sampling factors; l is a function of a first horizontal codebook index, and has a correspondence to a first PMI; the first PMI may be a wideband PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; π represents the circular ratio; $(\theta_1 \ldots \theta_{N-1})$ represent phase difference parameters or phase factors between different antenna port groups, or represent phase factors between antenna ports in different polarization directions, or represent phase difference parameters or phase factors between antenna panels; values of $(e^{j\theta_1} \ldots e^{j\theta_{N-1}})$ may be $\{+1, -1, +j, -j\}$; and N may represent a quantity of antenna port groups or may represent a quantity of antenna panels.

A structure of a precoding matrix in the codebook with the rank 2 may be as follows:

$$W^{(1)}_{l,m,\theta_1,\ldots,\theta_{N-1}} = \frac{1}{\sqrt{NK_1K_2}} \begin{bmatrix} v_{l_1,m_1} & v_{l_2,m_2} \\ e^{j\theta_1} v_{l_1,m_1} & e^{j\theta_1} v_{l_2,m_2} \\ \vdots & \vdots \\ e^{j\theta_{N-1}} v_{l_1,m_1} & e^{j\theta_{N-1}} v_{l_2,m_2} \end{bmatrix},$$

where $v_{l_1,m_1}$ represents a precoding matrix corresponding to each antenna port group on a first data layer; $v_{l_2,m_2}$ represents a precoding matrix corresponding to each antenna port group on a second data layer; a corresponding PMI feedback method is similar to that with the rank 1; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; π represents the circular ratio; $(\theta_1 \ldots \theta_{N-1})$ represent phase difference parameters or phase factors between different antenna port groups, or represent phase factors between antenna ports in different polarization directions, or represent phase difference parameters or phase factors between antenna panels; values of $(e^{j\theta_1} \ldots e^{j\theta_{N-1}})$ may be $\{+1, -1, +j, -j\}$; and N may represent a quantity of antenna port groups or may represent a quantity of antenna panels;

or, $$W^{(1)}_{l,m,a_1,\ldots,a_N} = \frac{1}{\sqrt{NK_1K_2}} \begin{bmatrix} a_1 v_{l,m} \\ a_2 v_{l,m} \\ \vdots \\ a_N v_{l,m} \end{bmatrix},$$

where $(a_1, \ldots, a_N)$ represent amplitude factors, and $0 \le a_1, \ldots, a_N \le 1$.

$$a_i \in \left\{ e^{j\frac{\pi}{4}}, e^{j\frac{3\pi}{4}}, e^{j\frac{5\pi}{4}}, e^{j\frac{7\pi}{4}} \right\},$$

$$b_i \in \left\{ e^{-j\frac{\pi}{4}}, e^{j\frac{\pi}{4}} \right\},$$

$a_i$ is determined by the first PMI, and $b_i$ is determined by the second PMI.

A specific example of the codebook when N=4 is provided below:

| | | $i_{2,1}, i_{2,2}, i_{2,3}, i_{2,4}$ |
|---|---|---|
| $i_{1,1}$ | $i_{1,2}$ | 0, 1, 2, 3 |
| 0, 1, ..., $O_1 N_1 - 1$ | 0, 1, ..., $O_2 N_2 - 1$ | $W^{(1)}_{i_{1,1}, i_{1,2}, i_{2,1}, i_{2,2}, i_{2,3}, i_{2,4}}$ |

$$W^{(1)}_{l,m,p_1,\ldots p_4} = \begin{bmatrix} e^{j2\pi p_1/X} v_l \otimes u_m \\ e^{j2\pi p_2/X} v_l \otimes u_m \\ e^{j2\pi p_3/X} v_l \otimes u_m \\ e^{j2\pi p_4/X} v_l \otimes u_m \end{bmatrix} \cdot \frac{1}{\sqrt{4K_1K_2}} \text{ or } W^{(1)}_{l,m,n,p,q} = \begin{bmatrix} e^{j2\pi p_1/X} v_{l,m} \\ e^{j2\pi p_2/X} v_{l,m} \\ e^{j2\pi p_3/X} v_{l,m} \\ e^{j2\pi p_4/X} v_{l,m} \end{bmatrix} \cdot \frac{1}{\sqrt{4K_1K_2}} \text{ or }$$

| | | $i_{2,1}, i_{2,2}, i_{2,3}$ |
|---|---|---|
| $i_{1,1}$ | $i_{1,2}$ | 0, 1, 2, 3 |
| 0, 1, ..., $O_1 N_1 - 1$ | 0, 1, ..., $O_2 N_2 - 1$ | $W^{(1)}_{i_{1,1}, i_{1,2}, i_{2,1}, i_{2,3}}$ |

$$W^{(1)}_{l,m,p_1,\ldots p_3} = \begin{bmatrix} v_l \otimes u_m \\ e^{j2\pi p_1/X} v_l \otimes u_m \\ e^{j2\pi p_2/X} v_l \otimes u_m \\ e^{j2\pi p_3/X} v_l \otimes u_m \end{bmatrix} \cdot \frac{1}{\sqrt{4K_1K_2}} \text{ or } W^{(1)}_{l,m,n,p,q} = \begin{bmatrix} v_{l,m} \\ e^{j2\pi p_1/X} v_{l,m} \\ e^{j2\pi p_2/X} v_{l,m} \\ e^{j2\pi p_3/X} v_{l,m} \end{bmatrix} \cdot \frac{1}{\sqrt{4K_1K_2}}$$

Optionally, PMIs fed back by a user equipment to the base station include a first PMI and a second PMI. The first PMI corresponds to two codebook indexes. For ease of description, the two codebook indexes are referred to as a first horizontal codebook index and a first vertical codebook index. The second PMI corresponds to a second codebook index. A value of n is indicated by the second codebook index. A value of m is indicated by the first vertical codebook index or indicated by the first vertical codebook index and the second codebook index. A value of l is indicated by the first horizontal codebook index or indicated by the first horizontal codebook index and the second codebook index.

$(\theta_1 \ldots \theta_{N-1})$ represent difference parameters, for example, phase differences, between different antenna port groups, and $(\theta_1 \ldots \theta_{N-1})$ may be determined by the second codebook index. For example, the second codebook index includes a plurality of values $i_{2,r}$, where $r = 1, \ldots, N-1$, and $\theta_r = 2\pi i_{2,r}/X$, where X can be a value in a set $\{2, 4, 8, \ldots\}$. Alternatively, all values or some values in $(\theta_1 \ldots \theta_{N-1})$ may be determined by a first codebook index. For example, the first codebook index includes a plurality of values $i_{1,r}$, where $r = 1, \ldots, N-1$, and $\theta_r = 2\pi i_{2,r}/X$, where X can be a value in a set $\{2, 4, 8, \ldots\}$. Alternatively, all values or some values in $(\theta_1 \ldots \theta_{N-1})$ may be determined by both the first PMI and the second PMI. For example, $\theta_i = a_i \cdot b_i$, where First PMIs $i_{1,1}$ and $i_{1,2}$ are wideband PMIs, and second PMIs $i_{2,1}, i_{2,2}, i_{2,3}$, and $i_{2,4}$ are subband PMIs, or some values are wideband PMIs, and the other values are subband PMIs. An example of an amplitude factor is similar to this.

In a possible implementation, if the block codebook difference parameter is a phase difference, the structure of the precoding matrix in the codebook is specifically shown in the following formula 1.1:

$$W^{(1)}_{l,m,n,\theta,\phi} = \begin{bmatrix} v_{l,\theta} \otimes u_{m,\phi} \\ \varphi_n \cdot v_{l,\theta} \otimes u_{m,\phi} \end{bmatrix} \qquad \text{Formula 1.1}$$

Optionally, the formula may be $$W^{(1)}_{l,m,n,\phi,\theta} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix},$$

where $\varphi_n = e^{j\pi n/2}$ represents a phase difference between two polarization directions of an antenna;

$$v_{l,\theta} = \begin{bmatrix} v_l & e^{j\theta_1} v_l & \cdots & e^{j\theta_{N_1}} v_l \end{bmatrix};$$

optionally, $$v_{l,\theta} = \begin{bmatrix} v_l & e^{j\theta_1}v_l & \cdots & e^{j\theta_{N_1-1}}v_l \end{bmatrix}^T,$$

where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represents a phase difference between precoding vectors in different block codebooks in the horizontal dimension;

$$u_{m,\phi} = \begin{bmatrix} u_m & e^{j\phi_1}u_m & \cdots & e^{j\phi_{N_2}}u_m \end{bmatrix};$$

optionally, $$u_{m,\phi} = \begin{bmatrix} u_m & e^{j\phi_1}u_m & \cdots & e^{j\phi_{N_2-1}}u_m \end{bmatrix}^T,$$

where $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; $\phi$ represents a phase difference parameter in the vertical dimension; $(\phi_1 \ldots \phi_{N_2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Alternatively, $$W^{(1)}_{l,m,n,\theta_1,\ldots,\theta_{N-1}} = \begin{pmatrix} v_l \otimes u_m \\ e^{j\theta_1} \cdot v_l \otimes u_m \\ \vdots \\ e^{j\theta_{N-1}} \cdot v_l \otimes u_m \\ \varphi_n \begin{pmatrix} v_l \otimes u_m \\ e^{j\theta_1} \cdot v_l \otimes u_m \\ \vdots \\ e^{j\theta_{N-1}} \cdot v_l \otimes u_m \end{pmatrix} \end{pmatrix} \cdot \frac{1}{2N_1 N_2 K_1 K_2}((\phi_1, \phi_2 \ldots \phi_n))$$

does not need to be indicated, and a PMI indication method below is similar to the foregoing method, and is omitted herein),
where $$v_l = \begin{bmatrix} 1 & e^{j\frac{2\pi l}{O_1 K_1}} & \cdots & e^{j\frac{2\pi l(K_1-1)}{O_1 \cdot K_1}} \end{bmatrix}^T,$$

where $v_l$ represents a DFT vector whose length is $K_1$, and $K_1$ is a quantity of CSI-RS ports in a horizontal dimension in each group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T,$$

where $u_m$ represents a DFT vector whose length is $K_2$, and $K_2$ is a quantity of CSI-RS ports in a vertical dimension in each group.

Alternatively, $$W^{(1)}_{l,m,n,\theta_1,\ldots,\theta_{N-1}} = \begin{pmatrix} v_{l,m} \\ e^{j\theta_1} v_{l,m} \\ \vdots \\ e^{j\theta_{N-1}} v_{l,m} \\ \varphi_n \begin{pmatrix} v_{l,m} \\ e^{j\theta_1} v_{l,m} \\ \vdots \\ e^{j\theta_{N-1}} v_{l,m} \end{pmatrix} \end{pmatrix} \cdot \frac{1}{2N_1 N_2 K_1 K_2}((\phi_1, \phi_2 \ldots \phi_n))$$

does not need to be indicated, and a PMI indication method below is similar to the foregoing method, and is omitted herein),
where $$v_{l,m} = \begin{bmatrix} u_m & e^{j\frac{2\pi l}{O_1 K_1}}u_m & \cdots & e^{j\frac{2\pi l(K_1-1)}{O_1 \cdot K_1}}u_m \end{bmatrix}^T,$$

where $v_{l,m}$ represents a vector whose length is $K_1 K_2$, and $K_1$ is a quantity of CSI-RS ports in a horizontal dimension in each group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix},$$

where $u_m$ represents a DFT vector whose length is $K_2$, and $K_2$ is a quantity of CSI-RS ports in a vertical dimension in each group; and $O_1$ and $O_2$ represent over-sampling factors.

In this possible implementation, a manner of indicating a phase difference by using a PMI may be classified into the following possible manners:

A first manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. The phase differences $(\theta_1 \ldots \theta_{N_1})$ are indicated by the first horizontal codebook index, and the phase differences ($\phi_1 \ldots \phi_{N2}$) are indicated by the first vertical codebook index. Optionally, a value of n indicated by the second codebook index; a value of m is indicated by the first vertical codebook index and the second codebook index; and a value of l is indicated by the first horizontal codebook index and the second codebook index.

A specific example is used to describe a relationship between l, m, and n. For details, refer to Table 1.

TABLE 1

| | $i_2$ | |
|---|---|---|
| 1 | 2 | 3 |
| $W^{(1)}_{2i_{1,1}, 2i_{1,2}, 1}$ | $W^{(1)}_{2i_{1,1}, 2i_{1,2}, 2}$ | $W^{(1)}_{2i_{1,1}, 2i_{1,2}, 3}$ |
| | $i_2$ | |
| 5 | 6 | 7 |
| $W^{(1)}_{2i_{1,1}+1, 2i_{1,2}, 1}$ | $W^{(1)}_{2i_{1,1}+1, 2i_{1,2}, 2}$ | $W^{(1)}_{2i_{1,1}+1, 2i_{1,2}, 3}$ |
| | $i_2$ | |
| 9 | 10 | 11 |
| $W^{(1)}_{2i_{1,1}, 2i_{1,2}+1, 1}$ | $W^{(1)}_{2i_{1,1}, 2i_{1,2}+1, 2}$ | $W^{(1)}_{2i_{1,1}, 2i_{1,2}+1, 3}$ |

In Table 1, $i_{1,1}$ represents the first horizontal codebook index; $i_{1,2}$ represents the first vertical codebook index; and $i_2$ represents the second codebook index. Specific values of $i_{1,1}$ and $i_{1,2}$ are not particularly limited in this embodiment. When $i_2=2$, $l=2i_{1,1}$, $m=2i_{1,2}$, and $n=2$. When $i_2=6$, $l=2i_{1,1}+1$, $m=2i_{1,2}$, and $n=2$. When $i_2=10$, $l=2i_{1,1}$, $m=2i_{1,2}+1$, and $n=2$.

Persons skilled in the art may understand that, a manner of determining the relationship between l, m, and n, and determining the values of l, m, and n below is similar to that in this embodiment. Therefore, details are not described again.

A second manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. Values of n, the phase difference ($\phi_1 \ldots \phi_{N2}$), and the phase difference ($\theta_1 \ldots \theta_{N_1}$) are indicated by the second codebook index. A value of m is indicated by the first vertical codebook index and the second codebook index. A value of l is indicated by the first horizontal codebook index and the second codebook index.

Optionally, a value of the second PMI may correspond to two codebook indexes. For ease of description, the two codebook indexes are referred to as a second horizontal codebook index and a second vertical codebook index. The phase differences ($\phi_1 \ldots \phi_{N2}$) are indicated by the second vertical codebook index. ($\theta_1 \ldots \theta_{N_1}$) are indicated by the second horizontal codebook index. A value of n is indicated by the second vertical codebook index and the second horizontal codebook index. A value of m is indicated by the first vertical codebook index and the second vertical codebook index. A value of l is indicated by the first horizontal codebook index and the second horizontal codebook index.

A third manner: PMIs include a first PMI, a second PMI, and a third PMI. The first PMI corresponds to two codebook indexes. For ease of description, the two codebook indexes are referred to as a first horizontal codebook index and a first vertical codebook index. The second PMI corresponds to a second codebook index. The third PMI corresponds to a third codebook index. Values of the phase differences ($\theta_1 \ldots \theta_{N_1}$) and ($\phi_1 \ldots \phi_{N2}$) are indicated by the third codebook index. Optionally, a value of n is indicated by the second codebook index; a value of m is indicated by the first vertical codebook index and the second codebook index; and a value of l is indicated by the first horizontal codebook index and the second codebook index. Optionally, for example, the third codebook index includes a plurality of values $i_{3,r}$ and $i_{3,s}$, where $r=1, \ldots, N_1-1$, $s=1, \ldots, N_2-1$, $\theta_r=2\pi i_{3,r}/X$, and $\phi_s=2\pi i_{3,s}/X$, where X can be a value in a set $\{2, 4, 8\}$. The first PMI may be a wideband PMI, the second PMI is a subband PMI, and the third PMI may be a wideband PMI or may be a subband PMI.

Optionally, the third PMI may correspond to two codebook indexes. For ease of description, the two codebook indexes are referred to as a third vertical codebook index and a third horizontal codebook index. In this case, values of ($\phi_1 \ldots \phi_{N2}$) are indicated by the third vertical codebook index, and values of ($\theta_1 \ldots \theta_{N_1}$) are indicated by the third horizontal codebook index.

Optionally, for example, the third horizontal codebook index includes a plurality of values $i_{3,r}^h$, where $r=1, \ldots, N_1-1$, and $\theta_r=2\pi i_{3,r}^h/X$, where X can be a value in a set $\{2, 4, 8, \ldots\}$; and the third vertical codebook index includes a plurality of values $i_{3,r}^v$ where $r=1, \ldots, N_2-1$, and $\phi_r=2\phi i_{3,r}^v/X$, where X can be a value in a set $\{2, 4, 8\}$. The first PMI is a wideband PMI, the second PMI is a subband PMI, and the third PMI may be a wideband PMI or may be a subband PMI. On a UE side, the UE may perform channel estimation based on a reference signal, accordingly determine $W^{(1)}_{l,m,n,\theta,\phi}$, values of (l, m, n, $\theta_1, \ldots, \theta_{N_1}, \phi_1, \ldots, \phi_{N2}$), and a codebook index, and then feed back a PMI corresponding to the codebook index to the base station. On a base station side, the codebook index corresponding to the PMI is obtained, and the values of (l, m, n, $\beta_1, \ldots, \beta_{N_1}, \alpha_1, \ldots, \alpha_{N_2}$) may be obtained. A target precoding matrix may be obtained based on the values of (l, m, n, $\theta_1, \ldots, \theta_N, \phi_1, \ldots, \phi_{N_2}$) and $W^{(1)}_{l,m,n,\theta,\phi}$.

In another possible implementation, if the block codebook difference parameter is a modulus value difference, the structure of the precoding matrix in the codebook is specifically shown in the following formula 1.2:

$$W^{(1)}_{l,m,n,\beta,\alpha} = \begin{bmatrix} v_{l,\beta} \otimes u_{m,\alpha} \\ \varphi_n \cdot v_{l,\beta} \otimes u_{m,\alpha} \end{bmatrix}. \quad \text{Formula 1.2}$$

Optionally, the formula may be:

$$W^{(1)}_{l,m,n,\phi,\theta} = \frac{1}{\sqrt{2N_1 N_2 K_1 K_2}} \cdot \begin{bmatrix} v_{l,\beta} \otimes u_{m,\alpha} \\ \varphi_n v_{l,\beta} \otimes u_{m,\alpha} \end{bmatrix},$$

where $\varphi_n = e^{j\pi n/2}$ represents a phase difference between two polarization directions of an antenna; $v_{l,\beta} = [v_l, \beta_1 v_l \ldots \beta_{N_1} v_l]$; optionally, $v_{l,\beta} = [v_l \ \beta_1 v_l \ \ldots \ \beta_{N_1-1} v_l]^T$, where $v_{l,\beta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; β represents a modulus value difference parameter in the horizontal dimension; $(\beta_1 \ldots \beta_{N_1})$ represent modulus value differences between precoding matrices in different block codebooks in the horizontal dimension; $u_{m,\alpha}=[u_m \ \alpha_1 u_m \ \ldots \ \alpha_{N_2} u_m]$; optionally, $u_{m,\alpha}=[u_m \ \alpha_1 u_m \ \ldots \ \alpha_{N_2-1} u_m]^T$, where $u_{m,\alpha}$ represents $N_2$ DFT vectors corresponding to $N_2$ block codebooks in a vertical dimension;

$$u_m = \left[\ 1 \quad e^{j\frac{2\pi m}{O_2 \cdot K_2}} \quad \ldots \quad e^{j\frac{2\pi m(K_2-1)}{O_2 \cdot K_2}}\ \right],$$

where $u_m$ represents that each block codebook is formed based on a DFT vector whose length is $K_2$, and $K_2$ is a quantity of CSI-RS ports corresponding to each block codebook in the vertical dimension; α represents a modulus value difference parameter in the vertical dimension; $(\alpha_1 \ldots \alpha_{N_1})$ represent modulus value differences between precoding vectors in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

In this possible implementation, a manner of indicating a modulus value difference by using a PMI may be classified into the following possible implementations:

A first manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. The modulus value differences $(\beta_1 \ldots \beta_{N_1})$ are indicated by the first horizontal codebook index. The modulus value differences $(\alpha_1 \ldots \alpha_{N_1})$ are indicated by the first vertical codebook index. Optionally, a value of n is indicated by the second codebook index; a value of m is indicated by the first vertical codebook index and the second codebook index; and a value of l is indicated by the first horizontal codebook index and the second codebook index.

A second manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. Values of n, $(\alpha_1 \ldots \alpha_{N_1})$, and $(\beta_1 \ldots \beta_{N_1})$ are indicated by the second codebook index. A value of m is indicated by the first vertical codebook index and the second codebook index. A value of l is indicated by the first horizontal codebook index and the second codebook index.

Optionally, a value of the second PMI may correspond to two codebook indexes. For ease of description, the two codebook indexes are referred to as a second horizontal codebook index and a second vertical codebook index. $(\alpha_1 \ldots \alpha_{N_1})$ are indicated by the second vertical codebook index. $(\beta_1 \ldots \beta_{N_1})$ are indicated by the second horizontal codebook index. A value of n is indicated by the second vertical codebook index and the second horizontal codebook index. A value of m is indicated by the first vertical codebook index and the second vertical codebook index. A value of l is indicated by the first horizontal codebook index and the second horizontal codebook index.

A third manner: PMIs include a first PMI, a second PMI, and a third PMI. The first PMI corresponds to two codebook indexes. For ease of description, the two codebook indexes are referred to as a first horizontal codebook index and a first vertical codebook index. The second PMI corresponds to a second codebook index. The third PMI corresponds to a third codebook index. Values of $(\alpha_1 \ldots \alpha_{N_1})$, $(\beta_1 \ldots \beta_{N_1})$ are indicated by the third codebook index. Optionally, a value of n is indicated by the second codebook index; a value of m is indicated by the first vertical codebook index and the second codebook index; and a value of l is indicated by the first horizontal codebook index and the second codebook index.

Optionally, a value of the third PMI may correspond to two codebook indexes. For ease of description, the two codebook indexes are referred to as a third vertical codebook index and a third horizontal codebook index. In this case, values of $(\alpha_1 \ldots \alpha_{N_1})$ are indicated by the third vertical codebook index, and values of $(\beta_1 \ldots \beta_{N_1})$ are indicated by the third horizontal codebook index.

On a UE side, the UE may perform channel estimation based on a reference signal, accordingly determine $W_{l,m,n,\theta,\phi}^{(1)}$ values of (l, m, n, $\beta_1, \ldots, \beta_{N_1}, \alpha_1, \ldots, \alpha_{N_2}$), and a codebook index, and then feed back a PMI corresponding to the codebook index to the base station. On a base station side, the codebook index corresponding to the PMI is obtained, and the values of (l, m, n, $\beta_1, \ldots, \beta_{N_1}, \alpha_1, \ldots, \alpha_{N_2}$) may be obtained. A target precoding matrix may be obtained based on the values of (l, m, n, $\beta_1, \ldots, \beta_{N_1}, \alpha_1, \ldots, \alpha_{N_2}$) and $W_{l,m,n,\theta,\phi}^{(1)}$.

Figure 5:
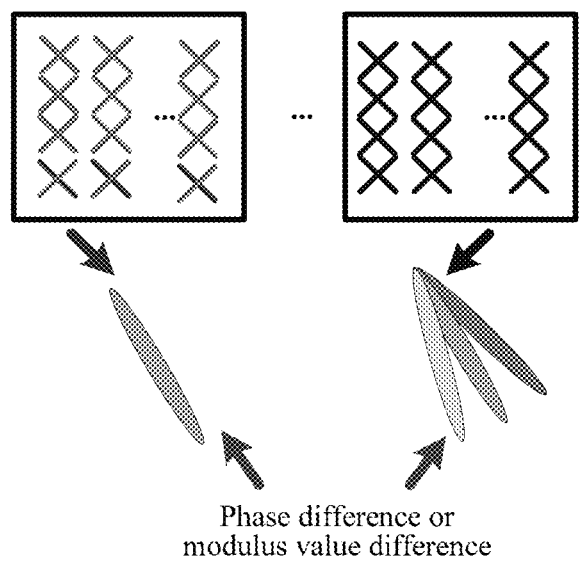
FIG. 5 is a second schematic diagram of an antenna panel and a beam according to an embodiment of the present invention.

Next, a structure of the precoding matrix in the codebook when vectors corresponding to block codebooks are vectors corresponding to beams at different radiation angles is described. FIG. 5 is a second schematic diagram of an antenna panel and a beam according to an embodiment of the present invention. As shown in FIG. 5, vectors corresponding to block codebooks may be DFT vectors corresponding to a beam at a same radiation angle or DFT vectors corresponding to beams at different radiation angles. The DFT vectors corresponding to the block codebooks are combined into a DFT vector corresponding to a transmit beam in a splicing manner or the like.

In a possible implementation, if the block codebook difference parameter is a phase difference, the structure of the precoding matrix in the codebook is shown in a formula 1.3:

$$W_{l,m,n,\phi,\theta}^{(1)} = \begin{bmatrix} v_{l,\theta} \otimes u_{m,\phi} \\ \varphi_n \cdot v_{l,\theta} \otimes u_{m,\phi} \end{bmatrix}. \qquad \text{Formula 1.3}$$

Optionally, the formula may be:

$$W_{l,m,n,\phi,\theta}^{(1)} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix},$$

where $\varphi_n = e^{j\pi n/2}$ represents a phase difference between two polarization directions of an antenna;

$$v_{l,\theta} = \left[\ v_{l_1} \quad e^{j\theta_1} v_{l_2} \quad \cdots \quad e^{j\theta_{N_1}} v_{l_{N_1}}\ \right],$$

where $l=l_1 \ldots l_{N_1}$; optionally, $$v_{l,\theta} = \begin{bmatrix} v_{l_0} & e^{j\theta_1}v_{l_1} & \cdots & e^{j\theta_{N_1-1}}v_{l_{N_1-1}} \end{bmatrix}^T,$$

where $l=l_0, l_1 \ldots, l_{N_1-1}$, and $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_{m_1} & e^{j\phi_1}u_{m_2} & \cdots & e^{j\phi_{N_2}}u_{m_{N_2}} \end{bmatrix},$$

where $m=m_1 \ldots m_{N_2}$; optionally, $$u_{m,\phi} = \begin{bmatrix} u_{m_0} & e^{j\phi_1}u_{m_1} & \cdots & e^{j\phi_{N_2-1}}u_{m_{N_2-1}} \end{bmatrix}^T,$$

where $m=m_0, m_1, \ldots, m_{N_2-1}$, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; $\phi$ represents a phase difference parameter in the vertical dimension; $(\phi_1 \ldots \phi_{N2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

In this possible implementation, a manner of indicating a phase difference by using a PMI may be classified into the following possible manners:

A first manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. $(\phi_1 \ldots \phi_{N2})$ are indicated by the first vertical codebook index. $(\theta_1 \ldots \theta_{N_1})$ are indicated by the first horizontal codebook index. Optionally, a value of n is indicated by the second codebook index; $(m_1 \ldots m_{N_2})$ are indicated by both the first vertical codebook index and the second codebook index; and $(l_1 \ldots l_{N_1})$ are indicated by both the first horizontal codebook index and the second codebook index. Optionally, $(m_0, m_1, \ldots m_{N_2-1})$ may be indicated by both the first vertical codebook index and the second codebook index, and $(l_0, l_1 \ldots, l_{N_1-1})$ may be indicated by both the first horizontal codebook index and the second codebook index.

Optionally, the first PMI may correspond to a first horizontal codebook index, a first differential horizontal codebook index, a first vertical codebook index, and a first differential vertical codebook index. $(\phi_1 \ldots \phi_{N2})$ are indicated by the first vertical codebook index. Values of $(\theta_1 \ldots \theta_{N_1})$ are indicated by the first horizontal codebook index. Optionally, a value of n is indicated by the second codebook index. In this case, there should be a preset function relationship (such as a linear relationship) between $(m_1 \ldots m_{N_2})$ and $(m_1 \ldots m_{N_2})$ are indicated by the first vertical codebook index, the first differential vertical codebook index, and the second codebook index. There should also be a preset function relationship (such as a linear relationship) between $(l_1 \ldots l_{N_1})$, and $(l_1 \ldots l_{N_1})$ are indicated by the first horizontal codebook index, the first differential horizontal codebook index, and the second codebook index. Optionally, there should be a preset function relationship (such as a linear relationship) between $(m_0, m_1, \ldots, m_{N_2-1})$, and $(m_0, m_1, \ldots, m_{N_2-1})$ are indicated by the first vertical codebook index, the first differential vertical codebook index, and the second codebook index. There should also be a preset function relationship (such as a linear relationship) between $(l_0, l_1 \ldots, l_{N_1-1})$, and $(l_0, l_1 \ldots l_{N_1-1})$ are indicated by the first horizontal codebook index, the first differential horizontal codebook index, and the second codebook index.

A second manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. Values of n, $(\phi_1 \ldots \phi_{N2})$, and $(\theta_1 \ldots \theta_{N_1})$ are indicated by the second codebook index. $(m_1 \ldots m_{N_2})$ are indicated by both the first vertical codebook index and the second codebook index, and $(l_1 \ldots l_{N_1})$ are indicated by both the first horizontal codebook index and the second codebook index. Optionally, $(m_0, m_1, \ldots, m_{N_2-1})$ may be indicated by both the first vertical codebook index and the second codebook index, and $(l_0, l_1 \ldots, l_{N_1-1})$ may be indicated by both the first horizontal codebook index and the second codebook index.

Optionally, a value of the second PMI may correspond to two codebook indexes. For ease of description, the two codebook indexes are referred to as a second horizontal codebook index and a second vertical codebook index. $(\theta_1 \ldots \theta_{N_1})$ are indicated by the second vertical codebook index. $(\theta_1 \ldots \theta_{N_1})$ are indicated by the second horizontal codebook index. A value of n is indicated by both the second vertical codebook index and the second horizontal codebook index. $(m_1 \ldots m_{N_2})$ are indicated by both the first vertical codebook index and the second vertical codebook index. $(l_1 \ldots l_{N_1})$ are indicated by both the first horizontal codebook index and the second horizontal codebook index. Optionally, $(m_0, m_1, \ldots, m_{N_2-1})$, may be indicated by both the first vertical codebook index and the second vertical codebook index, and $(l_0, l_1 \ldots, l_{N_1-1})$ may be indicated by both the first horizontal codebook index and the second horizontal codebook index.

A third manner: PMIs include a first PMI, a second PMI, and a third PMI. The first PMI corresponds to two codebook indexes. For ease of description, the two codebook indexes are referred to as a first horizontal codebook index and a first vertical codebook index. The second PMI corresponds to a second codebook index. The third PMI corresponds to a third codebook index. A value of n is indicated by the second codebook index. $(m_1 \ldots m_{N_2})$ are indicated by all of the first vertical codebook index, the second codebook index, and the third codebook index. $(l_1 \ldots l_{N_1})$ are indicated by all of the first horizontal codebook index, the second codebook index, and the third codebook index. $(\phi_1 \ldots \phi_{N2})$ and $(\theta_1 \ldots \theta_{N_1})$ are indicated by the third codebook index. Optionally, $(m_0, m_1, \ldots, m_{N_2-1})$ may be indicated by all of the first vertical codebook index, the second codebook index, and the third codebook index; $(l_0, l_1 \ldots, l_{N_1-1})$ may be indicated by all of the first horizontal codebook index, the second codebook index, and the third codebook index; and $(\phi_1 \ldots \phi_{N2})$ and $(\theta_1 \ldots \theta_{N_1})$ may be indicated by the third codebook index.

Optionally, the third PMI may correspond to a third vertical codebook index and a third horizontal codebook index. In this case, $(\phi_1 \ldots \phi_{N2})$ are indicated by the third vertical codebook index, and $(\theta_1 \ldots \theta_{N_1})$ are indicated by the third horizontal codebook index. $(m_1 \ldots m_{N_2})$ are indicated by all of the first vertical codebook index, the second codebook index, and the third vertical codebook index. $(l_1 \ldots l_{N_1})$ are indicated by all of the first horizontal codebook index, the second codebook index, and the third horizontal codebook index. Optionally, $(m_0, m_1, \ldots, m_{N_2-1})$ may be indicated by all of the first vertical codebook index, the second codebook index, and the third vertical codebook index, and $(l_0, l_1 \ldots, l_{N_1-1})$ may be indicated by all of the first horizontal codebook index, the second codebook index, and the third horizontal codebook index.

On a UE side, the UE may perform channel estimation based on a reference signal, accordingly determine $W_{l,m,n,\theta,\phi}^{(1)}$, values of $(l_1, \ldots, l_{N_1}, m_1 \ldots m_{N_2}, n, \theta_1, \ldots, \theta_{N_1}, \phi_1, \ldots, \phi_{N_2})$, and a codebook index, and then feed back a PMI corresponding to the codebook index to the base station. On a base station side, the codebook index corresponding to the PMI is obtained, and the values of $(l_1 \ldots l_{N_1}, m_1 \ldots m_{N_2}, n, \theta_1, \ldots, \theta_{N_1}, \phi_1, \ldots, \phi_{N_2})$ may be obtained. A target precoding matrix may be obtained based on the values of $(l_1 \ldots l_{N_1}, m_1 \ldots m_{N_2}, n, \theta_1, \ldots, \theta_{N_1}, \ldots, \phi_{N_2})$ and $W_{l,m,n,\theta,\phi}^{(1)}$.

Optionally, on the UE side, the UE may perform channel estimation based on a reference signal, accordingly determine $W_{l,m,n,\theta,\phi}^{(1)}$, values of $(l_0, l_1 \ldots, l_{N_1-1})$, $(m_0, m_1, \ldots, m_{N_2-1})$, $(\phi_1 \ldots \phi_{N_2})$, $(\theta_1 \ldots \theta_{N_1})$, and n, and a codebook index, and then feed back a PMI corresponding to the codebook index to the base station. On a base station side, the codebook index corresponding to the PMI is obtained, and the values of $(l_0, l_1 \ldots, l_{N_1-1})$, $(m_0, m_1, \ldots, m_{N_2-1})$, $(\phi_1 \ldots \phi_{N2})$, $(\theta_1 \ldots \theta_{N_1})$, and n may be obtained. A target precoding matrix may be obtained based on the values of $(l_0, l_1 \ldots, l_{N_1-1})$, $(m_0, m_1, \ldots, m_{N_2-1})$, $(\phi_1 \ldots \phi_{N2})$, $(\theta_1 \ldots \theta_{N_1})$, and n, and $W_{l,m,n,\theta,\phi}^{(1)}$.

In another possible implementation, if the block codebook difference parameter is a modulus value difference, the structure of the precoding matrix in the codebook is shown in a formula 1.4:

$$W_{l,m,n,\beta,\alpha}^{(1)} = \begin{bmatrix} v_{l,\beta} \otimes u_{m,\alpha} \\ \varphi_n \cdot v_{l,\beta} \otimes u_{m,\alpha} \end{bmatrix}. \qquad \text{Formula 1.4}$$

Optionally, the formula may be:

$$W_{l,m,n,\phi,\theta}^{(1)} = \frac{1}{2N_1 N_2 K_1 K_2} \cdot \begin{bmatrix} v_{l,\beta} \otimes u_{m,\alpha} \\ \varphi_n v_{l,\beta} \otimes u_{m,\alpha} \end{bmatrix},$$

where $\varphi_n = e^{j\pi n/2}$ represents a phase difference between two polarization directions of an antenna; $v_{l,\beta} = [v_{l_1} \ \beta_1 v_{l_2} \ \ldots \ \beta_{N1} v_{l_{N1}}]$ optionally, $$v_{l,\beta} = [v_{l_0} \ \beta_1 v_{l_1} \ \ldots \ \beta_{N_1-1} v_{l_{N_1-1}}]^T,$$

where $v_{l,\beta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $l = l_1 \ldots l_{N1}$; optionally, $l = l_0, l_1, \ldots, l_{N_1-1}$, $v_l$ represents that each block codebook is formed based on a vector whose length is $K_1$, and $K_1$ is a quantity of CSI-RS ports corresponding to each block codebook in the horizontal dimension; $\beta$ represents a modulus value difference parameter in the horizontal dimension; $(\beta_1 \ldots \beta_{N_1})$ represent modulus value differences between precoding matrices in different block codebooks in the horizontal dimension; $u_{m,\alpha} = [u_{m_1} \ \alpha_1 u_{m_2} \ \ldots \ \alpha_{N_2} u_{m_3}]$, where $m = m_1 \ldots m_{N_2}$; optionally, $$u_{m,\alpha} = [u_{m_0} \ \alpha_1 u_{m_1} \ \ldots \ \alpha_{N_2-1} u_{m_{N_2-1}}]^T,$$

where $m = m_0, m_1, \ldots, m_{N_2-1}$, and $u_{m,\alpha}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \ldots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; $\alpha$ represents a modulus value difference parameter in the vertical dimension; $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

In this possible implementation, a manner of indicating a modulus value difference by using a PMI may be classified into the following possible manners:

A first manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. $(\alpha_1 \ldots \alpha_{N_1})$ are indicated by the first vertical codebook index. $(\beta_1 \ldots \beta_{N_1})$ are indicated by the first horizontal codebook index. Optionally, a value of n is indicated by the second codebook index; $(m_1 \ldots m_{N_2})$ are indicated by both the first vertical codebook index and the second codebook index; and $(l_1 \ldots l_{N_1})$ are indicated by both the first horizontal codebook index and the second codebook index. Optionally, $(m_0, m_1, \ldots, m_{N_2-1})$ may be indicated by both the first vertical codebook index and the second codebook index, and $(l_0, l_1 \ldots l_{N_1-1})$ may be indicated by both the first horizontal codebook index and the second codebook index.

Optionally, the first PMI may correspond to a first horizontal codebook index, a first differential horizontal codebook index, a first vertical codebook index, and a first differential vertical codebook index. $(\alpha_1 \ldots \beta_{N_1})$ are indicated by the first vertical codebook index. $(\beta_1 \ldots \beta_{N_1})$ are indicated by the first horizontal codebook index. Optionally, a value of n is indicated by the second codebook index. In this case, there should be a preset function relationship (such as a linear relationship) between $(m_1 \ldots m_{N_2})$, and $(m_1 \ldots m_{N_2})$ are indicated by the first vertical codebook index, the first differential vertical codebook index, and the second codebook index. There should also be a preset function relationship (such as a linear relationship) between $(l_1 \ldots l_{N_1})$, and $(l_1 \ldots l_{N_1})$ are indicated by the first horizontal codebook index, the first differential horizontal codebook index, and the second codebook index. Optionally, there should be a preset function relationship (such as a linear relationship) between $(m_0, m_1, \ldots, m_{N_2-1})$, and $(m_0, m_1, \ldots, m_{N_2-1})$ are indicated by the first vertical codebook index, the first differential vertical codebook index, and the second codebook index. There should also be a preset function relationship (such as a linear relationship) between $(l_0, l_1 \ldots, l_{N_1-1})$, and $(l_0, l_1 \ldots, l_{N_1-1})$ are indicated by the first horizontal codebook index, the first differential horizontal codebook index, and the second codebook index.

A second manner: PMIs include a first PMI and a second PMI. The first PMI corresponds to two codebook indexes. For ease of description, the two codebook indexes are referred to as a first horizontal codebook index and a first vertical codebook index. The second PMI corresponds to a second codebook index. Values of n, $(\alpha_1 \ldots \alpha_{N_1})$, and $(\beta_1 \ldots \beta_{N_1})$ are indicated by the second codebook index. $(m_1 \ldots m_{N_2})$ are indicated by both the first vertical codebook index and the second codebook index. $(l_1 \ldots l_{N_1})$ are indicated by both the first horizontal codebook index and the second codebook index. Optionally, $(m_0, m_1, \ldots, m_{N_2-1})$ may be indicated by both the first vertical codebook index and the second codebook index, and $(l_0, l_1 \ldots, l_{N_1-1})$ may be indicated by both the first horizontal codebook index and the second codebook index.

Optionally, a value of the second PMI may correspond to two codebook indexes. For ease of description, the two codebook indexes are referred to as a second horizontal codebook index and a second vertical codebook index. $(\alpha_1 \ldots \alpha_{N_1})$ are indicated by the second vertical codebook index; $(\beta_1 \ldots \beta_{N_1})$ are indicated by the second horizontal codebook index; and a value of n is indicated by both the second vertical codebook index and the second horizontal codebook index. $(m_1 \ldots m_{N_2})$ are indicated by both the first vertical codebook index and the second vertical codebook index. $(l_1 \ldots l_{N_1})$ are indicated by both the first horizontal codebook index and the second horizontal codebook index. Optionally, $(m_0, m_1, \ldots, m_{N_2-1})$ may be indicated by both the first vertical codebook index and the second vertical codebook index, and $(l_0, l_1 \ldots, l_{N_1-1})$ may be indicated by both the first horizontal codebook index and the second horizontal codebook index.

A third manner: PMIs include a first PMI, a second PMI, and a third PMI. The first PMI corresponds to two codebook indexes. For ease of description, the two codebook indexes are referred to as a first horizontal codebook index and a first vertical codebook index. The second PMI corresponds to a second codebook index. The third PMI corresponds to a third codebook index. A value of n is indicated by the second codebook index. $(m_1 \ldots m_{N_2})$ are indicated by all of the first vertical codebook index, the second codebook index, and the third codebook index. $(l_1 \ldots l_{N_1})$ are indicated by all of the first horizontal codebook index, the second codebook index, and the third codebook index. $(\alpha_1 \ldots \alpha_{N_1})$ and $(\beta_1 \ldots \beta_{N_1})$ are indicated by the third codebook index. Optionally, $(m_0, m_1, \ldots, m_{N_2-1})$ may be indicated by all of the first vertical codebook index, the second codebook index, and the third codebook index; $(l_0, l_1 \ldots, l_{N_1-1})$ may be indicated by all of the first horizontal codebook index, the second codebook index, and the third codebook index; and $(\alpha_1 \ldots \alpha_{N_1})$ and $(\beta_1 \ldots \beta_{N_1})$ may be indicated by the third codebook index.

Optionally, the third PMI may correspond to a third vertical codebook index and a third horizontal codebook index. In this case, $(\alpha_1 \ldots \alpha_{N_1})$ are indicated by the third vertical codebook index. $(\beta_1 \ldots \beta_{N_1})$ are indicated by the third horizontal codebook index. $(m_1 \ldots m_{N_2})$ are indicated by all of the first vertical codebook index, the second codebook index, and the third vertical codebook index. $(l_1 \ldots l_{N_1})$ are indicated by all of the first horizontal codebook index, the second codebook index, and the third horizontal codebook index.

On a UE side, the UE may perform channel estimation based on a reference signal, accordingly determine $W_{l,m,n,\beta,\alpha}^{(1)}$, values of $(l_1 \ldots l_{N_1}, m_1 \ldots m_{N_2}, n, \beta_1, \ldots, \beta_{N_1}, \alpha_1, \ldots, \alpha_{N_2})$, and a codebook index, and then feed back a PMI corresponding to the codebook index to the base station. On a base station side, the codebook index corresponding to the PMI is obtained, and the values of $(l_1 \ldots l_{N_1}, m_1 \ldots m_{N_2}, n, \beta_1, \ldots, \beta_{N_1}, \alpha_1, \ldots, \alpha_{N_2})$ may be obtained. A target precoding matrix may be obtained based on the values of $(l_1 \ldots l_{N_1}, m_1 \ldots m_{N_2}, n, \beta_1, \ldots, \beta_{N_1}, \alpha_1, \ldots, \alpha_{N_2})$ and $W_{l,m,n,\beta,\alpha}^{(1)}$.

Optionally, $(m_0, m_1, \ldots, m_{N_2-1})$ may be indicated by all of the first vertical codebook index, the second codebook index, and the third vertical codebook index, and $(l_0, l_1 \ldots l_{N_1-1})$ may be indicated by all of the first horizontal codebook index, the second codebook index, and the third horizontal codebook index. On the UE side, the UE may perform channel estimation based on a reference signal, accordingly determine $W_{l,m,n,\beta,\alpha}^{(1)}$, values of $(l_0, l_1 \ldots, l_{N_1-1})$, $(m_0, m_1, \ldots, m_{N_2-1})$, $(\alpha_1 \ldots \alpha_{N_1})$, $(\beta_1 \ldots \beta_{N_1})$, and n, and a codebook index, and then feed back a PMI corresponding to the codebook index to the base station. On a base station side, the codebook index corresponding to the PMI is obtained, and the values of $(l_0, l_1 \ldots, l_{N_1-1})$, $(m_0, m_1, \ldots, m_{N_2-1})$, $(\alpha_1 \ldots \alpha_{N_1})$, $(\beta_1 \ldots \beta_{N_1})$ and n may be obtained. A target precoding matrix may be obtained based on the values of $(l_0, l_1 \ldots, l_{N_1-1})$, $(m_0, m_1, \ldots, m_{N_2-1})$, $(\alpha_1 \ldots \alpha_{N_1})$, $(\beta_1 \ldots \beta_{N_1})$ and n, and $W_{l,m,n,\beta,\alpha}^{(1)}$.

Persons skilled in the art may understand that, in the foregoing various embodiments, the correspondence between a PMI and a codebook index and various indication functions of the codebook index merely show some specific examples schematically. During specific implementation, based on the foregoing embodiments, there may be a plurality of implementations, and details are not described again in this embodiment.

Figure 6:
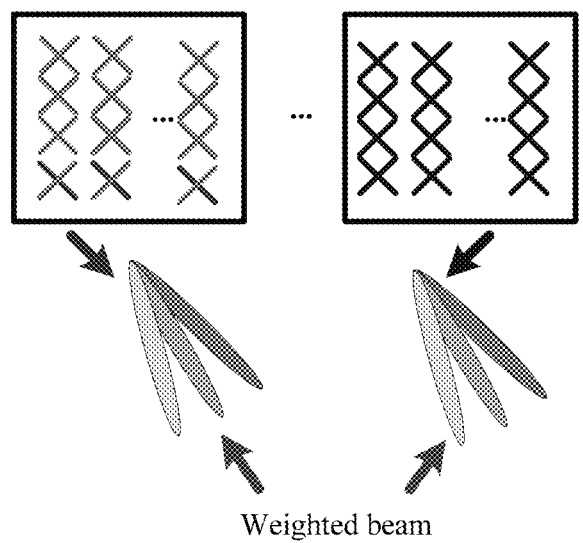
FIG. 6 is a third schematic diagram of an antenna panel and a beam according to an embodiment of the present invention.

In this embodiment, vectors corresponding to block codebooks are weighted vectors corresponding to adjacent beams at a plurality of different angles. FIG. 6 is a third schematic diagram of an antenna panel and a beam according to an embodiment of the present invention. As shown in FIG. 6, DFT vectors corresponding to block codebooks are DFT vectors corresponding to a beam at a same radiation angle or DFT vectors corresponding to beams at different radiation angles. The DFT vectors corresponding to the block codebooks are combined into a DFT vector corresponding to a transmit beam in a splicing manner or the like.

In this case, the structure of the precoding matrix in the codebook is specifically shown in the following formula 2.9:

$$W^{(1)}_{m_1,\ldots,m_k,l_1,\ldots,l_k,n} = \begin{bmatrix} c_{1,1} \cdot u_{m_1} \otimes v_{l_1} + c_{2,1} \cdot u_{m_2} \otimes v_{l_2} + \ldots + c_{K,1} \cdot u_{m_K} \otimes v_{l_K} \\ \vdots \\ c_{1,N_1N_2} \cdot u_{m'_1} \otimes v_{l'_1} + c_{2,N_1N_2} \cdot u_{m'_2} \otimes v_{l'_2} + \ldots + c_{K,N_1N_2} \cdot u_{m'_K} \otimes v_{l'_K} \\ \varphi_n(c_{1,1} \cdot u_{m_1} \otimes v_{l_1} + c_{2,1} \cdot u_{m_2} \otimes v_{l_2} + \ldots + c_{K,1} \cdot u_{m_K} \otimes v_{l_K}) \\ \vdots \\ \varphi_n(c_{1,N_1N_2} \cdot u_{m'_1} \otimes v_{l'_1} + c_{2,N_1N_2} \cdot u_{m'_2} \otimes v_{l'_2} + \ldots + c_{K,N_1N_2} \cdot u_{m'_K} \otimes v_{l'_K}) \end{bmatrix}$$

Formula 2.9 where $\varphi_n = e^{j\pi n/2}$ represents a phase difference between two polarization directions of an antenna;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{cases} \begin{bmatrix} 1 & e^{j\frac{2\pi m}{O_2 K_2}} & \ldots & e^{j\frac{2\pi m(K_2-1)}{O_2 K_2}} \end{bmatrix}^T & K_2 > 1 \\ 1 & K_2 = 1 \end{cases},$$

where $m = m_1, \ldots, m_K, m'_1, \ldots m'_K$; and $$v_l = \begin{bmatrix} 1 & e^{j\frac{2\pi l}{O_1 K_1}} & \ldots & e^{j\frac{2\pi l(K_1-1)}{O_1 K_1}} \end{bmatrix}^T \text{ or}$$

$$v_l = \begin{cases} \begin{bmatrix} 1 & e^{j\frac{2\pi l}{O_1 K_1}} & \ldots & e^{j\frac{2\pi l(K_1-1)}{O_1 K_1}} \end{bmatrix}^T & K_1 > 1 \\ 1 & K_1 = 1 \end{cases}$$

represents a DFT weighted base vector, where $l = l_1, \ldots, l_K$, $l'_1, \ldots, l'_K$. K values obtained by $(m_1, m_2, \ldots m_K)$-$(m'_1, m'_2, \ldots m'_K)$ may be equal (if the K values are equal, the K values are equivalent to one value), or not equal. K values obtained by $(l_1, l_2, \ldots l_K)$-$(l'_1, l'_2, \ldots l'_K)$ may be equal (if the K values are equal, the K values are equivalent to one value), or not equal. A value of K may be configured by using higher layer signaling. $(c_{1,1}, c_{2,1}, \ldots, c_{K,1}, c_{1,N_1N_2}, c_{2,N_1N_2}, \ldots, c_{K,N_1N_2})$ represent weighted values of different beam components, and $K_1$ is a quantity of CSI-RS ports corresponding to each block codebook in a horizontal dimension, and $K_2$ is a quantity of CSI-RS ports corresponding to each block codebook in a vertical dimension; $O_1$ and $O_2$ represent over-sampling factors; and l, m, and n each are a function of a codebook index. At least one of the weighted values $(c_{1,1}, c_{2,1}, \ldots, c_{K,1}, c_{1,N_1N_2}, c_{2,N_1N_2}, \ldots, c_{K,N_1N_2})$ may be a phase weight or an amplitude weight or a product of a phase weight and an amplitude weight; and/or some of $(c_{1,1}, c_{2,1}, \ldots, c_{K,1}, c_{1,N_1N_2}, c_{2,N_1N_2}, \ldots, c_{K,N_1N_2})$ may be 0. For example, $c_{i,j} = p_{i,j}^{(1)} p_{i,j}^{(2)} \varphi_{i,j}$, where $p_{i,j}^{(1)}$ represents a wideband amplitude factor; $p_{i,j}^{(2)}$ represents a subband amplitude factor; $\varphi_{i,j}$ represents a phase factor; and $\varphi_{i,j} = e^{j2\pi i_{2,r}/N_{PSK}}$, where $r = 1, 2, \ldots$, or $KN_1N_2$, and a value of $N_{PSK}$ may be one in $\{2, 4, 8\}$. Alternatively, $c_{i,j} = p_{i,j}^{(1)} p_{i,j}^{(2)} \varphi_{i,j}$, where $p_{i,j}^{(1)}$ represents a wideband amplitude factor; $p_{i,j}^{(2)}$ represents a subband amplitude factor; $\varphi_{i,j}$ represents a phase factor; and $\varphi_{i,j} = e^{j2\pi i_{2,r}/N_{PSK}}$, where $r = 1, 2, \ldots$, or $KN_1N_2$, and a value of $N_{PSK}$ may be one in $\{2, 4, 8\}$. Alternatively, $c_{i,j} = p_{i,j}^{(1)} p_{i,j}^{(2)} \varphi_{i,j}^{(1)} \varphi_{i,j}^{(2)}$, where $p_{i,j}^{(1)}$ represents a wideband amplitude factor; $p_{i,j}^{(2)}$ represents a subband amplitude factor; $\varphi_{i,j}^{(1)}$ represents a wideband phase factor; and $\varphi_{i,j}^{(2)}$ represents a subband phase factor, where $i = 1, \ldots$, or K, and $j = 1, \ldots$, or $N_1N_2$.

The UE may feed back two pieces of PMI information. $(m_1, m_2, \ldots m_K)$ may be encoded by using a codebook index corresponding to a first PMI, and fed back by using the first PMI; and $(l_1, l_2, \ldots l_K)$ may be encoded by using the codebook index corresponding to the first PMI, and fed back by using the first PMI. Optionally, $(m'_1, m'_2, \ldots m'_K)$ may be encoded by using a codebook index corresponding to a first PMI, and fed back by using the first PMI; or $(m_1, m_2, \ldots m_K)$-$(m'_1, m'_2, \ldots m'_K)$ may be encoded by using a codebook index corresponding to a first PMI, and fed back by using the first PMI, or encoded by using a codebook index corresponding to a second PMI, and fed back by using the second PMI. Optionally, $(l'_1, l'_2, \ldots l'_K)$ may be encoded by using a codebook index corresponding to a first PMI, and fed back by using the first PMI; or $(l_1, l_2, \ldots l_K)$-$(l'_1, l'_2, \ldots l'_K)$ may be encoded by using a codebook index corresponding to a first PMI, and fed back by using the first PMI, or encoded by using a codebook index corresponding to a second PMI, and fed back by using the second PMI.

At least one of the weighted values $(c_{1,1}, c_{2,1}, \ldots, c_{K,1}, c_{1,N_1N_2}, c_{2,N_1N_2}, \ldots, c_{K,N_1N_2})$ may be encoded by using a codebook index corresponding to a first PMI, and fed back by using the first PMI, or may be encoded by using a codebook index corresponding to a second PMI, and fed back by using the second PMI, or may be encoded by using a codebook index corresponding to a first PMI and a codebook index corresponding to a second PMI, and fed back by using the first PMI and the second PMI. For example, at least one weighted value is a product of a phase weight and an amplitude weight. The amplitude weight may be fed back by using the first PMI, and the phase weight may be fed back by using the second PMI; or the phase weight or the amplitude weight may include two components, where a first component is fed back by using the first PMI, and a second component is fed back by using the second PMI.

Alternatively, the UE may feed back three pieces of PMI information to the TRP. $(m_1, m_2, \ldots m_K)$–$(m'_1, m'_2, \ldots m'_K)$ may be encoded by using a codebook index corresponding to a first PMI, and fed back by using the first PMI, or may be encoded by using a codebook index corresponding to a second PMI, and fed back by using the second PMI, or may be encoded by using a codebook index corresponding to a third PMI, and fed back by using the third PMI. $(l_1, l_2, \ldots l_K)$–$(l'_1, l'_2, \ldots l'_K)$ may be encoded by using a codebook index corresponding to a first PMI, and fed back by using the first PMI, or may be encoded by using a codebook index corresponding to a second PMI, and fed back by using the second PMI, or may be encoded by using a codebook index corresponding to a third PMI, and fed back by using the third PMI. At least one of the weighted values $(c_{1,1}, c_{2,1}, \ldots, c_{K,1}, c_{1,N_1N_2}, c_{2,N_1N_2}, \ldots, c_{K,N_1N_2})$ may be fed back by using at least one of the first PMI, the second PMI, and the third PMI. For example, at least one weighted value is a product of a phase weight and an amplitude weight. The amplitude weight may be fed back by using at least one of the first PMI, the second PMI, and the third PMI, and the phase weight may be fed back by using at least one of the first PMI, the second PMI, and the third PMI.

According to the codebook-based channel state information feedback method provided in the foregoing embodiment of the present invention, in a multi-panel antenna structure, beam directivity can be ensured, and system performance can be improved with respect to an existing codebook. A design is simple, and a structured feature of a DFT codebook can be ensured. A codebook is generated by using a codebook configuration parameter, thereby achieving relatively good extensibility.

Table 2 provides performance comparison in a scenario of eight antennas. The eight antennas are grouped into two groups, and each group includes four antennas. A spacing between antennas in a group is 0.5 time of a wavelength, and a spacing between groups of antennas is eight times of a wavelength. A DFT codebook is an LTE R10 codebook. An advanced codebook (Advanced CB) provides a codebook solution based on phase compensation and adjacent beam selection that is provided in the embodiment of the present invention, namely, the embodiment corresponding to FIG. 5. It may be learned from Table 2 that, the codebook provided in this embodiment of the present invention has an obvious performance gain compared with an existing codebook.

TABLE 2

| | Signal-to-noise ratio | | | | | |
|---|---|---|---|---|---|---|
| | 3 | 7 | 11 | 15 | 19 | 23 |
| R10-codebook | 8.4977 | 12.3307 | 17.2316 | 20.7689 | 22.8085 | 23.6347 |
| Advanced CB | 9.1604 | 13.3258 | 18.877 | 22.2036 | 24.4787 | 25.1669 |
| Gain | 7.79% | 8.07% | 9.55% | 6.90% | 7.32% | 6.48% |

The solutions provided in the embodiments of the present invention are described above mainly from a perspective of interaction between the TRP and the user equipment. It may be understood that, to implement the foregoing functions, the TRP and the user equipment include corresponding hardware structures and/or software modules for performing the functions. With reference to examples of units and algorithm steps described in the embodiments disclosed in the present invention, the embodiments of the present invention may be implemented in a hardware form or a form of a combination of hardware and computer software. Whether the functions are performed by hardware or by computer software driving hardware depends on particular applications and design constraint conditions of the technical solutions. Persons skilled in the art may use different methods to implement the described functions for each particular application, but it should not be considered that, the implementation goes beyond the scope of the technical solutions of the embodiments of the present invention.

In the embodiments of the present invention, functional units of the TRP and the user equipment may be divided according to the foregoing examples in the method, for example, the functional units may be divided for various corresponding functions, or two or more functions may be integrated in a processing unit. The integrated unit may be implemented in a form of hardware, or may be implemented in a form of a software functional unit. It should be noted that, in the embodiments of the present invention, the unit division is an example and is merely logical function division and may be other division during actual implementation.

Figure 7:
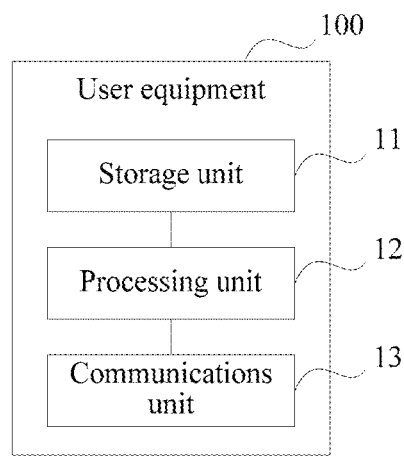
FIG. 7 is a schematic structural diagram of user equipment according to an embodiment of the present invention.

When a centralized unit is used, FIG. 7 is a schematic structural diagram of user equipment according to an embodiment of the present invention. As shown in FIG. 7, the user equipment 100 includes a processing unit 12 and a communications unit 13. The processing unit 12 is configured to control and manage an operation of the user equipment. For example, the processing unit 12 may determine a target precoding matrix in a pre-generated codebook. The communications unit 13 is configured to: support communication between the user equipment and a TRP, for example, send a PMI to the TRP, and receive a codebook configuration parameter sent by the TRP. The user equipment may further include a storage unit 11, configured to store program code and data of the user equipment.

The processing unit 12 may be a processor, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The processing unit 12 can implement or perform various examples of logic blocks, modules, and circuits described with reference to content disclosed in the present invention. Alternatively, the processor may be a combination that implements a calculation function, for example, including one microprocessor or a combination of a plurality of microprocessors, or a combination of a DSP and a microprocessor. The communications unit 13 is a communications interface, for example, a transceiver or a transceiver circuit. The storage unit 11 may be a memory.

Figure 8:
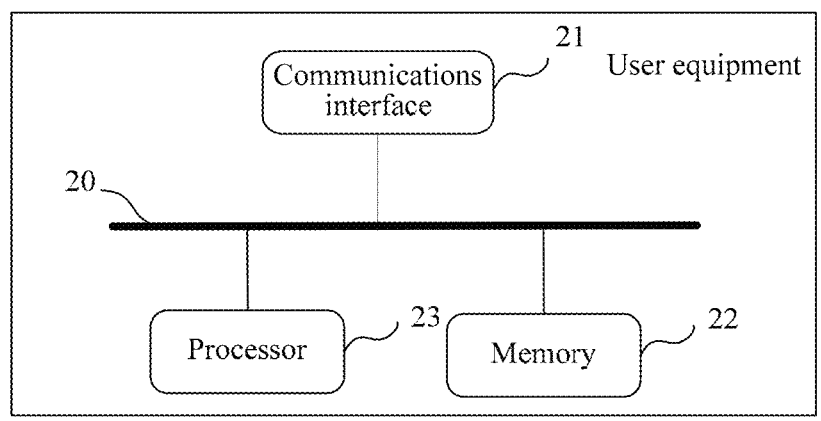
FIG. 8 is a schematic diagram of a hardware structure of user equipment according to an embodiment of the present invention.

When the processing unit 12 is a processor, the communications unit 13 is a communications interface, and the storage unit 11 is a memory, the user equipment in this embodiment of the present invention may be user equipment shown in FIG. 8.

FIG. 8 is a schematic diagram of a hardware structure of the user equipment according to an embodiment of the present invention. As shown in FIG. 8, the user equipment may include a communications interface 21, a processor 23, a memory 22, and at least one communications bus 20. The communications bus 20 is configured to implement communication and a connection between components. The memory 22 may include a high-speed RAM memory, and may further include a non-volatile memory NVM, for example, at least one magnetic disk storage. Computer executable program code may be stored in the memory 22, and the program code includes an instruction. When the processor 22 executes the instruction, the instruction causes the processor 22 to complete various processing functions and implement method steps in this embodiment.

Figure 9:
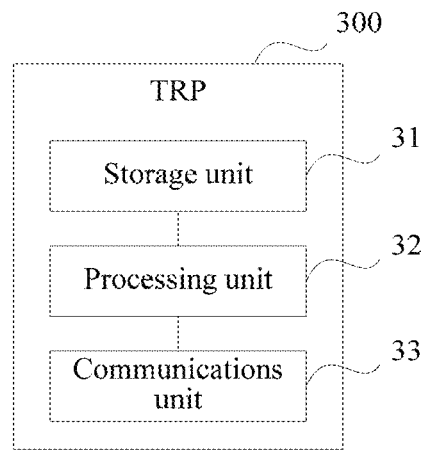
FIG. 9 is a schematic structural diagram of a TRP according to an embodiment of the present invention.

When an integrated unit is used, FIG. 9 is a schematic structural diagram of a TRP according to an embodiment of the present invention. The TRP 300 includes a processing unit 32 and a communications unit 33. The communications unit 33 is used to support communication between the TRP and user equipment. The processing unit 32 is configured to control and manage an operation of the TRP. For example, the processing unit 32 may determine, based on a PMI, a target precoding matrix in a pre-generated a codebook. The communications unit 33 may receive a PMI sent by the UE, and send a codebook configuration parameter to the UE. The TRP may further include a storage unit 31, configured to store program code and data of the TRP.

The processing unit 32 may be a processor, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The processing unit 32 can implement or perform various examples of logic blocks, modules, and circuits described with reference to content disclosed in the present invention. Alternatively, the processor may be a combination that implements a calculation function, for example, including one microprocessor or a combination of a plurality of microprocessors, or a combination of a DSP and a microprocessor. The communications unit 33 may be a communications interface, for example, include a transceiver or a transceiver circuit. The storage unit 31 may be a memory.

Figure 10:
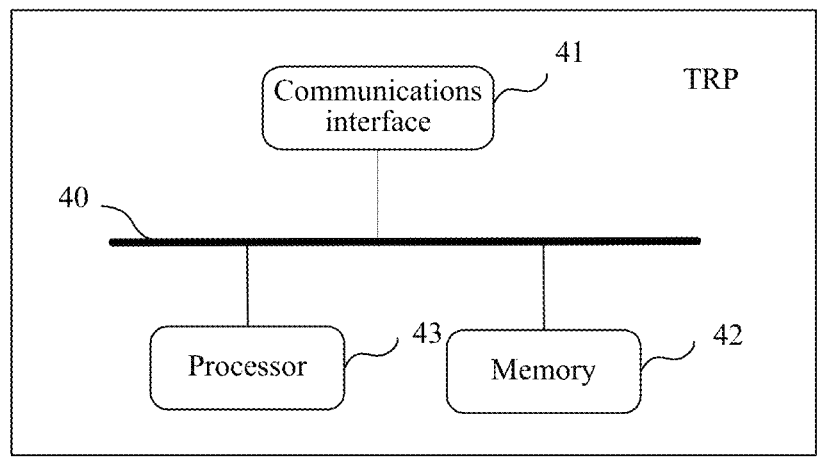
FIG. 10 is a schematic diagram of a hardware structure of a TRP according to an embodiment of the present invention.

When the processing unit 32 is a processor, the communications unit 33 is a communications interface, and the storage unit 31 is a memory, the TRP in this embodiment of the present invention may be a TRP shown in FIG. 10. FIG. 10 is a schematic diagram of a hardware structure of the TRP according to an embodiment of the present invention. As shown in FIG. 10, the TRP may include a communications interface 41, a processor 43, a memory 42, and at least one communications bus 40. The communications bus 40 is configured to implement communication and a connection between components. The memory 42 may include a high-speed RAM memory, and may further include a non-volatile memory NVM, for example, at least one magnetic disk storage. Computer executable program code may be stored in the memory 42, and the program code includes an instruction. When the processor 42 executes the instruction, the instruction causes the processor 42 to complete various processing functions and implement method steps in this embodiment.

Figure 11:
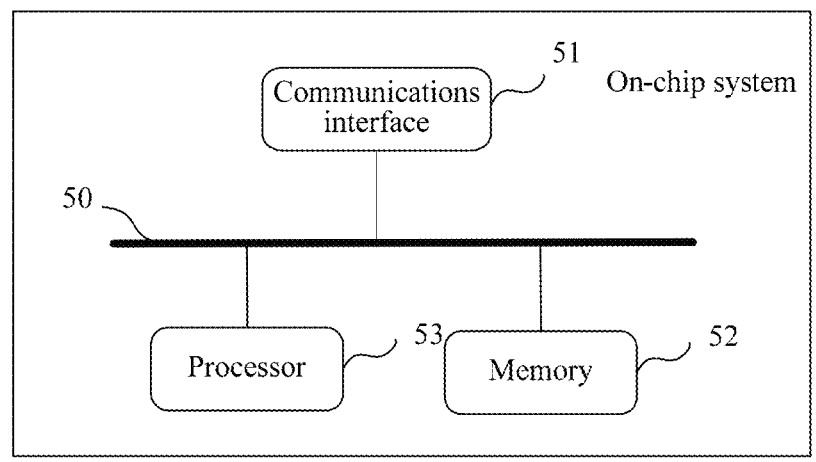
FIG. 11 is a schematic structural diagram of an on-chip system according to an embodiment of the present invention.

An embodiment of the present invention further provides an on-chip system. FIG. 11 is a schematic structural diagram of an on-chip system according to an embodiment of the present invention. As shown in FIG. 11, the on-chip system is applicable to user equipment. The on-chip system includes at least one communications interface 51, at least one processor 53, and at least one memory 52. The communications interface 51, the memory 52, and the processor 53 are interconnected by using a bus 50. The processor executes an instruction stored in the memory, to cause the user equipment to perform the foregoing method.

Figure 12:
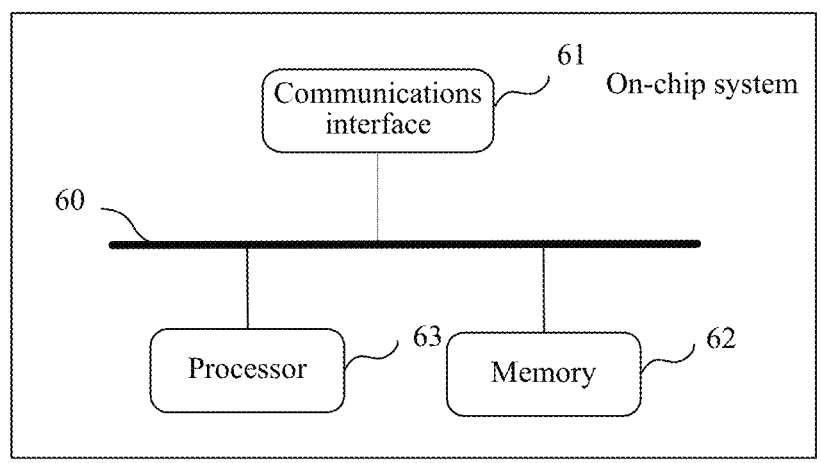
FIG. 12 is a schematic structural diagram of an on-chip system according to an embodiment of the present invention.

An embodiment of the present invention further provides an on-chip system. FIG. 12 is a schematic structural diagram of an on-chip system according to an embodiment of the present invention. As shown in FIG. 12, the on-chip system is applicable to a TRP. The on-chip system includes at least one communications interface 61, at least one processor 63, and at least one memory 62. The communications interface 61, the memory 62, and the processor 63 are interconnected by using a bus 60. The processor executes an instruction stored in the memory, to cause the TRP to perform the foregoing method.

This application further provides the following embodiments:

Embodiment 1

A codebook-based channel state information feedback method includes:

sending, by user equipment UE, a precoding matrix indicator PMI to a transmission/reception point TRP, where the PMI is used to indicate a target precoding matrix and a parameter value that corresponds to a block codebook difference parameter, where the target precoding matrix is a precoding matrix in a codebook; the codebook is a codebook pre-generated by the UE based on a codebook configuration parameter; at least some precoding matrices in the codebook are obtained through transformation from precoding matrices in block codebooks and the parameter value; there are at least two block codebooks; there is a correspondence between a quantity of parameter values and a quantity of block codebooks; the codebook configuration parameter includes the quantity of block codebooks in the codebook and a length of a vector corresponding to a precoding matrix in the block codebook; and the block codebook is formed based on a preset precoding matrix.

Embodiment 2

In the method according to Embodiment 1, the block codebooks include a block codebook in a horizontal dimension and a block codebook in a vertical dimension; and the codebook configuration parameter includes: a quantity of block codebooks in the horizontal dimension and a length of a vector corresponding to a precoding matrix in the block codebook in the horizontal dimension, where there are at least two block codebooks in the horizontal dimension; and a quantity of block codebooks in the vertical dimension and a length of a vector corresponding to a precoding matrix in the block codebook in the vertical dimension, where there are at least two block codebooks in the vertical dimension.

Embodiment 3

In the method according to Embodiment 2, the PMIs include a first PMI corresponding to wideband CSI and a second PMI corresponding to subband CSI, and the first PMI or the second PMI is used to indicate the parameter value that corresponds to the block codebook difference parameter.

Embodiment 4

In the method according to Embodiment 3, the first PMI is used to indicate the parameter value, and the first PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension; or the second PMI is used to indicate the parameter value, and the second PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

Embodiment 5

In the method according to Embodiment 2, the PMIs include a first PMI corresponding to wideband CSI, a second PMI corresponding to narrowband CSI, and a third PMI, and the third PMI is used to indicate the parameter value that corresponds to the block codebook difference parameter.

Embodiment 6

In the method according to Embodiment 5, the third PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

Embodiment 7

In the method according to any one of Embodiment 1 to Embodiment 6, before the sending, by user equipment UE, a precoding matrix indicator PMI to a transmission/reception point TRP, the method further includes:

receiving, by the UE, the codebook configuration parameter sent by the TRP.

Embodiment 8

In the method according to Embodiment 7, the receiving, by the user equipment UE, the codebook configuration parameter sent by the TRP includes:

receiving, by the UE, higher layer signaling or physical layer signaling sent by the TRP, where the higher layer signaling or the physical layer signaling carries the codebook configuration parameter.

Embodiment 9

In the method according to any one of Embodiment 2 to Embodiment 6, a vector corresponding to each block codebook is a vector corresponding to a beam at a same radiation angle.

Embodiment 10

In the method according to Embodiment 9, if the block codebook difference parameter is a phase difference, a structure of the precoding matrix in the codebook is specifically shown in the following formula 1.1:

$$W^{(1)}_{l,m,n,\phi,\theta} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix} \quad \text{Formula 1.1}$$

where $\varphi_n = e^{j\pi n/2}$ represents a phase difference between two polarization directions of an antenna;

$$v_{l,\theta} = \begin{bmatrix} v_l & e^{j\theta_1} v_l & \cdots & e^{j\theta_{N_1-1}} v_l \end{bmatrix}^T,$$

where $v_{l,\theta}$ represents a precoding matrix in the codebook that is obtained through transformation from $N_1$ block codebooks in a horizontal dimension and the parameter value that corresponds to the block codebook difference parameter; $[\bullet]^T$ represents a conjugate transpose operation;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_m & e^{j\phi_1} u_m & \cdots & e^{j\phi_{N_2-1}} u_m \end{bmatrix}^T,$$

where $[\bullet]^T$ represents a conjugate transpose operation, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; $\phi$ represents a phase difference parameter in the vertical dimension; $(\phi_1 \ldots \phi_{N_2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Embodiment 11

In the method according to Embodiment 9, if the block codebook difference parameter is a modulus value difference, a structure of the precoding matrix in the codebook is specifically shown in the following formula 1.2:

$$W^{(1)}_{l,m,n,\beta,\theta} = \frac{1}{2N_1 N_2 K_1 K_2} \cdot \begin{bmatrix} v_{l,\beta} \otimes u_{m,\alpha} \\ \varphi_n v_{l,\beta} \otimes u_{m,\alpha} \end{bmatrix} \quad \text{Formula 1.2}$$

where $\varphi_n = e^{j\pi n/2}$ represents a phase difference between two polarization directions of an antenna; $v_{l,\beta} = [v_l \ \beta_1 v_l \ \cdots$ $\beta_{N_1-1} v_l$], where $[\bullet]^T$ represents a conjugate transpose operation, and $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\beta$ represents a modulus value difference parameter in the horizontal dimension; $(\beta_1 \ldots \beta_{N_1})$ represent modulus value differences between precoding matrices in different block codebooks in the horizontal dimension; $u_{m,\alpha} = [u_m \; \alpha_1 u_m \; \ldots \; \alpha_{N_2-1} u_m]^T$, where $[\bullet]^T$ represents a conjugate transpose operation, and $u_{m,\alpha}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \ldots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; $\alpha$ represents a modulus value difference parameter in the vertical dimension; $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Embodiment 12

In the method according to any one of Embodiment 2 to Embodiment 6, vectors corresponding to the block codebooks are vectors corresponding to beams at different radiation angles.

Embodiment 13

In the method according to Embodiment 12, if the block codebook difference parameter is a phase difference, a structure of the precoding matrix in the codebook is shown in a formula 1.3:

$$W^{(1)}_{l,m,n,\phi,\theta} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix} \quad \text{Formula 1.3}$$

where $\varphi_n = e^{j\pi n/2}$ represents a phase difference between two polarization directions of an antenna; $v_{l,\beta} = [v_l \; \beta_1 v_l \; \ldots \; \beta_{N_1-1} v_l]^T$, where $l = l_0, l_1, \ldots, l_{N_1-1}$, $[\bullet]^T$ represents a conjugate transpose operation, and $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_{m_0} & e^{j\phi_1} u_{m_1} & \ldots & e^{j\phi_{N_2-1}} u_{m_{N_2-1}} \end{bmatrix}^T,$$

where $[\bullet]^T$ represents a conjugate transpose operation, $m = m_0, m_1, \ldots, m_{N_2-1}$, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \ldots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; $\phi$ represents a phase difference parameter in the vertical dimension; $(\phi_1 \ldots \phi_{N2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Embodiment 14

In the method according to Embodiment 12, if the block codebook difference parameter is a modulus value difference, a structure of the precoding matrix in the codebook is shown in a formula 1.4:

$$W^{(1)}_{l,m,n,\phi,\theta} = \frac{1}{2N_1 N_2 K_1 K_2} \cdot \begin{bmatrix} v_{l,\beta} \otimes u_{m,\alpha} \\ \varphi_n v_{l,\beta} \otimes u_{m,\alpha} \end{bmatrix} \quad \text{Formula 1.4}$$

where $\varphi_n = e^{j\pi n/2}$ represents a phase difference between two polarization directions of an antenna;

$$v_{l,\beta} = \begin{bmatrix} v_{l_0} & \beta_1 v_{l_1} & \ldots & \beta_{N_1-1} v_{l_{N_1-1}} \end{bmatrix}^T,$$

where $v_{l,\beta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \ldots & e^{j\frac{2\pi l(K_1-1)}{O_1 \cdot K_1}} \end{bmatrix},$$

where $l=l_0, l_1, \ldots, l_{N_1-1}$; and $v_l$ represents that each block codebook is formed based on a vector whose length is $K_1$, and $K_1$ is a quantity of CSI-RS ports corresponding to each block codebook in the horizontal dimension; β represents a modulus value difference parameter in the horizontal dimension; $(\beta_1 \ldots \beta_{N_1})$ represent modulus value differences between precoding matrices in different block codebooks in the horizontal dimension;

$$u_{m,\alpha} = [u_{m_0} \; \alpha_1 u_{m_1} \; \ldots \; \alpha_{N_2-1} u_{m_{N_2-1}}]^T,$$

where $[\bullet]^T$ represents a conjugate transpose operation, $m=m_1 \ldots m_{N_2}$, and $u_{m,\alpha}$ represents a precoding matrix in the codebook that is obtained through transformation from $N_2$ block codebooks in a vertical dimension and the parameter value that corresponds to the block codebook difference parameter;

$$u_m = \left[ 1 \quad e^{j\frac{2\pi m}{O_2 \cdot K_2}} \quad \ldots \quad e^{j\frac{2\pi m(K_2-1)}{O_2 \cdot K_2}} \right],$$

where $u_m$ represents that each block codebook is formed based on a vector whose length is $K_2$, and $K_2$ is a quantity of CSI-RS ports corresponding to each block codebook in the vertical dimension; α represents a modulus value difference parameter in the vertical dimension; $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

Embodiment 15

A codebook-based channel state information feedback method includes:

receiving, by a transmission/reception point TRP, a precoding matrix indicator PMI sent by user equipment UE, where the PMI is used to indicate a target precoding matrix and a parameter value that corresponds to a block codebook difference parameter, where the target precoding matrix is a precoding matrix in a codebook; the codebook is a codebook pre-generated by the TRP based on a codebook configuration parameter; at least some precoding matrices in the codebook are obtained through transformation from precoding matrices in block codebooks and the parameter value; there are at least two block codebooks; there is a correspondence between a quantity of parameter values and a quantity of block codebooks; the codebook configuration parameter includes the quantity of block codebooks in the codebook and a length of a vector corresponding to a precoding matrix in the block codebook; and the block codebook is formed based on a preset precoding matrix.

Embodiment 16

In the method according to Embodiment 15, the block codebooks include a block codebook in a horizontal dimension and a block codebook in a vertical dimension; and the codebook configuration parameter includes: a quantity of block codebooks in the horizontal dimension and a length of a vector corresponding to a precoding matrix in the block codebook in the horizontal dimension, where the quantity of the block codebooks is at least two in the horizontal dimension; and a quantity of block codebooks in the vertical dimension and a length of a vector corresponding to a precoding matrix in the block codebook in the vertical dimension, where there are at least two block codebooks in the vertical dimension.

Embodiment 17

In the method according to Embodiment 16, the PMIs include a first PMI corresponding to wideband CSI and a second PMI corresponding to subband CSI, and the first PMI or the second PMI is used to indicate the parameter value that corresponds to the block codebook difference parameter.

Embodiment 18

In the method according to Embodiment 17, the first PMI is used to indicate the parameter value, and the first PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension; or the second PMI is used to indicate the parameter value, and the second PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

Embodiment 19

In the method according to Embodiment 16, the PMIs include a first PMI corresponding to wideband CSI, a second PMI corresponding to narrowband CSI, and a third PMI, and the third PMI is used to indicate the parameter value that corresponds to the block codebook difference parameter.

Embodiment 20

In the method according to Embodiment 19, the third PMI corresponds to two codebook indexes, where one codebook index is used to indicate a parameter value that corresponds to a block codebook difference parameter in a horizontal dimension, and the other codebook index is used to indicate a parameter value that corresponds to a block codebook difference parameter in a vertical dimension.

Embodiment 21

In the method according to any one of Embodiment 15 to Embodiment 20, before the receiving, by a transmission/reception point TFP, a precoding matrix indicator PMI sent by user equipment UE, the method further includes:

sending, by the TRP, the codebook configuration parameter to the UE.

Embodiment 22

In the method according to Embodiment 21, the sending, by the TRP, the codebook configuration parameter to the UE includes:

sending, by the TRP, higher layer signaling or physical layer signaling to the UE, where the higher layer signaling or the physical layer signaling carries the codebook configuration parameter.

Embodiment 23

In the method according to any one of Embodiment 16 to Embodiment 20, a vector corresponding to each block codebook is a vector corresponding to a beam at a same radiation angle.

Embodiment 24

In the method according to Embodiment 23, if the block codebook difference parameter is a phase difference, a structure of the precoding matrix in the codebook is specifically shown in the following formula 1.1:

$$W^{(1)}_{l,m,n,\phi,\theta} = \frac{1}{2N_1 N_2 K_1 K_2} \cdot \begin{bmatrix} v_{l,\theta} \otimes u_{m,\phi} \\ \varphi_n v_{l,\theta} \otimes u_{m,\phi} \end{bmatrix} \qquad \text{Formula 1.1}$$

where $\varphi_n = e^{j\pi n/2}$ represents a phase difference between two polarization directions of an antenna;

$$v_{l,\theta} = \begin{bmatrix} v_l & e^{j\theta_1} v_l & \cdots & e^{j\theta_{N_1-1}} v_l \end{bmatrix}^T,$$

where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; θ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_m & e^{j\phi_1} u_m & \cdots & e^{j\phi_{N_2-1}} u_m \end{bmatrix}^T,$$

where $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each codebook in the vertical dimension; φ represents a phase difference parameter in the vertical dimension; $(\phi_1 \ldots \phi_{N_2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

Embodiment 25

In the method according to Embodiment 23, if the block codebook difference parameter is a modulus value difference, a structure of the precoding matrix in the codebook is specifically shown in the following formula 1.2:

$$W^{(1)}_{l,m,n,\phi,\theta} = \frac{1}{2N_1 N_2 K_1 K_2} \cdot \begin{bmatrix} v_{l,\beta} \otimes u_{m,\alpha} \\ \varphi_n v_{l,\beta} \otimes u_{m,\alpha} \end{bmatrix} \qquad \text{Formula 1.2}$$

where $\varphi_n = e^{j\pi n/2}$ represents a phase difference between two polarization directions of an antenna; $v_{l,\beta} = [v_l\ \beta_1 v_l\ \cdots\ \beta_{N_1-1} v_l]^T$, where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; β represents a modulus value difference parameter in the horizontal dimension; $(\beta_1 \ldots \beta_{N_1})$ represent modulus value differences between precoding matrices in different block codebooks in the horizontal dimension; $u_{m,\alpha} = [u_m\ \alpha_1 u_m\ \cdots\ \alpha_{N_2-1} u_m]^T$, where $u_{m,\alpha}$ a represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; α represents a modulus value difference parameter in the vertical dimension: $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and ⊗ represents a Kronecker product.

Embodiment 26

In the method according to any one of Embodiment 16 to Embodiment 20, vectors corresponding to the block codebooks are vectors corresponding to beams at different radiation angles.

Embodiment 27

In the method according to Embodiment 26, if the block codebook difference parameter is a phase difference, a structure of the precoding matrix in the codebook is shown in a formula 1.3:

$$W^{(1)}_{l,m,n,\phi,\theta} = \frac{1}{2N_1N_2K_1K_2} \cdot \begin{bmatrix} v_{l,\theta} \otimes u_{m,\phi} \\ \varphi_n v_{l,\theta} \otimes u_{m,\phi} \end{bmatrix} \quad \text{Formula 1.3}$$

where $\varphi_n = e^{j\pi n/2}$ represents a phase difference between two polarization directions of an antenna;

$$v_{l,\theta} = \begin{bmatrix} v_{l_0} & e^{j\theta_1}v_{l_1} & \cdots & e^{j\theta_{N_1-1}}v_{l_{N_1-1}} \end{bmatrix}^T,$$

where $l = l_0, l_1, \ldots, l_{N_1-1}$, and $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $v_l$ represents that each block codebook is formed based on a vector whose length is $K_1$, and $K_1$ is a quantity of CSI-RS ports corresponding to each block codebook in the horizontal dimension; $\theta$ represents a phase difference parameter in the horizontal dimension; $(\theta_1 \ldots \theta_{N_1})$ represent phase differences between precoding matrices in different block codebooks in the horizontal dimension;

$$u_{m,\phi} = \begin{bmatrix} u_{m_0} & e^{j\phi_1}u_{m_1} & \cdots & e^{j\phi_{N_2-1}}u_{m_{N_2-1}} \end{bmatrix}^T,$$

where $[\bullet]^T$ represents a conjugate transpose operation, $m = m_0, m_1, \ldots, m_{N_2-1}$, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; $\phi$ represents a phase difference parameter in the vertical dimension; $(\phi_1 \ldots \phi_{N_2})$ represent phase differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Embodiment 28

In the method according to Embodiment 26, if the block codebook difference parameter is a modulus value difference, a structure of the precoding matrix in the codebook is shown in a formula 1.4:

$$W^{(1)}_{l,m,n,\beta,\theta} = \frac{1}{2N_1N_2K_1K_2} \cdot \begin{bmatrix} v_{l,\beta} \otimes u_{m,\alpha} \\ \varphi_n v_{l,\beta} \otimes u_{m,\alpha} \end{bmatrix} \quad \text{Formula 1.4}$$

where $\varphi_n = e^{j\pi n/2}$ represents a phase difference between two polarization directions of an antenna;

$$v_{l,\beta} = \begin{bmatrix} v_{l_0} & \beta_1 v_{l_1} & \cdots & \beta_{N_1-1}v_{l_{N_1-1}} \end{bmatrix}^T,$$

where $v_{l,\theta}$ represents a precoding matrix in the codebook that is obtained through transformation from $N_1$ block codebooks in a horizontal dimension and the parameter value that corresponds to the block codebook difference parameter;

$$v_l = \begin{bmatrix} 1 & e^{j\frac{2\pi l}{O_1 \cdot K_1}} & \cdots & e^{j\frac{2\pi l(K_1-1)}{O_1 \cdot K_1}} \end{bmatrix},$$

where $l = l_0, l_1, \ldots, l_{N_1-1}$, and $v_l$ represents that each block codebook is formed based on a vector whose length is $K_1$, and $K_1$ is a quantity of CSI-RS ports corresponding to each block codebook in the horizontal dimension; $\beta$ represents a modulus value difference parameter in the horizontal dimension; $(\beta_1 \ldots \beta_{N_1})$ represent modulus value differences between precoding matrices in different block codebooks in the horizontal dimension;

$$u_{m,\alpha} = \begin{bmatrix} u_{m_0} & \alpha_1 u_{m_1} & \cdots & \alpha_{N_2-1}u_{m_{N_2-1}} \end{bmatrix}^T,$$

where $m = m_0, m_1, \ldots, m_{N_2-1}$, and $u_{m,\phi}$ represents a precoding matrix in the codebook that is obtained through transformation from $N_2$ block codebooks in a vertical dimension and the parameter value that corresponds to the block codebook difference parameter;

$$u_m = \begin{bmatrix} 1 & e^{j\frac{2\pi m}{O_2 \cdot K_2}} & \cdots & e^{j\frac{2\pi m(K_2-1)}{O_2 \cdot K_2}} \end{bmatrix},$$

where $u_m$ represents that each block codebook is formed based on a vector whose length is $K_2$, and $K_2$ is a quantity of CSI-RS ports corresponding to each block codebook in the vertical dimension; $\alpha$ represents a modulus value difference parameter in the vertical dimension; $(\alpha_1 \ldots \alpha_{N_1})$ represent modulus value differences between precoding matrices in different block codebooks in the vertical dimension; $O_1$ and $O_2$ represent over-sampling factors; l, m, and n each are a function of a codebook index; the codebook index has a correspondence to the PMI; j is a unit imaginary number; and $\otimes$ represents a Kronecker product.

Embodiment 29

User equipment includes a processor, a memory, and a communications interface. The memory is configured to store an instruction; the communications interface is configured to communicate with another device; and the processor is configured to execute the instruction stored in the memory, to cause the user equipment to perform the method according to any one of Embodiment 1 to Embodiment 14.

Embodiment 30

A transmission/reception point includes a processor, a memory, and a communications interface. The memory is configured to store an instruction; the communications interface is configured to communicate with another device; and the processor is configured to execute the instruction stored in the memory, to cause the transmission/reception point to perform the method according to any one of Embodiment 15 to Embodiment 28.

Embodiment 31

A method for indicating precoding matrix includes:
sending, by a terminal device, precoding matrix indicator information to a radio access network device, where the precoding matrix indicator information is used to indicate a precoding matrix in a codebook, and the codebook includes a quantity of antenna port groups and information about a phase factor between different antenna port groups; and
receiving, by the terminal device, downlink data from the radio access network device.

Embodiment 32

In the method according to Embodiment 31, the precoding matrix in the codebook satisfies:

$$W^{(1)}_{l,m,n,\theta_1,\cdots,\theta_{N-1}} = \frac{1}{\sqrt{2NK_1N_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ \vdots \\ e^{j\theta_{N-1}}\begin{pmatrix} v_l \otimes u_m \\ \varphi_n v_l \otimes u_m \end{pmatrix} \end{bmatrix},$$

where a superscript of W represents a rank number; $\varphi_n = e^{j\pi n/2}$ represents a phase difference or a phase factor between two polarization directions of an antenna, where a value range of n satisfies $\{0, 1, 2, 3\}$; l and m each represent a function of a first PMI; e represents a natural constant; j represents a unit imaginary number; π represents the circular ratio;

$$v_l = \begin{bmatrix} 1 & e^{j\frac{2\pi l}{O_1 K_1}} & \cdots & e^{j\frac{2\pi l(K_1-1)}{O_1 \cdot K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $(\theta_1 \ldots \theta_{N-1})$ represent phase differences or phase factors between different antenna port groups, or represent phase differences or phase factors between antenna panels; $O_1$ and $O_2$ represent over-sampling factors; ⊗ represents a Kronecker product; and N represents the quantity of antenna port groups, or represents a quantity of antenna panels, or N is 2 or 4.

Embodiment 33

In the method according to Embodiment 31, the precoding matrix in the codebook satisfies:

$$W^{(1)}_{l,m,n,\theta_1,\cdots,\theta_{N-1}} = \frac{1}{\sqrt{2NK_1N_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ \vdots \\ e^{j\theta_{N-1}}\begin{pmatrix} v_{l,m} \\ \varphi_n v_{l,m} \end{pmatrix} \end{bmatrix},$$

where a superscript of W represents a rank number;

$$v_{l,m} = \begin{bmatrix} u_m & e^{j\frac{2\pi l}{O_1 K_1}} u_m & \cdots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l, m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $O_1$ and $O_2$ represent over-sampling factors; l and m each represent a function of a first PMI; $\varphi_n = e^{j\pi n/2}$ represents a phase difference or a phase factor between two polarization directions of an antenna, where a value of n is $\{0, 1, 2, 3\}$; e represents a natural constant; j represents a unit imaginary number; $\pi$ represents the circular ratio; $(\theta_1 \ldots \theta_{N-1})$ represent phase differences or phase factors between different antenna port groups, or represent phase differences or phase factors between antenna panels; and N represents the quantity of antenna port groups, or N represents a quantity of antenna panels, or N is 2, 4, or 8.

Embodiment 34

In the method according to Embodiment 31, the precoding matrix in the codebook satisfies:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix},$$

where a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents the circular ratio; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

Embodiment 35

In the method according to Embodiment 31, the precoding matrix in the codebook satisfies:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix},$$

where a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

Embodiment 36

The method according to any one of Embodiment 31 to Embodiment 35 includes:

receiving, by the terminal device, signaling from the radio access network device, where the signaling includes the quantity of antenna port groups; and learning, by the terminal device based on the quantity of antenna port groups, of a codebook that needs to be used.

Embodiment 37

The method for indicating precoding matrix according to Embodiment 35 includes:

the antenna port is a channel state information-reference signal port.

Embodiment 38

A communication method includes:

receiving, by a terminal device, signaling from a radio access network device, where the signaling includes a quantity of antenna port groups; and learning, by the terminal device based on the quantity of antenna port groups, a codebook that needs to be used.

Embodiment 39

The communication method according to Embodiment 38 includes:

the antenna port is a channel state information-reference signal port.

Embodiment 40

A method for indicating precoding matrix includes:

receiving, by a radio access network device, precoding matrix indicator information from a terminal, where the precoding matrix indicator information is used to indicate a precoding matrix in a codebook, and the codebook includes a quantity of antenna port groups and information about a phase factor between different antenna port groups; and sending, by the radio access network device, downlink data to the terminal device.

Embodiment 41

In the method according to Embodiment 40, the precoding matrix in the codebook satisfies:

$$W^{(1)}_{l,m,\theta_1,\ldots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ e^{j\theta_{N-1}}\begin{pmatrix} v_l \otimes u_m \\ \varphi_n v_l \otimes u_m \end{pmatrix} \end{bmatrix},$$

where a superscript of W represents a rank number; $\varphi_n = e^{j\pi n/2}$ represents a phase difference or a phase factor between two polarization directions of an antenna, where a value range of n satisfies $\{0, 1, 2, 3\}$; l and m each represent a function of a first PMI; e represents a natural constant; j represents a unit imaginary number; π represents the circular ratio;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $(\theta_1 \ldots \theta_{N-1})$ represent phase differences or phase factors between different antenna port groups, or represents a phase difference or a phase factor between antenna panels; $O_1$ and $O_2$ represent over-sampling factors; $\otimes$ represents a Kronecker product; and N represents the quantity of antenna port groups, or represents a quantity of antenna panels, or N is 2 or 4.

Embodiment 42

In the method according to Embodiment 40, the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ e^{j\theta_{N-1}}\begin{pmatrix} v_{l,m} \\ \varphi_n v_{l,m} \end{pmatrix} \end{bmatrix},$$

where a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; $O_1$ and $O_2$ represent over-sampling factors; l and m each represent a function of a first PMI; $\varphi_n = e^{j\pi n/2}$ represents a phase difference or a phase factor between two polarization directions of an antenna, where a value of n is $\{0, 1, 2, 3\}$; e represents a natural constant; j represents a unit imaginary number; $\pi$ represents the circular ratio; $(\theta_1 \ldots \theta_{N-1})$ represent phase differences or phase factors between different antenna port groups, or represent phase differences or phase factors between antenna panels; and N represents the quantity of antenna port groups, or N represents a quantity of antenna panels, or N is 2, 4, or 8.

Embodiment 43

In the method according to Embodiment 40, the precoding matrix in the codebook satisfies:

$$W^{(1)}_{l,m,\theta_1,\ldots,\theta_{N-1}} = \frac{1}{\sqrt{N'K_1K_2}} \begin{bmatrix} v_l \otimes u_m \\ e^{j\theta_1} v_l \otimes u_m \\ \vdots \\ e^{j\theta_{N'-1}} v_l \otimes u_m \end{bmatrix},$$

where a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

where $v_l$ represents a DFT vector whose length is $K_1$, a $k_1^{th}$ element of $v_l$ is $$e^{j\frac{2\pi l k_1}{O_1 K_1}},$$

a value of $k_1$ may be $\{1, 2, \ldots, K-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents the circular ratio; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

Embodiment 44

In the method according to Embodiment 40, the precoding matrix in the codebook satisfies:

$$W^{(1)}_{l,m,\theta_1,\ldots,\theta_{N-1}} = \frac{1}{\sqrt{N'K_1K_2}} \begin{bmatrix} v_{l,m} \\ e^{j\theta_1} v_{l,m} \\ \vdots \\ e^{j\theta_{N'-1}} v_{l,m} \end{bmatrix}$$

where a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

where $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ may be $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

where $u_m$ represents a DFT vector whose length is $K_2$, a $k_2^{th}$ element of $u_m$ is $$e^{j\frac{2\pi l k_2}{O_1 K_1}},$$

a value of $k_2$ may be $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent phase differences or phase factors between antenna ports in different polarization directions in a same antenna port group, or represent phase differences or phase factors between antenna ports in a same polarization direction in different antenna port groups, or represent phase differences or phase factors between antenna ports in different polarization directions in different antenna port groups; and N represents a product of the quantity of antenna port groups and a quantity of polarization directions of an antenna, or N is 2, 4, or 8.

Embodiment 45

The method according to any one of Embodiment 40 to Embodiment 44 includes:
sending, by the radio access network device, signaling to the terminal device, where the signaling includes the quantity of antenna port groups; and
learning, by the terminal device based on the quantity of antenna port groups, a codebook that needs to be used.

Embodiment 46

The method for indicating precoding matrix according to Embodiment 45 includes:
the antenna port is a channel state information-reference signal port.

Embodiment 47

A communication method includes:
sending, by the radio access network device, signaling to the terminal device, where the signaling includes a quantity of antenna port groups; and
learning, by the terminal device based on the quantity of antenna port groups, a codebook that needs to be used; or
receiving, by a terminal device, signaling from a radio access network device, where the signaling includes a quantity of antenna port groups.

Embodiment 48

The method for indicating precoding matrix according to Embodiment 47 includes:
the antenna port is a channel state information-reference signal port.

Embodiment 49

A terminal device includes a processor, a memory, and a transceiver. The memory is configured to store an instruction; the transceiver is used by the terminal device to communicate with another device; and the processor is configured to execute the instruction stored in the memory, to cause the terminal device to perform an operation in the method according to any one of Embodiment 31 to Embodiment 39.

Embodiment 50

A radio access network device includes a processor, a memory, and a transceiver. The memory is configured to store an instruction; the transceiver is used by the radio access network device to communicate with another device; and the processor is configured to execute the instruction stored in the memory, to cause the radio access network device to perform an operation in the method according to any one of claims 40 to 48.

Embodiment 51

A chip system includes at least one processor. The at least one processor is configured to execute a stored instruction, to cause the terminal device to perform an operation in the method according to any one of Embodiment 31 to Embodiment 39.

Embodiment 52

A chip system includes at least one processor. The at least one processor is configured to execute a stored instruction, to cause the radio access network device to perform an operation in the method according to any one of Embodiment 40 to Embodiment 48.

It should be noted that, values of K1 and K2 in the foregoing embodiments of this application are positive integers.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication method, comprising:
receiving, by a terminal device, higher layer signaling from a radio access network device, wherein the higher layer signaling comprises information about a quantity of corresponding antenna panels;
sending, by the terminal device, precoding matrix indicator information to the radio access network device, wherein the precoding matrix indicator information indicates a precoding matrix in a codebook, and the codebook comprises the information about a quantity of corresponding antenna panels and information about a phase difference between different corresponding antenna panels; and
processing, by the terminal device, data transmission with the radio access network device.

2. The method according to claim 1, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ \vdots \\ e^{j\theta_{N-1}}\begin{pmatrix} v_l \otimes u_m \\ \varphi_n v_l \otimes u_m \end{pmatrix} \end{bmatrix},$$

wherein a superscript of W represents a rank number; $\varphi_n = e^{j\pi n/2}$ represents a phase difference or a phase factor between two polarization directions of an antenna, wherein a value range of n satisfies {0, 1, 2, 3}; l and m each represents a function of a first Precoding Matrix indicator (PMI); e represents a natural constant; j represents a unit imaginary number; π represents a circular ratio;

$$v_l = \begin{bmatrix} 1 & e^{j\frac{2\pi l}{O_1 K_1}} & \ldots & e^{j\frac{2\pi l(K_1-1)}{O_1 K_1}} \end{bmatrix}^T,$$

wherein $v_l$ represents a Discrete Fourier Transform (DFT) vector whose length is $K_1$, a $k_1^{th}$ element of $v_l$ is $$e^{j\frac{2\pi l k_1}{O_1 K_1}},$$

a value of $k_1$ is {1, 2, ..., $K_1$−1}, and $K_1$ is a quantity of channel state information (CSI)-reference signal (RS) ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is {1, 2, ..., $K_2$−1}, and $K_2$ is a quantity of CSI-RS ports in a vertical dimension in each antenna port group; $(\theta_1 \ldots \theta_{N-1})$ represent one of followings: phase differences or phase factors between different antenna port groups, phase differences between block codebooks, or phase differences or phase factors between antenna panels; $\theta_r = 2\pi i_{1,r+2}/X$, wherein r=1, ..., N−1, and X is a value in a set {2, 4, 8, ...}; $O_1$ and $O_2$ represent over-sampling factors; ⊗ represents a Kronecker product; and N represents one of followings: a quantity of antenna port groups, a quantity of antenna panels, or a number 2 or 4.

3. The method according to claim 1, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ \vdots \\ e^{j\theta_{N-1}}\begin{pmatrix} v_{l,m} \\ \varphi_n v_{l,m} \end{pmatrix} \end{bmatrix},$$

wherein a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is {1, 2, ..., $K_1$−1}, and $K_1$ is a quantity of CSI-RS ports in a horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l and m each represents a function of a first PMI; $\varphi_n = e^{j\pi n/2}$ represents a phase difference or a phase factor between two polarization directions of an antenna, wherein a value of n is $\{0, 1, 2, 3\}$; e represents a natural constant; j represents a unit imaginary number; $\pi$ represents a circular ratio; $(\theta_1 \ldots \theta_{N-1})$ represent one of followings: phase differences or phase factors between different antenna port groups, phase differences between block codebooks, or phase differences or phase factors between antenna panels; $\theta_r$ $2\pi i_{1,r+2}/X$, wherein $r=1, \ldots, N-1$, and X is a value in a set $\{2, 4, 8, \ldots\}$; and N represents a quantity of antenna port groups, a quantity of antenna panels, or a number 2, 4, or 8.

4. The method according to claim 1, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix}$$

wherein a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

wherein $v_l$ represents a DFT vector whose length is $K_1$, a $k_1^{th}$ element of $v_l$ is $$e^{j\frac{2\pi l k_1}{O_1 K_1}},$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents a circular ratio; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

5. The method according to claim 1, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix},$$

wherein a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T, \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

6. The method according to claim 4, wherein the phase factor is $\theta_r = 2\pi i_{2,r}/X$, wherein X is a value in a set $\{2, 4, 8, \ldots\}$, and $r=1, \ldots, N-1$.

7. The method according to claim 1, wherein the precoding matrix indicator information comprises at least one of a first precoding matrix indicator corresponding to wideband CSI, or a second precoding matrix indicator corresponding to subband CSI.

8. The method according to claim 7, wherein at least one of the first precoding matrix indicator or the second precoding matrix indicator comprises information indicating a phase difference between block codebooks.

9. The method according to claim 8, wherein the information indicating the phase difference between the block codebooks comprises at least one index value, and the index value corresponds to the phase difference between the block codebooks.

10. The method according to claim 7, wherein the precoding matrix indicator information comprises the first precoding matrix indicator corresponding to the wideband CSI, the second precoding matrix indicator corresponding to the subband CSI, and a third precoding matrix indicator, and wherein the third precoding matrix indicator comprises information indicating a phase difference between block codebooks.

11. A communication apparatus, comprising:
a processor;
an interface circuitry coupled with the processor, wherein the interface circuitry provides communication between the apparatus with another device; and
the processor cooperating with the interface circuitry, configured to: receive higher layer signaling from a radio access network device, wherein the higher layer signaling comprises information about a quantity of corresponding antenna panels, and send precoding matrix indicator information to the radio access network device, wherein the precoding matrix indicator information indicates a precoding matrix in a codebook, and the codebook comprises the information about a quantity of corresponding antenna panels and information about a phase difference between different corresponding antenna panels; and
the processor cooperating with the interface circuitry, configured to process data transmission with the radio access network device.

12. The apparatus according to claim 11, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ \vdots \\ e^{j\theta_{N-1}}\begin{pmatrix} v_l \otimes u_m \\ \varphi_n v_l \otimes u_m \end{pmatrix} \end{bmatrix},$$

wherein a superscript of W represents a rank number; $\varphi_n = e^{j\pi n/2}$ represents a phase difference or a phase factor between two polarization directions of an antenna, wherein a value range of n satisfies $\{0, 1, 2, 3\}$; l and m each represents a function of a first Precoding Matrix indicator (PMI); e represents a natural constant; j represents a unit imaginary number; $\pi$ represents a circular ratio;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

wherein $v_l$ represents a Discrete Fourier Transform (DFT) vector whose length is $K_1$, a $k_1^{th}$ element of $v_l$ is $$e^{j\frac{2\pi l k_1}{O_1 K_1}},$$

a value of $k_1$ is $\{1, 2, \ldots, K_1-1\}$, and $K_1$ is a quantity of channel state information (CSI)-reference signal (RS) ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $(\theta_1 \ldots \theta_{N-1})$ represent one of followings: phase differences or phase factors between different antenna port groups, phase differences between block codebooks, or phase differences or phase factors between antenna panels; $\theta_r = 2\pi i_{1,r+2}/X$, wherein $r=1, \ldots, N-1$ and X is a value in a set $\{2, 4, 8, \ldots\}$; $O_1$ and $O_2$ represent over-sampling factors; $\otimes$ represents a Kronecker product; and N represents one of followings: a quantity of antenna port groups, a quantity of antenna panels, or a number 2 or 4.

13. The apparatus according to claim 11, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ e^{j\theta_{N-1}}\begin{pmatrix} v_{l,m} \\ \varphi_n v_{l,m} \end{pmatrix} \end{bmatrix},$$

wherein a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is $\{1, 2, \ldots, K_1-1\}$, and $K_1$ is a quantity of CSI-RS ports in a horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l and m each represents a function of a first PMI; $\varphi_n = e^{j\pi n/2}$ represents a phase difference or a phase factor between two polarization directions of an antenna, wherein a value of n is $\{0, 1, 2, 3\}$; e represents a natural constant; j represents a unit imaginary number; $\pi$ represents a circular ratio; $(\theta_1 \ldots \theta_{N-1})$ represent one of followings: phase differences or phase factors between different antenna port groups, phase differences between block codebooks, or phase differences or phase factors between antenna panels; $\theta_r = 2\pi i_{1,r+2}/X$, wherein $r=1, \ldots, N-1$ and X is a value in a set $\{2, 4, 8, \ldots\}$; and N represents a quantity of antenna port groups, a quantity of antenna panels, or a number 2, 4, or 8.

14. The apparatus according to claim 11, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix}$$

wherein a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

wherein $v_l$ represents a DFT vector whose length is $K_1$, a $k_1^{th}$ element of $v_l$ is $$e^{j\frac{2\pi l k_1}{O_1 K_1}},$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_1^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents a circular ratio; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

15. The apparatus according to claim 11, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix},$$

wherein a superscript of W represents a rank number;

$$v_{l,m} = \begin{bmatrix} u_m & e^{j\frac{2\pi l}{O_1 K_1}} u_m & \cdots & e^{j\frac{2\pi l(K_1-1)}{O_1 \cdot K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix}^T \text{ or }$$

$$u_m = \begin{bmatrix} 1 & e^{j\frac{2\pi m}{O_2 K_2}} & \cdots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

16. The apparatus according to claim 14, wherein the phase factor is $\theta_r = 2\pi i_{2,r}/X$, wherein X is a value in a set $\{2, 4, 8, \ldots\}$, and $r=1, \ldots, N-1$.

17. The apparatus according to claim 11, wherein the precoding matrix indicator information comprises at least one of a first precoding matrix indicator corresponding to wideband CSI, or a second precoding matrix indicator corresponding to subband CSI.

18. The apparatus according to claim 17, wherein at least one of the first precoding matrix indicator or the second precoding matrix indicator comprises information indicating a phase difference between block codebooks.

19. The apparatus according to claim 18, wherein the information indicating the phase difference between the block codebooks comprises at least one index value, and the index value corresponds to the phase difference between the block codebooks.

20. The apparatus according to claim 17, wherein the precoding matrix indicator information comprises the first precoding matrix indicator corresponding to the wideband CSI, the second precoding matrix indicator corresponding to the subband CSI, and a third precoding matrix indicator, and wherein the third precoding matrix indicator comprises information indicating a phase difference between block codebooks.

21. A non-transitory computer readable storage medium, wherein the non-transitory computer readable storage medium stores instructions; and when being executed, the instructions cause a terminal device to perform operations comprising:

receiving, higher layer signaling from a radio access network device, wherein the higher layer signaling comprises information about a quantity of corresponding antenna panels;

sending, precoding matrix indicator information to the radio access network device, wherein the precoding matrix indicator information indicates a precoding matrix in a codebook, and the codebook comprises the information about a quantity of corresponding antenna panels and information about a phase difference between different corresponding antenna panels; and processing, data transmission with the radio access network device.

22. The non-transitory computer readable storage medium according to claim 21, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_l \otimes u_m \\ \varphi_n v_l \otimes u_m \\ e^{j\theta_1}\begin{pmatrix} v_l \otimes u_m \\ \varphi_n v_l \otimes u_m \end{pmatrix} \\ \vdots \\ e^{j\theta_{N-1}}\begin{pmatrix} v_l \otimes u_m \\ \varphi_n v_l \otimes u_m \end{pmatrix} \end{bmatrix},$$

wherein a superscript of W represents a rank number; $\varphi_n = e^{j\pi n/2}$ represents a phase difference or a phase factor between two polarization directions of an antenna, wherein a value range of n satisfies $\{0, 1, 2, 3\}$; l and m each represents a function of a first Precoding Matrix indicator (PMI); e represents a natural constant; j represents a unit imaginary number; π represents a circular ratio;

$$v_l = \begin{bmatrix} 1 & e^{j\frac{2\pi l}{O_1 K_1}} & \cdots & e^{j\frac{2\pi l(K_1-1)}{O_1 \cdot K_1}} \end{bmatrix}^T,$$

wherein $v_l$ represents a Discrete Fourier Transform (DFT) vector whose length is $K_1$, a $k_1^{th}$ element of $v_l$ is $$e^{j\frac{2\pi l k_1}{O_1 K_1}},$$

a value of $k_1$ is $\{1, 2, \ldots, K_1-1\}$, and $K_1$ is a quantity of channel state information (CSI)-reference signal (RS) ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $(\theta_1 \ldots \theta_{N-1})$ represent one of followings: phase differences or phase factors between different antenna port groups, phase differences between block codebooks, or phase differences or phase factors between antenna panels; $\theta_r = 2\pi i_{1,r+2}/X$, wherein $r=1, \ldots, N-1$ and X is a value in a set $\{2, 4, 8, \ldots\}$; $O_1$ and $O_2$ represent over-sampling factors; $\otimes$ represents a Kronecker product; and N represents one of followings: a quantity of antenna port groups, a quantity of antenna panels, or a number 2 or 4.

23. The non-transitory computer readable storage medium according to claim 21, wherein the precoding matrix in the codebook satisfies:

$$W^{(1)}_{l,m,n,\theta_1,\ldots,\theta_{N-1}} = \frac{1}{\sqrt{2NK_1K_2}} \begin{bmatrix} v_{l,m} \\ \varphi_n v_{l,m} \\ e^{j\theta_1}\begin{pmatrix} v_{l,m} \\ \varphi_n v_{l,m} \end{pmatrix} \\ \vdots \\ e^{j\theta_{N-1}}\begin{pmatrix} v_{l,m} \\ \varphi_n v_{l,m} \end{pmatrix} \end{bmatrix},$$

wherein a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 \cdot K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is $\{1, 2, \ldots, K_1-1\}$, and $K_1$ is a quantity of CSI-RS ports in a horizontal dimension in each group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l and m each represents a function of a first PMI; $\varphi_n = e^{j\pi n/2}$ represents a phase difference or a phase factor between two polarization directions of an antenna, wherein a value of n is $\{0, 1, 2, 3\}$; e represents a natural constant; j represents a unit imaginary number; $\pi$ represents a circular ratio; $(\theta_1 \ldots \theta_{N-1})$ represent one of followings: phase differences or phase factors between different antenna port groups, phase differences between block codebooks, or phase differences or phase factors between antenna panels; $\theta_r = 2\pi i_{1,r+2}/X$, wherein $r=1, \ldots, N-1$, and X is a value in a set $\{2, 4, 8, \ldots\}$; and N represents a quantity of antenna port groups, a quantity of antenna panels, or a number 2, 4, or 8.

24. The non-transitory computer readable storage medium according to claim 21, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_l \otimes u_m \\ e^{j\theta_1} v_l \otimes u_m \\ \vdots \\ e^{j\theta_{N-1}} v_l \otimes u_m \end{bmatrix}$$

wherein a superscript of W represents a rank number;

$$v_l = \begin{bmatrix} 1 & e^{j\frac{2\pi l}{O_1 K_1}} & \ldots & e^{j\frac{2\pi l(K_1-1)}{O_1 \cdot K_1}} \end{bmatrix}^T,$$

wherein $v_l$ represents a DFT vector whose length is $K_1$, a $k_1^{th}$ element of $v_l$ is $$e^{j\frac{2\pi l k_1}{O_1 K_1}},$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T,$$

wherein $u_m$ represents a DFT vector whose length is $K_2$, a $k_1^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; l is a function of a first horizontal codebook index, and has a correspondence to a first PMI; m is a function of a first vertical codebook index, and has a correspondence to the first PMI; $O_1$ and $O_2$ represent over-sampling factors; $\otimes$ represents a Kronecker product; e represents a natural constant; j represents a unit imaginary number; $\pi$ represents a circular ratio; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

25. The non-transitory computer readable storage medium according to claim 21, wherein the precoding matrix in the codebook satisfies:

$$W^{(1)}_{l,m,\theta_1,\ldots,\theta_{N-1}} = \frac{1}{\sqrt{NK_1K_2}} \begin{bmatrix} v_{l,m} \\ e^{j\theta_1} v_{l,m} \\ \vdots \\ e^{j\theta_{N-1}} v_{l,m} \end{bmatrix},$$

wherein a superscript of W represents a rank number;

$$v_{l,m} = \begin{bmatrix} u_m & e^{j\frac{2\pi l}{O_1 K_1}} u_m & \ldots & e^{j\frac{2\pi l(K_1-1)}{O_1 K_1}} u_m \end{bmatrix}^T,$$

wherein $v_{l,m}$ represents a vector whose length is $K_1 \times K_2$, a $k_1^{th}$ element of $v_{l,m}$ is $$e^{j\frac{2\pi l k_1}{O_1 K_1}} u_m,$$

a value of $k_1$ is $\{1, 2, \ldots, K_1-1\}$, and $K_1$ is a quantity of CSI-RS ports in a horizontal dimension in each antenna port group;

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix}^T \text{ or}$$

$$u_m = \begin{bmatrix} 1 & e^{j\frac{2\pi m}{O_2 K_2}} & \ldots & e^{j\frac{2\pi m(K_2-1)}{O_2 \cdot K_2}} \end{bmatrix},$$

wherein $u_m$ represents a DFT vector whose length is $K_2$, a $k_2^{th}$ element of $u_m$ is $$e^{j\frac{2\pi l k_2}{O_1 K_1}},$$

a value of $k_2$ is $\{1, 2, \ldots, K_2-1\}$, and $K_2$ is a quantity of CSI-RS ports in a vertical dimension in each antenna port group; $O_1$ and $O_2$ represent over-sampling factors; l is a function of a first horizontal codebook index, and has a correspondence to a first PMI; m is a function of a first vertical codebook index, and has a correspondence to the first PMI; $O_1$ and $O_2$ represent over-sampling factors; $(\theta_1 \ldots \theta_{N-1})$ represent one of followings: phase differences or phase factors between antenna ports in different polarization directions in a same antenna port group, phase differences or phase factors between antenna ports in a same polarization direction in different antenna port groups, or phase differences or phase factors between antenna ports in different polarization directions in different antenna port groups; and N represents a product of a quantity of antenna port groups and a quantity of polarization directions of an antenna, or a number 2, 4, or 8.

26. The non-transitory computer readable storage medium according to claim 24, wherein the phase factor is $\theta_r = 2\pi i_{2,r+2}/X$, wherein X is a value in a set $\{2, 4, 8, \ldots\}$, and r=1, ..., N-1.

27. The non-transitory computer readable storage medium according to claim 21, wherein the precoding matrix indicator information comprises at least one of a first precoding matrix indicator corresponding to wideband CSI, or a second precoding matrix indicator corresponding to subband CSI.

28. The non-transitory computer readable storage medium according to claim 27, wherein at least one of the first precoding matrix indicator or the second precoding matrix indicator comprises information indicating a phase difference between block codebooks.

29. The non-transitory computer readable storage medium according to claim 28, wherein the information indicating the phase difference between the block codebooks comprises at least one index value, and the index value corresponds to the phase difference between the block codebooks.

30. The non-transitory computer readable storage medium according to claim 27, wherein the precoding matrix indicator information comprises the first precoding matrix indicator corresponding to the wideband CSI, the second precoding matrix indicator corresponding to the subband CSI, and a third precoding matrix indicator, and wherein the third precoding matrix indicator comprises information indicating a phase difference between block codebooks.

* * * * *

UNITED STATES PATENT AND TRADEMARK OFFICE
CERTIFICATE OF CORRECTION

PATENT NO. : 10,819,406 B2
APPLICATION NO. : 16/369043
DATED : October 27, 2020
INVENTOR(S) : Yi Huang et al.

Page 1 of 1

It is certified that error appears in the above-identified patent and that said Letters Patent is hereby corrected as shown below:

In the Claims

In Column 84, Line 55, in Claim 5, delete ", or" and insert -- or --, therefor.

In Column 86, Line 63, in Claim 12, after "N-1" insert -- , --.

In Column 87, Line 65, in Claim 13, after "N-1" insert -- , --.

In Column 91, Line 23, in Claim 22, after "N-1" insert -- , --.

In Column 94, Line 26, in Claim 26, delete "$_{r+2}$/X," and insert -- $_r$/X, --, therefor.

Signed and Sealed this
Fifth Day of January, 2021

Andrei Iancu
*Director of the United States Patent and Trademark Office*